US011706039B2

(12) United States Patent
Chhabra et al.

(10) Patent No.: US 11,706,039 B2
(45) Date of Patent: Jul. 18, 2023

(54) ISA ACCESSIBLE PHYSICAL UNCLONABLE FUNCTION

(71) Applicant: Intel Corporation, Santa Clara, CA (US)

(72) Inventors: Siddhartha Chhabra, Portland, OR (US); Prashant Dewan, Portland, OR (US); Baiju Patel, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 125 days.

(21) Appl. No.: 17/134,364

(22) Filed: Dec. 26, 2020

(65) Prior Publication Data
US 2022/0209968 A1 Jun. 30, 2022

(51) Int. Cl.
*H04L 9/32* (2006.01)
*G06F 9/30* (2018.01)
*H04L 9/08* (2006.01)

(52) U.S. Cl.
CPC ........ *H04L 9/3278* (2013.01); *G06F 9/30098* (2013.01); *G06F 9/30145* (2013.01); *H04L 9/0861* (2013.01)

(58) Field of Classification Search
CPC ............. G06F 9/30101; G06F 9/30145; G06F 21/602; G06F 21/73; G06F 2221/2107; G06F 9/30007; H04L 9/0861; H04L 9/3278; H04L 9/0866
See application file for complete search history.

(56) References Cited

U.S. PATENT DOCUMENTS

| 7,136,838 | B1 * | 11/2006 | Peinado ................. H04L 63/12 705/52 |
| 9,710,401 | B2 | 7/2017 | Rozas et al. |
| 9,904,805 | B2 | 2/2018 | Chhabra et al. |
| 9,917,687 | B2 * | 3/2018 | Wooten .................... G06F 8/65 |
| 9,921,841 | B2 * | 3/2018 | Baghsorkhi ......... G06F 9/30145 |
| 10,075,296 | B2 * | 9/2018 | Brandt .................. H04L 9/0894 |
| 10,108,417 | B2 * | 10/2018 | Krishna .............. G06F 9/30112 |
| 10,129,036 | B2 * | 11/2018 | Li ......................... H04L 9/3278 |
| 10,142,101 | B2 * | 11/2018 | Gopal .................. H04L 9/3239 |

(Continued)

FOREIGN PATENT DOCUMENTS

| EP | 0354774 A2 | 2/1990 |
| EP | 2096786 A2 | 9/2009 |

OTHER PUBLICATIONS

Search Query Report from IP.com (performed Sep. 9, 2022) (Year: 2022).*

(Continued)

*Primary Examiner* — Sharon S Lynch
(74) *Attorney, Agent, or Firm* — Nicholson De Vos Webster & Elliott, LLP

(57) ABSTRACT

Techniques for encrypting data using a key generated by a physical unclonable function (PUF) are described. An apparatus according to the present disclosure may include decoder circuitry to decode an instruction and generate a decoded instruction. The decoded instruction includes operands and an opcode. The opcode indicates that execution circuitry is to encrypt data using a key generated by a PUF. The apparatus may further include execution circuitry to execute the decoded instruction according to the opcode to encrypt the data to generate encrypted data using the key generated by the PUF.

18 Claims, 35 Drawing Sheets

(56) References Cited

U.S. PATENT DOCUMENTS

| | | | |
|---|---|---|---|
| 10,263,988 B2 | 4/2019 | Vij et al. | |
| 10,289,605 B2 | 5/2019 | Abdallah | |
| 10,313,129 B2 | 6/2019 | Gopal et al. | |
| 10,325,118 B2 | 6/2019 | Chhabra et al. | |
| 10,558,588 B2 | 2/2020 | Rozas et al. | |
| 10,785,028 B2 | 9/2020 | Girkar et al. | |
| 11,042,631 B2* | 6/2021 | Ghosh | G06F 21/54 |
| 11,055,236 B2 | 7/2021 | Rozas et al. | |
| 11,163,569 B2* | 11/2021 | Lemay | G06F 9/30145 |
| 11,250,165 B2* | 2/2022 | LeMay | H04L 9/0894 |
| 11,403,005 B2* | 8/2022 | Durham | G06F 9/45558 |
| 11,544,174 B2* | 1/2023 | McConnell | G06F 21/46 |
| 2004/0086114 A1* | 5/2004 | Rarick | H04L 9/0625 380/29 |
| 2004/0230816 A1 | 11/2004 | Lundvall et al. | |
| 2008/0205651 A1* | 8/2008 | Goto | H04L 9/302 713/189 |
| 2010/0254537 A1* | 10/2010 | Buer | H04L 63/0428 380/279 |
| 2010/0332843 A1* | 12/2010 | Boivie | G06F 21/72 713/189 |
| 2012/0216051 A1* | 8/2012 | Boivie | G06F 21/6209 713/190 |
| 2012/0284532 A1* | 11/2012 | Wang | G06F 21/602 713/190 |
| 2013/0346749 A1 | 12/2013 | Wray et al. | |
| 2015/0113258 A1 | 4/2015 | Grieco et al. | |
| 2015/0188710 A1 | 7/2015 | Johnson et al. | |
| 2016/0056961 A1 | 2/2016 | Gueron | |
| 2016/0087805 A1* | 3/2016 | Li | H04L 9/3278 713/193 |
| 2016/0364582 A1* | 12/2016 | Cammarota | G09C 1/00 |
| 2016/0378688 A1 | 12/2016 | Rozas et al. | |
| 2016/0380772 A1 | 12/2016 | Gopal et al. | |
| 2017/0046154 A1* | 2/2017 | Krishna | G06F 9/30098 |
| 2017/0063547 A1* | 3/2017 | Brandt | G06F 21/53 |
| 2017/0083724 A1 | 3/2017 | Chhabra et al. | |
| 2017/0093567 A1* | 3/2017 | Gopal | G06F 21/602 |
| 2017/0104580 A1* | 4/2017 | Wooten | H04L 9/0869 |
| 2017/0214523 A1 | 7/2017 | Pebay-Peyroula et al. | |
| 2017/0242697 A1* | 8/2017 | Baghsorkhi | G06F 9/3016 |
| 2018/0004683 A1 | 1/2018 | Rozas et al. | |
| 2018/0007051 A1 | 1/2018 | Vij et al. | |
| 2018/0137081 A1 | 5/2018 | Abdallah | |
| 2018/0204025 A1 | 7/2018 | Chhabra et al. | |
| 2018/0268130 A1* | 9/2018 | Ghosh | G06F 21/53 |
| 2019/0042402 A1 | 2/2019 | Chhabra et al. | |
| 2019/0065201 A1 | 2/2019 | Robinson et al. | |
| 2020/0007332 A1 | 1/2020 | Girkar et al. | |
| 2020/0134234 A1* | 4/2020 | LeMay | G06F 21/602 |
| 2020/0142838 A1 | 5/2020 | Rozas et al. | |
| 2020/0382303 A1 | 12/2020 | Girkar et al. | |
| 2021/0064254 A1* | 3/2021 | Durham | G06F 21/64 |
| 2021/0200546 A1 | 7/2021 | Lemay et al. | |
| 2021/0200880 A1* | 7/2021 | Khosravi | G06F 21/79 |
| 2021/0303443 A1* | 9/2021 | Mcconnell | G06F 21/46 |
| 2021/0406201 A1 | 12/2021 | Rozas et al. | |
| 2022/0058023 A1* | 2/2022 | Lemay | G06F 16/9017 |
| 2022/0100679 A1* | 3/2022 | Natu | G06F 12/1408 |
| 2022/0197995 A1* | 6/2022 | Shanbhogue | G06F 9/45558 |
| 2022/0198027 A1* | 6/2022 | Chhabra | G06F 12/0238 |

OTHER PUBLICATIONS

Search query report from IP.com (performed Feb. 14, 2023) (Year: 2023).*

European Search Report and Search Opinion, EP App. No. 21198636.9, dated Mar. 21, 2022, 9 pages.

Patil et al., "Preventing Integrated Circuit Piracy via Custom Encoding of Hardware Instruction Set", 17th International Symposium on Quality Electronic Design (ISQED), IEEE, Mar. 15, 2016, pp. 234-241.

European Search Report and Search Opinion, EP App. No 21198550.2, dated Mar. 11, 2022, 5 pages.

European Search Report and Search Opinion, EP App. No. 21198718.5, dated Mar. 21, 2022, 11 pages.

European Search Report, EP App. No. 21198647.6, dated Mar. 14, 2022, 5 pages.

Non-Final Office Action, U.S. Appl. No. 17/134,360, dated Sep. 20, 2022, 21 pages.

Non-Final Office Action, U.S. Appl. No. 17/134,363, dated Nov. 3, 2022, 46 pages.

Notice of Allowance, U.S. Appl. No. 17/134,365, dated Sep. 28, 2022, 14 pages.

Search Query Report from IP.com (performed Sep. 13, 2022) (Year: 2022).

* cited by examiner

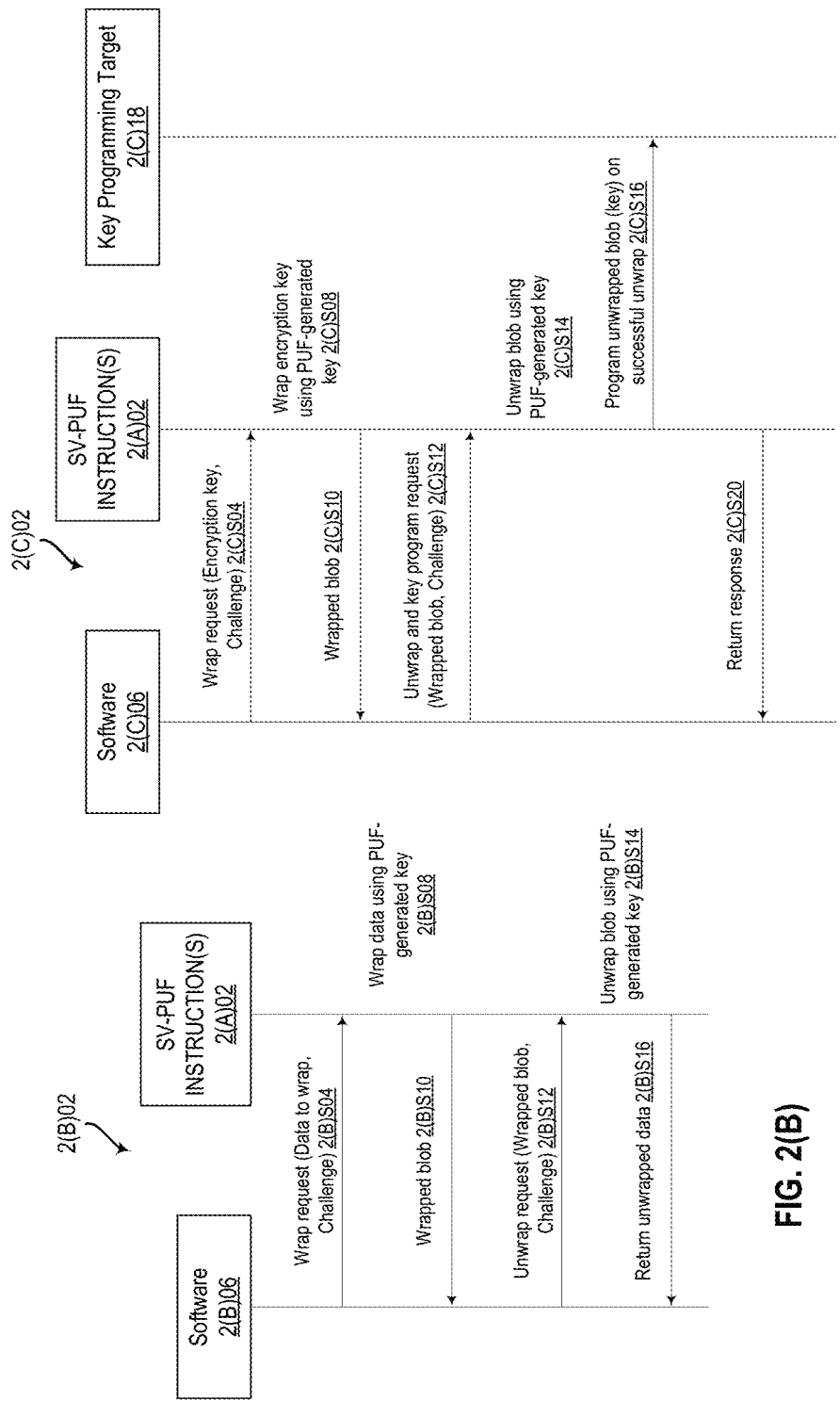

FETCH AN INSTRUCTION HAVING:
1) ONE OR MORE FIELDS TO IDENTIFY A FIRST DESTINATION OPERAND,
2) ONE OR MORE FIELDS TO IDENTIFY A SECOND DESTINATION OPERAND, THE SECOND DESTINATION OPERAND IS TO EITHER STORE AN OUTPUT DATA STRUCTURE HAVING DECRYPTED DATA AFTER EXECUTION OF THE INSTRUCTION, OR A LOCATION TO STORE AN DATA STRUCTURE HAVING DECRYPTED DATA AFTER EXECUTION OF THE INSTRUCTION,
3) ONE OR MORE FIELDS TO IDENTIFY A SOURCE OPERAND, WHEREIN THE SOURCE OPERAND IS TO EITHER STORE AN INPUT DATA STRUCTURE TO BE USED IN AN DECRYPTION PROCESS OR A LOCATION OF AN INPUT DATA STRUCTURE TO BE USED IN AN DECRYPTION PROCESS, AND
4) ONE MORE FIELDS FOR AN OPCODE, THE OPCODE TO INDICATE THAT EXECUTION CIRCUITRY IS TO AT LEAST ENCRYPT SECRET INFORMATION FROM THE INPUT DATA STRUCTURE WITH A PUF GENERATED ENCRYPTION KEY, BIND THE WRAPPED SECRET INFORMATION TO A TARGET, UPDATE THE INPUT DATA STRUCTURE, GENERATE A MAC OVER THE UPDATED DATA STRUCTURE, STORE THE MAC IN THE INPUT DATA STRUCTURE TO GENERATE A WRAPPED OUTPUT DATA STRUCTURE, STORE THE WRAPPED OUTPUT DATA STRUCTURE HAVING THE ENCRYPTED SECRET INFORMATION AND AN INDICATION OF THE TARGET ACCORDING TO THE SECOND DESTINATION OPERAND'S USAGE FOR THE INSTRUCTION  501

TRANSLATE THE FETCHED INSTRUCTION INTO ONE OR MORE INSTRUCTIONS 502

DECODE THE INSTRUCTION 503

RETRIEVE DATA ASSOCIATED WITH THE SOURCE OPERANDS AND SCHEDULE 505

EXECUTE THE DECODED INSTRUCTION(S) TO INDICATE THAT EXECUTION CIRCUITRY IS TO AT LEAST ENCRYPT SECRET INFORMATION FROM THE INPUT DATA STRUCTURE WITH A PUF GENERATED ENCRYPTION KEY, BIND THE WRAPPED SECRET INFORMATION TO A TARGET, UPDATE THE INPUT DATA STRUCTURE, GENERATE A MAC OVER THE UPDATED DATA STRUCTURE, STORE THE MAC IN THE INPUT DATA STRUCTURE TO GENERATE A WRAPPED OUTPUT DATA STRUCTURE, STORE THE WRAPPED OUTPUT DATA STRUCTURE HAVING THE ENCRYPTED SECRET INFORMATION AND AN INDICATION OF THE TARGET ACCORDING TO THE SECOND DESTINATION OPERAND'S USAGE FOR THE INSTRUCTION 507

COMMIT A RESULT OF THE EXECUTED INSTRUCTION
509

Parameters:
RAX: Operation Status
RBX: Linear address of input BIND_STRUCT (IN_BIND_STRUCT)
RCX: Linear address of output BIND_STRUCT (OUT_BIND_STRUCT)

Operation:
IF (CPUID.SXPUF_BIT == 0 OR NOT IN 64b mode) THEN #UD
IF (CPL > 0) #GP(0)
IF (RBX or RCX is not 256B aligned) THEN #GP(0)
IF (RBX and RCX are overlapping) THEN #GP(0)
IN_BIND_STRUCT = Load from RBX //Copy all fields from input BIND_STRUCT
IF (NOT IN_BIND_STRUCT.RSVD) THEN #GP(0); //Check for all reserved fields in IN_BIND_STRUCT including reserved bits in BIND_STRUCT.BTDATA
TMP_SEQID = <Generate 168-bit for use as IV>
IF (NOT_ENOUGH_ENTROPY) THEN SET RFLAGS.ZF=1, RAX=ENTROPY_ERROR and goto EXIT Obtain wrapping key from PUF, wrapping_key = PUF(IN_BIND_STRUCT.BTDATA.USR_SUPP_CHALLENGE)
Encrypt IN_BIND_STRUCT.BTENCDATA using wrapping_key and TMP_SEQID, write the encrypted data to OUT_BIND_STRUCT.BTENCDATA
Compute MAC using wrapping_key over encrypted data and rest of the IN_BIND_STRUCT (including reserved fields) and write it to OUT_BIND_STRUCT.MAC
Copy BTID and BTDATA (challenge to zero) from IN_BIND_STRUCT to corresponding fields in OUT_BIND_STRUCT (all reserved fields are set to zero in OUT_BIND_STRUCT)
Replace OUT_BIND_STRUCT.SEQID with the TMP_SEQID used above
RFLAGS.ZF = 0, RAX=SUCCESS
EXIT: set RFLAGS.CF=0, RFLAGS.PF=0, RFLAGS.AF=0, RFLAGS.OF=0, and RFLAGS.SF=0

- Operands
  - RAX: Operation status
  - RBX: Linear address of wrapped BIND_STRUCT
  - RCX: Linear address of output buffer to receive unwrapped data
- Operation
  - IF (CPUID.SVPUF_BIT == 0 OR NOT IN 64b mode) #UD
  - IF (CPL > 0) #GP(0)
  - IF (RBX is not 256B aligned) THEN #GP(0)
  - IF (RCX is not 64B aligned) THEN #GP(0)
  - IF (RBX and RCX are overlapping) THEN #GP(0)
  - IN_BIND_STRUCT = Load from RBX // Copy all fields from input BIND_STRUCT
  - IF (IN_BIND_STRUCT.RSVD != 0) THEN #GP(0)
  - IF IN_BIND_STRUCT.BTID != UNSEAL_DATA_CPU, THEN set RFLAGS.ZF=1, RAX = INVALID_TARGET, goto EXIT
  - Obtain wrapping key from PUF, wrapping_key = PUF(IN_BIND_STRUCT.BTDATA.USER_SUPP_CHALLENGE)
  - Unwrap IN_BIND_STRUCT using wrapping key and sequence ID in IN_BIND_STRUCT
  - If unwrapping is unsuccessful (i.e., MAC mismatch), THEN SET RFLAGS.ZF=1, RAX=UNWRAP_FAILURE, goto EXIT
  - If unwrapping is successful (i.e., MAC match), populate unwrapped data in output buffer pointed to by RCX RFLAGS.ZF=0, RAX=SUCCESS
  - EXIT: Set RFLAGS.CF=0, RFLAGS.PF=0, RFLAGS.AF=0, RFLAGS.OF=0, and RFLAGS.SF=0

FIG. 10

FETCH AN INSTRUCTION HAVING ONE OR MORE FIELDS TO IDENTIFY A SOURCE/ DESTINATION OPERAND WHICH AS A SOURCE PROVIDES AN IDENTITY CHALLENGE FOR A SV-PUF CIRCUIT TO GENERATE A KEY AND AS A DESTINATION IS STORE AN OPERATION STATUS AFTER EXECUTION, ONE OR MORE FIELDS TO IDENTIFY A FIRST SOURCE OPERAND WHICH IS TO PROVIDE AN INDICATION OF A SIGNATURE ALGORITHM TO USE, ONE OR MORE FIELDS TO IDENTIFY A SECOND SOURCE OPERAND WHICH IS TO STORE OR ENCODE A LOCATION OF AN INPUT DATA STRUCTURE TO HOLD AN (UN)WRAPPING KEY TO USE DURING EXECUTION AND DATA TO BE UNWRAPPED, AND ONE OR MORE FIELDS TO IDENTIFY A DESTINATION OPERAND THAT IS TO STORE OR ENCODE A LOCATION OF WHERE A SIGNED RESPONSE GENERATED DURING EXECUTION IS TO BE PLACED, AND ONE OR MORE FIELDS FOR AN OPERAND, THE OPERAND TO INDICATE THAT EXECUTION CIRCUITRY IS TO AT LEAST DECRYPT SECRET INFORMATION FROM THE INPUT DATA STRUCTURE OF THE SECOND SOURCE OPERAND WITH A PUF GENERATED KEY, GENERATE A SIGNED RESPONSE OF THE DECRYPTED SECRET INFORMATION USING THE IDENTITY CHALLENGE OF THE SOURCE/DESTINATION OPERAND ACCORDING TO THE SIGNATURE ALGORITHM INDICATED BY THE FIRST SOURCE OPERAND, STORE THE SIGNED RESPONSE IN THE IDENTIFIED DESTINATION, AND STORE OPERATIONAL STATUS OF EXECUTION IN THE IDENTIFIED SOURCE/DESTINATION OPERAND 1201

↓

TRANSLATE THE FETCHED INSTRUCTION INTO ONE OR MORE INSTRUCTIONS 1202

↓

DECODE THE INSTRUCTION 1203

↓

RETRIEVE DATA ASSOCIATED WITH THE SOURCE OPERANDS AND SCHEDULE 1205

↓

EXECUTE THE DECODED INSTRUCTION(S) TO AT LEAST DECRYPT SECRET INFORMATION FROM THE INPUT DATA STRUCTURE OF THE SECOND SOURCE OPERAND WITH A PUF GENERATED KEY, GENERATE A SIGNED RESPONSE OF THE DECRYPTED SECRET INFORMATION USING THE IDENTITY CHALLENGE OF THE SOURCE/DESTINATION OPERAND ACCORDING TO THE SIGNATURE ALGORITHM INDICATED BY THE FIRST SOURCE OPERAND, STORE THE SIGNED RESPONSE IN THE IDENTIFIED DESTINATION, AND STORE OPERATIONAL STATUS OF EXECUTION IN THE IDENTIFIED SOURCE/DESTINATION OPERAND 1207

↓

COMMIT A RESULT OF THE EXECUTED INSTRUCTION 1209

FETCH AN INSTRUCTION HAVING ONE OR MORE FIELDS FOR AN OPCODE TO INDICATE A MEMORY PROTECTION CONTROLLER IS TO BE PROGRAMMED ACCORDING TO A LEAF OPERATION, WHEREIN A FIRST IMPLICIT OPERAND IS TO PROVIDE AN INDICATION OF THE LEAF OPERATION, A SECOND IMPLICIT OPERAND IS TO PROVIDE A KEY IDENTIFIER (KEYID) AND AN INDICATION OF AN ENCRYPTION ALGORITHM, A THIRD IMPLICIT OPERAND TO PROVIDE A LOCATION OF AN INPUT DATA STRUCTURE, WHEREIN THE OPCODE IS TO INDICATE EXECUTION CIRCUITRY IS TO DECRYPT ENCRYPTED DATA FROM THE INPUT DATA STRUCTURE USING AN UNWRAPPING KEY GENERATED BY A PHYSICAL UNCLONABLE FUNCTION (PUF), THE DECRYPTED DATA COMPRISING CONCATENATED KEYS, PROGRAM THE MEMORY PROTECTION CONTROLLER USING THE CONCATENATED KEYS BASED ON THE FOR THE KEYID BASED ON THE INDICATED ENCRYPTION ALGORITHM, AND SET AN OPERATIONAL STATUS 1701

TRANSLATE THE FETCHED INSTRUCTION INTO ONE OR MORE INSTRUCTIONS 1702

DECODE THE INSTRUCTION 1703

RETRIEVE DATA ASSOCIATED WITH THE SOURCE OPERANDS AND SCHEDULE 1705

EXECUTE THE DECODED INSTRUCTION(S) TO AT LEAST PROGRAM THE MEMORY PROTECTION CONTROLLER ACCORDING TO THE LEAF OPERATION 1707

COMMIT A RESULT OF THE EXECUTED INSTRUCTION 1709

FIG. 17

MKTME_KEY_PROGRAM_SVPUF Leaf Operation

Operands:
* EAX: PCONFIG leaf value
* RBX: KEYID Control
* RCX: Linear address of WRAPPED BIND_STRUCT MKTME_KEY_PROGRAM_SVPUF Leaf Operation

* IF (CPUID.SVPUF_BIT == 0) THEN #GP(0)
* IF ((IA32_TME_ACTIVATE.LOCK != 1 OR IA32_TME_ACTIVATE.ENABLE != 1 OR IA32_TME_ACTIVATE.MK_TME_KEYID_BITS == 0) THEN #GP(0)
* IF (OS:RCX is not 256B aligned) THEN #GP(0)
* IN_BIND_STRUCT = OS:RCX //Copy all fields from input BIND_STRUCT
* TMP_KEY_CTRL = RBX
* IF (IN_BIND_STRUCT.WRAPPED_BIND_STRUCT.RSVD != 0) THEN #GP(0)
* IF (TMP_KEY_CTRL.RSVD != 0) THEN #GP(0)
* IF IN_BIND_STRUCT.BTD != MKTME_ENGINE, THEN set RFLAGS.ZF=1, EAX = INVALID_TARGET, and goto EXIT
* IF (TMP_KEY_CTRL.KEYID is not valid, i.e. TMP_KEY_CTRL.KEYID is zero OR > maximum number of keys activated/supported) THEN set RFLAGS.ZF=1, EAX = INVALID_KEYID, and goto EXIT
* IF (TMP_KEY_CTRL.ENC_ALG is not one of the activated algorithms in IA32_TME_ACTIVATE) THEN set RFLAGS.ZF=1, EAX = INVALID_ENC_ALG, and goto EXIT
* Obtain wrapping key from PUF, wrapping_key = PUF(IN_BIND_STRUCT.BTDATA.USER_SUPP_CHALLENGE)
* Unwrap IN_BIND_STRUCT using wrapping key and sequence ID in the IN_BIND_STRUCT
* If Unwrapping is unsuccessful (i.e. MAC mismatch) THEN SET RFLAGS.ZF=1, EAX=UNWRAP_FAILURE and goto EXIT
* IF(LOCK_ACQUIRE) //LOCK is over the entire key table
    * Program unwrapped data and unwrap keys for the keyID to the MKTME engine based on the encryption algorithm in TMP_KEY_CTRL.ENC_ALG
    * RFLAGS.ZF=0, EAX=0
    * LOCK_RELEASE
* ELSE
    * set RFLAGS.ZF=1, EAX=DEVICE_BUSY, and goto EXIT
* EXIT:
    * Set RFLAGS.CF=0, RFLAGS.PF=0, RFLAGS.AF=0, RFLAGS.OF=0, and RFLAGS.SF=0

FIG. 19

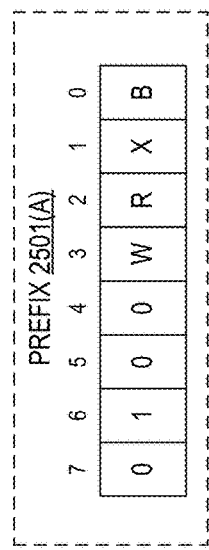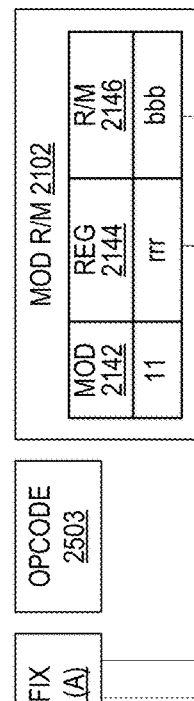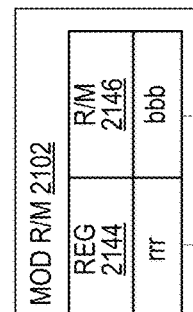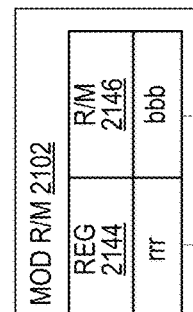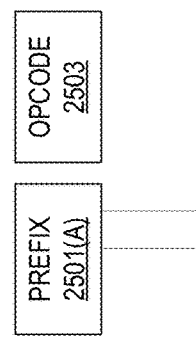

ISA ACCESSIBLE PHYSICAL UNCLONABLE FUNCTION

BACKGROUND

A physical unclonable function (PUF) is a physical object that, for a given input and conditions (challenge), provides a physically-defined output (response) that serves as a unique identifier for a semiconductor device (e.g., a processor). An example PUF is an array of transistor devices, the response of which is based on unique physical variations that occur naturally during semiconductor manufacturing. Because of this unique response, PUFs provide platform-unique entropy, which can be used to generate unclonable cryptographic keys. For example, on a (same value generated across boots). Because the PUF-generated entropy is unique to the platform (e.g., a desktop computer, a laptop computer, a tablet computer, etc.), the same PUF circuit used on a different platform will generate different entropy, which makes the cryptographic keys generated by the PUF unclonable.

BRIEF DESCRIPTION OF DRAWINGS

Various embodiments in accordance with the present disclosure will be described with reference to the drawings, in which:

FIG. 2(B) illustrates an example process for wrapping and unwrapping a secret according to the present embodiments.

FIG. 2(C) illustrates another example process for wrapping and unwrapping a secret according to the present embodiments.

FIG. 5 illustrates an embodiment of method performed by a processor to process a WRP instruction.

FIG. 7 illustrates embodiments of pseudocode for the execution of the WRP instruction.

FIG. 10 illustrates embodiments of pseudocode for the execution of the UNWRP instruction.

FIG. 12 illustrates embodiments of processing an UNWRPMAC instruction.

FIG. 14 illustrates embodiments of pseudocode for the execution of an UNWRPMAC instruction.

FIG. 17 illustrates embodiments of processing an PCONFIG instruction.

FIG. 19 illustrates embodiments of pseudocode for the execution of an PCONFIG instruction.

FIG. 27 is a functional block diagram illustrating details of a first example prefix of the instruction format of FIG. 25 according to the present embodiments;

FIGS. 28(A)-(D) are functional block diagrams illustrating how the R, X, and B fields of the first example prefix of FIG. 27 are used according to the present embodiments;

DETAILED DESCRIPTION

Figure 1:
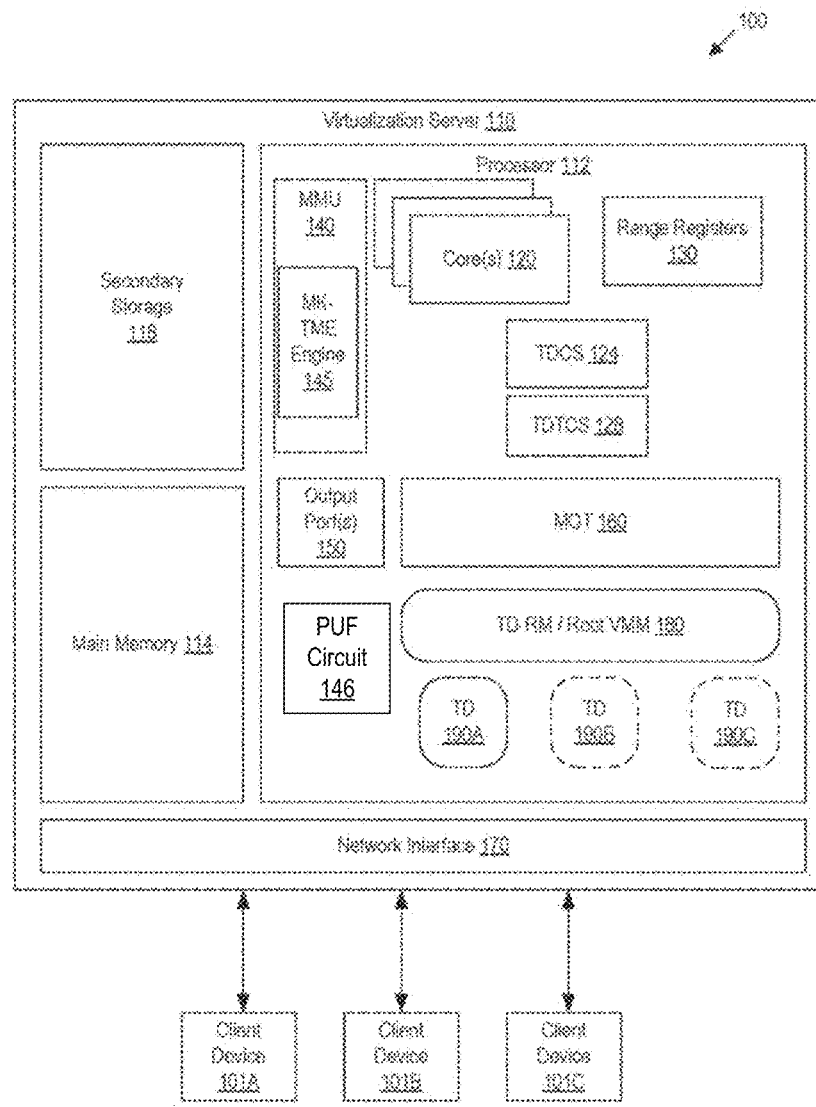
FIG. 1 is a schematic block diagram of a computing system that provides isolation in virtualized systems using TDs, according to an implementation of the disclosure.

The present disclosure relates to methods, apparatus, systems, and non-transitory computer-readable storage media storing instructions for encrypting data using a key generated by a physical unclonable function (PUF). Encryption is the process of encoding information, and is a tool used to protect the security or privacy of sensitive information (e.g., passwords) stored on a computer. The encryption process converts the original representation of the information, known as plaintext, into an alternative form known as ciphertext. An encryption scheme usually uses a pseudo-random encryption key generated by an algorithm. Authorized parties who possess the key can easily decrypt the encoded information. It is possible to decrypt the encoded information without possessing the key, but, for a well-designed encryption scheme, considerable computational resources and skills are required.

To maintain the secrecy of the encoded information, it is thus important to prevent access to the encryption key by unauthorized parties. One way to protect an encryption key (or any secret information, such as a password) when stored on a computer is to store the secret information using electronic fuses. Fuses had long been considered to be secure, but recent studies have shown that determined hardware attackers can scan the fuses and recover the secret information. The present embodiments solve this problem by protecting the secret information with a PUF-generated encryption key. PUFs advantageously protect against scanning, and the PUF circuit is also resistant to side-channel attacks (e.g., attacks using EM radiation).

According to some embodiments, a software-visible PUF (SV-PUF) exposes the PUF functionality to software through instruction. One or more of these instructions comprise a SV-PUF ISA or ISA extension (throughout the description SV-PUF ISA will be the term used, but the text below applies to an ISA extension). The present embodiments disclose the use of a SV-PUF for wrapping secrets and tying them to a platform using PUF-derived keys. This wrapping (encryption and integrity protection) can protect secrets such as passwords, keys, cookies, etc. while they are not in use, and unwrap/retrieve the secrets in plaintext at the point of use. The secrets protected using PUF-derived keys can then either be returned back to software, or can be used to program encryption engine(s) (e.g., Multi-Key Total Memory Encryption (MKTME) available from Intel Corporation of Santa Clara, Calif.) on the platform. In the case of programming encryption engine(s), the secrets are advantageously never revealed in plaintext after initial provisioning through the lifetime of the platform, and are instead programmed directly to the desired encryption engine(s) over an interface using the instructions of the present embodiments.

The present embodiments advantageously enable binding secrets to the platform using PUF-derived keys for protecting them. In addition, the secrets can be tied to a configuration of the platform (e.g., whether a platform firmware verification program, such as Intel Boot Guard, is enabled) and the processor (e.g., the secrets are wrapped inside an enclave or a trust domain). Furthermore, the secrets are retained across boots, because the same key is generated by the PUF each time the system reboots.

As contemplated in the present disclosure, embodiments include a processor security capability called Trusted Domain Extensions (TDX) to meet increased security objectives via the use of memory encryption and integrity via memory controller engines. As used in TDX, a Trusted Domain (TD) is a protected VM.

Embodiments comprise an additional extended page table (EPT) structure called a Secure Extended Page Table (SEPT) that is used by a processor for TD private page walks. The SEPT is a per-TD EPT (i.e., each TD has its own SEPT) that is managed by a Trusted Domain Resource Manager (TDRM) only via special instructions newly added to the instruction set architecture (ISA) of the processor. The TDRM cannot alter SEPT without using these instructions otherwise an integrity failure will be reported by the processor. In other embodiments, all or parts of the SEPT may be access-controlled using processor range-register protection.

In typical VM implementations, the processor supports one EPT pointer (EPTP) per virtual memory control structure (VMCS). The VMCS is a data structure in memory that exists once per VM, while the VM is managed by the VMM. With every change of the execution context between different VMs, the VMCS is restored for the current VM, thereby defining the state of the VM's virtual processor. The VMM manages the EPT referenced by the EPTP. In embodiments, the VMs may be encapsulated by TDs, and the VMCS may be replaced by an analogous control structure called the Trusted Domain Control Structure (TDCS) that manages the guest state of TDs.

An architecture to provide isolation in virtualized systems using trust domains (TDs) is described. A current trend in computing is the placement of data and enterprise workloads in the cloud by utilizing hosting services provided by cloud service providers (CSPs). As a result of the hosting of the data and enterprise workloads in the cloud, customers (referred to as tenants herein) of the CSPs are requesting better security and isolation solutions for their workloads. In particular, customers are seeking out solutions that enable the operation of CSP-provided software outside of a TCB of the tenant's software. The TCB of a system refers to a set of hardware, firmware, and/or software components that have an ability to influence the trust for the overall operation of the system.

In implementations of the disclosure, a TD architecture and instruction set architecture (ISA) extensions (referred to herein as TD extensions (TDX)) for the TD architecture is provided to provide confidentiality (and integrity) for customer (tenant) software executing in an untrusted CSP infrastructure. The TD architecture, which can be a System-on-Chip (SoC) capability, provides isolation between TD workloads and CSP software, such as a virtual machine manager (VMM) of the CSP. Components of the TD architecture can include 1) memory encryption via a MK-Total Memory Encryption (MKTME) engine, 2) a resource management capability referred to herein as the trust domain resource manager (TDRM) (a TDRM may be a software extension of the Virtual Machine Monitor (VMM)), and 3) execution state and memory isolation capabilities in the processor provided via a CPU-managed Memory Ownership Table (MOT) and via CPU access-controlled TD control structures. The TD architecture provides an ability of the processor to deploy TDs that leverage the MK-TME engine, the MOT, and the access-controlled TD control structures for secure operation of TD workloads.

In one implementation, the tenant's software is executed in an architectural concept known as a TD. A TD (also referred to as a tenant TD) refers to a tenant workload (which can comprise an operating system (OS) alone along with other ring-3 applications running on top of the OS, or a virtual machine (VM) running on top of a VMM along with other ring-3 applications, for example). Each TD operates independently of other TDs in the system and uses logical processor(s), memory, and I/O assigned by the TDRM on the platform. Each TD is cryptographically isolated in memory using at least one exclusive encryption key of the MK-TME engine for encrypting the memory (holding code and/or data) associated with the trust domain.

In implementations of the disclosure, the TDRM in the TD architecture acts as a host for the TDs and has full control of the cores and other platform hardware. A TDRM assigns software in a TD with logical processor(s). The TDRM, however, cannot access a TD's execution state on the assigned logical processor(s). Similarly, a TDRM assigns physical memory and I/O resources to the TDs, but is not privy to access the memory state of a TD due to the use of separate encryption keys enforced by the processors per TD, and other integrity and replay controls on memory. Software executing in a TD operates with reduced privileges so that the TDRM can retain control of platform resources. However, the TDRM cannot affect the confidentiality or integrity of the TD state in memory or in the CPU structures under defined circumstances.

Conventional systems for providing isolation in virtualized systems do not extract the CSP software out of the tenant's TCB completely. Furthermore, conventional systems may increase the TCB significantly using separate chipset subsystems that implementations of the disclosure avoid. The TD architecture of implementations of the disclosure provides isolation between customer (tenant) workloads and CSP software by explicitly reducing the TCB by removing the CSP software from the TCB. Implementations provide a technical improvement over conventional systems by providing secure isolation for CSP customer workloads (tenant TDs) and allow for the removal of CSP software from a customer's TCB while meeting security and functionality requirements of the CSP. In addition, the TD architecture is scalable to multiple TDs, which can support multiple tenant workloads. Furthermore, the TD architecture described herein is generic and can be applied to any dynamic random-access memory (DRAM), or storage class memory (SCM)-based memory, such as Non-Volatile Dual In-line Memory Module (NVDIMM). As such, implementations of the disclosure allow software to take advantage of performance benefits, such as NVDIMM direct access storage (DAS) mode for SCM, without compromising platform security requirements.

FIG. 1 is a schematic block diagram of a computing system 100 that provides isolation in virtualized systems using TDs, according to an implementation of the disclosure. The virtualization system 100 includes a virtualization server 110 that supports a number of client devices 10IA-101 C. The virtualization server 110 includes at least one processor 112 (also referred to as a processing device) that executes a TDRM 180. The TDRM 180 may include a VMM (may also be referred to as hypervisor) that may instantiate one or more TDs 190A-190C accessible by the client devices 101A-101C via a network interface 170. The client devices 10IA-101 C may include, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device.

A TD may refer to a tenant (e.g., customer) workload. The tenant workload can include an OS alone along with other ring-3 applications running on top of the OS, or can include a VM running on top of a VMM along with other ring-3 applications, for example. In implementations of the disclosure, each TD may be cryptographically isolated in memory using a separate exclusive key for encrypting the memory (holding code and data) associated with the TD.

Processor 112 may include one or more cores 120 (also referred to as processing cores 120), range registers 130, a memory management unit (MMU) 140, and output port(s) 150. Processor 112 may be used in a system that includes, but is not limited to, a desktop computer, a tablet computer, a laptop computer, a netbook, a notebook computer, a PDA, a server, a workstation, a cellular telephone, a mobile computing device, a smart phone, an Internet appliance or any other type of computing device. In another implementation, processor 112 may be used in a SoC system.

The computing system 100 is representative of processing systems based on micro-processing devices available from Intel Corporation of Santa Clara, Calif., although other systems (including PCs having other micro-processing devices, engineering workstations, set-top boxes and the like) may also be used. In one implementation, sample system 100 executes a version of the WINDOWS' operating system available from Microsoft Corporation of Redmond, Wash., although other operating systems (UNIX and Linux for example), embedded software, and/or graphical user interfaces, may also be used. Thus, implementations of the disclosure are not limited to any specific combination of hardware circuitry and software.

The one or more processing cores 120 execute instructions of the system. The processing core 120 includes, but is not limited to, pre-fetch logic to fetch instructions, decode logic to decode the instructions, execution logic to execute instructions and the like. In an implementation, the computing system 100 includes a component, such as the processor 112 to employ execution units including logic to perform algorithms for processing data.

The virtualization server 110 includes a main memory 114 and a secondary storage 118 to store program binaries and OS driver events. Data in the secondary storage 118 may be stored in blocks referred to as pages, and each page may correspond to a set of physical memory addresses. The virtualization server 110 may employ virtual memory management in which applications run by the core(s) 120, such as the TDs 190A-190C, use virtual memory addresses that are mapped to guest physical memory addresses, and guest physical memory addresses are mapped to host/system physical addresses by MMU 140.

The core 120 may execute the MMU 140 to load pages from the secondary storage 118 into the main memory 114 (which includes a volatile memory and/or a nonvolatile memory) for faster access by software running on the processor 112 (e.g., on the core). When one of the TDs 190A-190C attempts to access a virtual memory address that corresponds to a physical memory address of a page loaded into the main memory 114, the MMU 140 returns the requested data. The core 120 may execute the VMM portion of TDRM 180 to translate guest physical addresses to host physical addresses of main memory and provide parameters for a protocol that allows the core 120 to read, walk and interpret these mappings.

In one implementation, processor 112 implements a TD architecture and ISA extensions (TDX) for the TD architecture. The TD architecture provides isolation between TD workloads 190A-190C and from CSP software (e.g., TDRM 180 and/or a CSP VMM (e.g., root VMM 180)) executing on the processor 112). Components of the TD architecture can include 1) memory encryption via MK-ME engine (memory encryption engine (MEE) or memory protection controller) 145 or other encryption engine, 2) a resource management capability referred to herein as the TDRM 180, and 3) execution state and memory isolation capabilities in the processor 112 provided via a MOT 160 and via access-controlled TD control structures (i.e., TDCS 124 and TDTCS 128). The TDX architecture provides an ability of the processor 112 to deploy TDs 190A-190C that leverage the MK-TME engine 145, the MOT 160, and the access-controlled TD control structures (i.e., TDCS 124 and TDTCS 128) for secure operation of TD workloads 190A-190C.

A physically unclonable function (PUF) circuit 146 responds to a challenge to provide a unique value. Note that while illustrated as a part of a processor 112, the PUF circuit 146 may be external to the processor 112. In some embodiments, it is a part of the MMU 140. In some embodiments, it is a part of the core(s) 120.

In implementations of the disclosure, the TDRM 180 acts as a host and has full control of the cores 120 and other platform hardware. A TDRM 180 assigns software in a TD 190A-190C with logical processor(s). The TDRM 180, however, cannot access a TD's 190A-190C execution state on the assigned logical processor(s). Similarly, a TDRM 180 assigns physical memory and I/O resources to the TDs 190A-190C, but is not privy to access the memory state of a TD 190A due to separate encryption keys, and other integrity and replay controls on memory.

With respect to the separate encryption keys, the processor may utilize the MK-TME engine 145 to encrypt (and decrypt) memory used during execution. With total memory encryption (TME), any memory accesses by software executing on the core 120 can be encrypted in memory with an encryption key. MK-TME is an enhancement to TME that allows use of multiple encryption keys (the number of supported keys is implementation dependent). The processor 112 may utilize the MKTME engine 145 to cause different pages to be encrypted using different MK-TME keys. The MK-TME engine 145 may be utilized in the TD architecture described herein to support one or more encryption keys per each TD 190A-190C to help achieve the cryptographic isolation between different CSP customer workloads. For example, when MK-TME engine 145 is used in the TD architecture, the CPU enforces by default that TD (all pages) are to be encrypted using a TD-specific key. Furthermore, a TD may further choose specific TD pages to be plain text or encrypted using different ephemeral keys that are opaque to CSP software. The MK-TME engine 145 may include storage for the one or more keys. In some embodiments, there is at least one fuse keys on die.

Each TD 190A-190C is a software environment that supports a software stack consisting of VMMs (e.g., using virtual machine extensions (VMX)), OSes, and/or application software (hosted by the OS). Each TD 190A-190C operates independently of other TDs 190A-190C and uses logical processor(s), memory, and I/O assigned by the TDRM 180 on the platform. Software executing in a TD 190A-190C operates with reduced privileges so that the TDRM 180 can retain control of platform resources; however, the TDRM cannot affect the confidentiality or integrity of the TD 190A-190C under defined circumstances.

Implementations of the disclosure are not limited to computer systems. Alternative implementations of the disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processing device (DSP), system on a chip, network computers (NetPC), set-top boxes, network hubs, wide area network (WAN) switches, or any other system that can perform one or more instructions in accordance with at least one implementation.

One implementation may be described in the context of a single processing device desktop or server system, but alternative implementations may be included in a multiprocessing device system. Computing system 100 may be an example of a 'hub' system architecture. The computing system 100 includes a processor 112 to process data signals. The processor 112, as one illustrative example, includes a complex instruction set computer (CISC) micro-processing device, a reduced instruction set computing (RISC) micro-processing device, a very long instruction word (VLIW) micro-processing device, a processing device implementing a combination of instruction sets, or any other processing device, such as a digital signal processing device, for example. The processor 112 is coupled to a processing device bus that transmits data signals between the processor 112 and other components in the computing system 100, such as main memory 114 and/or secondary storage 118, storing instruction, data, or any combination thereof. The other components of the computing system 100 may include a graphics accelerator, a memory controller hub, an I/O controller hub, a wireless transceiver, a Flash BIOS, a network controller, an audio controller, a serial expansion port, an I/O controller, etc. These elements perform their conventional functions that are well known to those familiar with the art.

In one implementation, processor 112 includes a Level 1 (L1) internal cache memory. Depending on the architecture, the processor 112 may have a single internal cache or multiple levels of internal caches. Other implementations include a combination of both internal and external caches depending on the particular implementation and needs. A register file is to store different types of data in various registers including integer registers, floating point registers, vector registers, banked registers, shadow registers, check-point registers, status registers, configuration registers, and instruction pointer register.

It should be noted that the execution unit may or may not have a floating-point unit. The processor 112, in one implementation, includes a microcode (ucode) ROM to store microcode, which when executed, is to perform algorithms for certain macroinstructions or handle complex scenarios. Here, microcode is potentially updateable to handle logic bugs/fixes for processor 112.

Alternate implementations of an execution unit may also be used in micro controllers, embedded processing devices, graphics devices, DSPs, and other types of logic circuits. System 100 includes a main memory 114 (may also be referred to as memory 114). Main memory 114 includes a DRAM device, a static random-access memory (SRAM) device, flash memory device, or other memory device. Main memory 114 stores instructions and/or data represented by data signals that are to be executed by the processor 112. The processor 112 is coupled to the main memory 114 via a processing device bus. A system logic chip, such as a memory controller hub (MCH) may be coupled to the processing device bus and main memory 114. An MCH can provide a high bandwidth memory path to main memory 114 for instruction and data storage and for storage of graphics commands, data and textures. The MCH can be used to direct data signals between the processor 112, main memory 114, and other components in the system 100 and to bridge the data signals between processing device bus, memory 114, and system I/O, for example. The MCH may be coupled to memory 114 through a memory interface. In some implementations, the system logic chip can provide a graphics port for coupling to a graphics controller through an Accelerated Graphics Port (AGP) interconnect.

The computing system 100 may also include an I/O controller hub (ICH). The ICH can provide direct connections to some I/O devices via a local I/O bus. The local I/O bus is a high-speed I/O bus for connecting peripherals to the memory 114, chipset, and processor 112. Some examples are the audio controller, firmware hub (flash BIOS), wireless transceiver, data storage, legacy I/O controller containing user input and keyboard interfaces, a serial expansion port such as Universal Serial Bus (USB), and a network controller. The data storage device can comprise a hard disk drive, a floppy disk drive, a CD-ROM device, a flash memory device, or other mass storage device.

For another implementation of a system, the instructions executed by the processing device core 120 described above can be used with a system on a chip. One implementation of a system on a chip comprises of a processing device and a memory. The memory for one such system is a flash memory. The flash memory can be located on the same die as the processing device and other system components. Additionally, other logic blocks such as a memory controller or graphics controller can also be located on a system on a chip.

Figure 2A:
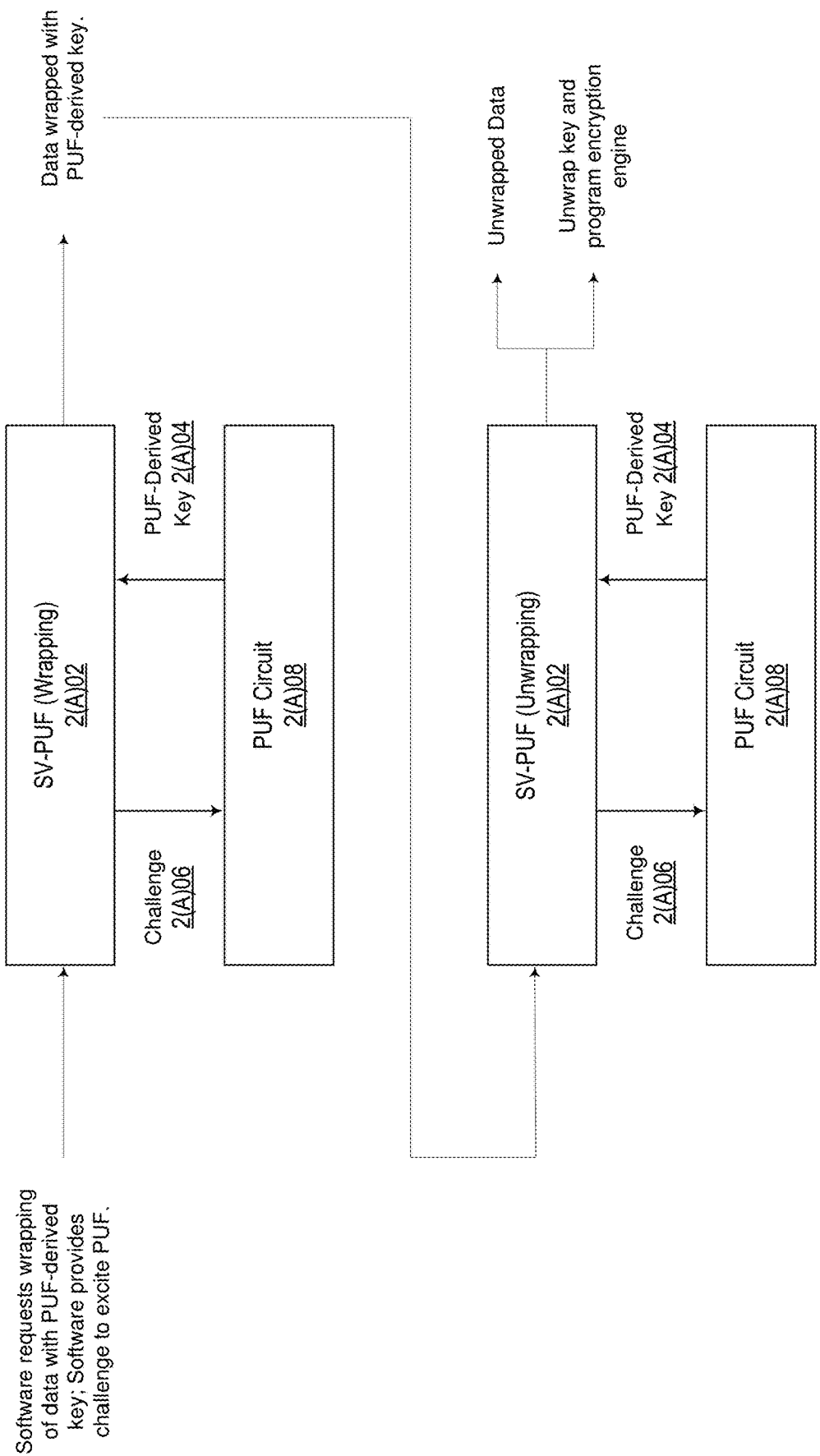
FIG. 2(A) illustrates an example of using a PUF to generate and use a key for wrapping and unwrapping data according to the present embodiments.

FIG. 2(A) illustrates an example of using a PUF to generate and use a key for wrapping and unwrapping data according to the present embodiments. Generally, an execution of a wrapping instruction according to the present embodiments receives data that is to be kept secure (may be referred to herein as a "secret"). The secret may be any information, for example, and without limitation, a password, an encryption key, etc. The wrapping instruction receives the secret as a part of an input and encrypts it using a PUF derived key. The input is updated and wrapped (e.g., encrypts and integrity-protects). In some embodiments, the output of the secret wrapping process (may be referred to herein as a "blob" or a "wrapped blob") is tied to a particular use. For example, a blob may be generated to protect a secret that software intends to retrieve at a later point in time. In another example, a blob can be generated to protect keys for programming to a cryptographic engine. As an example of this use, MKTME keys for persistent memory can be protected using the present ISA.

To use the secrets available in wrapped blobs, the present embodiments further provide for execution of an unwrapping instruction that receives, from software, the wrapped blob as an input operand and unwraps the blob (e.g., decrypts and verifies the integrity) and decrypts the secret using a PUF derived key. The retrieved secret is then returned to the software or programmed to a cryptographic engine, depending on the intended use, which is indicated by software to the instruction at the time of wrapping. In some embodiments, the wrapping instruction allows platform and processor configuration to be included in the wrapping, such that the unwrapping instruction will allow a blob to be unwrapped only if the platform and processor configuration desired at the time of wrapping is active at the time of unwrapping.

With further reference to FIG. 2(A), software requests, of a SV-PUF wrapping instruction of the SV-PUF ISA 2(A)02 according to the present embodiments, a encryption of a secret using a PUF-derived key 2(A)04. In addition to providing the secret to encrypt, the software also provides a challenge 2(A)06, which is used to generate the PUF-derived key 2(A)04 from the root PUF key (described below. As described in further detail below, in some embodiments the challenge 2(A)06 is a 256-bit random value chosen by the software, and it must be provided for both wrapping the secret and unwrapping the secret. Execution circuitry executing the wrapping instruction (described below in greater detail) of the SV-PUF ISA takes the input provided by the software in a memory structure and, using the challenge 2(A)06 provided by the software, excites a PUF circuit 2(A)08 to get the PUF-derived key 2(A)04 to be used to encrypt the secret. After retrieving the key 2(A)04 from the PUF circuit 2(A)08, the execution of the wrapping instruction uses the key 2(A)04 to encrypt the secret and integrity-protect a data structure containing encrypted secret to generate a wrapped blob. The wrapped blob is then returned to the software in a memory location provided by the software.

Later, when the software needs to use the secret, the software requests, an unwrapping instruction of the SV-PUF ISA 2(A)02, an unwrapping of the secret contained within the blob. The SV-PUF ISA 2(A)02 has multiple instructions for unwrapping in some embodiments, and the particular instruction invoked for a given unwrapping request from the software depends upon the use of the secret in that instance. In a first example where the software needs to retrieve the secret, a first unwrapping instruction of the SV-PUF ISA 2(A)02 receives the wrapped blob as an input operand and unwraps the secret by checking the integrity of the blob and decrypting it. The retrieved secret is then returned back to the software. In addition to providing the blob to unwrap, the software also provides the challenge 2(A)06, which is used to generate the PUF-derived key 2(A)04 from the root PUF key (described below) for unwrapping the blob.

In a second example, where the secret is to be used for programming to a cryptographic engine, such as where a persistent memory key is programmed to the MKTME engine using a wrapped blob, a second unwrapping instruction of the SV-PUF ISA 2(A)02 receives the wrapped blob as an input operand and unwraps data structure by checking the integrity of the blob and decrypting the secret data, but does not return the retrieved key(s) to the software. Instead, the key is programmed directly to the target cryptographic engine over an interface, thereby never exposing the key(s) in plaintext in memory. In addition to providing the blob to unwrap, the software also provides the challenge 2(A)06, which is used to generate the PUF-derived key 2(A)04 from the root PUF key (described below) for unwrapping the blob.

FIG. 2(B) illustrates an example process 2(6)02 for wrapping and unwrapping a secret according to the present embodiments. At 2(B)S04, software 2(6)06 requiring to protect a secret invokes an instruction, wrap (WRP described below), passing the data to wrap as an input operand to the SV-PUF instructions 2(A)02 along with the challenge 2(A)06. At 2(B)S08, the WRP instruction of the SV-PUF instructions 2(A)02 uses the challenge 2(A)06 as an input to the PUF circuit 2(A)08 to generate the unique PUF-derived key 2(A)04. In some embodiments, the PUF root key is mixed with the challenge 2(A)06 using a standard key derivation function (KDF). Further, in some embodiments, the PUF circuit 2(A)08 itself can provide multiple root keys for different uses. As an example, there can be one root key derived for standard platform uses (e.g., protecting fuses) and another root key for SV-PUF uses. The WRP instruction of the SV-PUF ISA 2(A)02 uses the challenge 2(A)06 to get the PUF-derived key 2(A)04, and uses the PUF-derived key 2(A)04 to encrypt and integrity-protect the secret at 2(B)S08. At 2(B)S10, the SV-PUF instructions 2(A)02 provides the wrapped blob as an output of the WRP instruction in a memory location specified by the software 2(6)06 and provided as an input to the WRP instruction. The software 2(6)06 retains the blob in memory when the secret it protects is not in use.

With further reference to FIG. 2(B), at 2(B)S12, when the software 2(6)06 needs access to the secret contained within the blob, the software 2(6)06 invokes another instruction, unwrap (UNWRP) (described below), passing the wrapped blob as an input operand to the SV-PUF instructions 2(A)02 along with the challenge 2(A)06. At 2(B)S14, the UNWRP instruction of the SV-PUF instructions 2(A)02 uses the challenge 2(A)06 along with the blob as an input to the PUF circuit 2(A)08 to retrieve the unique PUF-derived key 2(A)04 that was used to wrap the blob. The UNWRP instruction of the SV-PUF ISA 2(A)02 then uses the PUF-derived key 2(A)04 to decrypt the wrapped blob and verify its integrity at 2(B)S14. The integrity verification will only be successful if the wrapped blob passed by the software 2(6)06 at 2(B)S12 is unmodified as compared to the wrapped blob that the SV-PUF instructions 2(A)02 provided to the software 2(6)06 at 2(B)S10. If the integrity verification is successful, the unwrapped data is returned back to the software at 2(B)S16.

FIG. 2(C) illustrates another example process for wrapping and unwrapping a secret according to the present embodiments. In the embodiment of FIG. 2(C), the software 2(6)06 programs an encryption key to a hardware block on the platform. One non-limiting example of such a use is programming keys for persistent memory to the MKTME engine. In this use, during a provisioning phase, which can happen when a user receives his or her employer-issued computer at the IT center in an enterprise environment, the key to be used for persistent memory encryption is encrypted using a PUF-derived key similar to the embodiment described above with reference to FIG. 2(B). Acts 2(C)S04, 2(C)S08, and 2(C)S10, use the WRP instruction as previously described above with reference to steps 2(B)S04, 2(B)S08, and 2(B)S10, respectively.

With further reference to FIG. 2(C), at 2(C)S12, when the software 2(C)06 wants to program the key (e.g., on each reboot to set up the persistent memory key), the software 2(C)06 invokes another instruction, PCONFIG (described below), passing the wrapped blob as an input operand to the SV-PUF ISA 2(A)02 along with the challenge 2(A)06. At 2(C)S14, the PCONFIG instruction of the SV-PUF instructions 2(A)02 unwraps and verifies the integrity of the blob, as described above at 2(B)S14. However, in this embodiment, instead of returning the decrypted secret back to the software 2(C)06, at 2(C)S16 the key is programmed to the key programming target 2(C)18 (e.g., an encryption engine) over an interface. In this way, the key is advantageously never exposed in memory beyond the provisioning phase, which typically happens only once during the lifetime of the platform. At 2(B)S20, the SV-PUF instructions 2(A)02 returns a response of successful/failed programming to the requesting software 2(C)06.

Figure 22A:
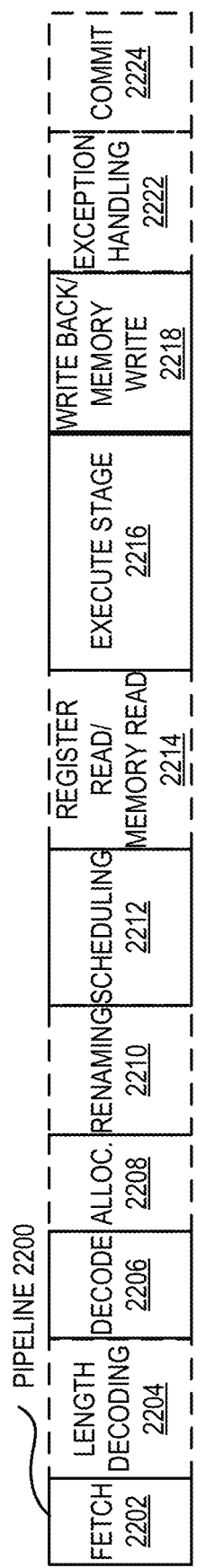
FIG. 22(A) is a functional block diagram illustrating both an example in-order pipeline and an example register renaming, out-of-order issue/execution pipeline according to the present embodiments.
Figure 22B:
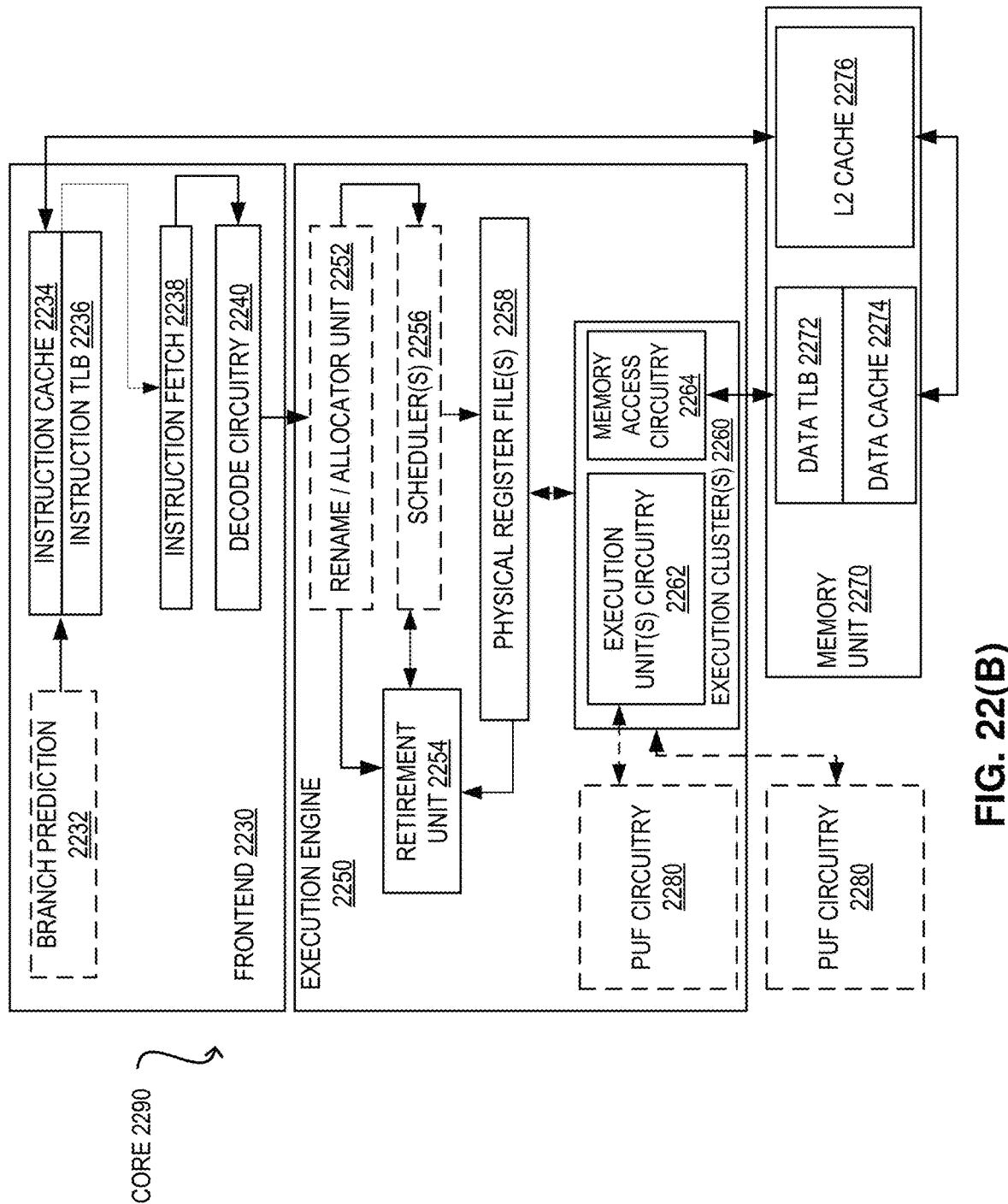
FIG. 22(B) is a functional block diagram illustrating both an example in-order architecture core and an example register renaming, out-of-order issue/execution architecture core to be included in a processor according to the present embodiments.

In some embodiments, the ISA (e.g., WRP, UNWRP, UNWRPMAC, PCONFIG) is executed by the execution cluster(s) 2260 of the execution engine 2250 of the processor core 2290 (FIG. 22(B)). For example, the execution units circuitry 2262 may execute the present ISA to communicate with the PUF circuitry 2280, passing the challenge 2(A)06 to the PUF circuitry 2280 and receiving the PUF-derived key 2(A)04 from the PUF circuitry 2280. In some embodiments, the PUF circuitry 2280 may be part of the execution engine 2250, while in other embodiments the PUF circuitry 2280 may be external to the execution engine 2250.

Figure 3:
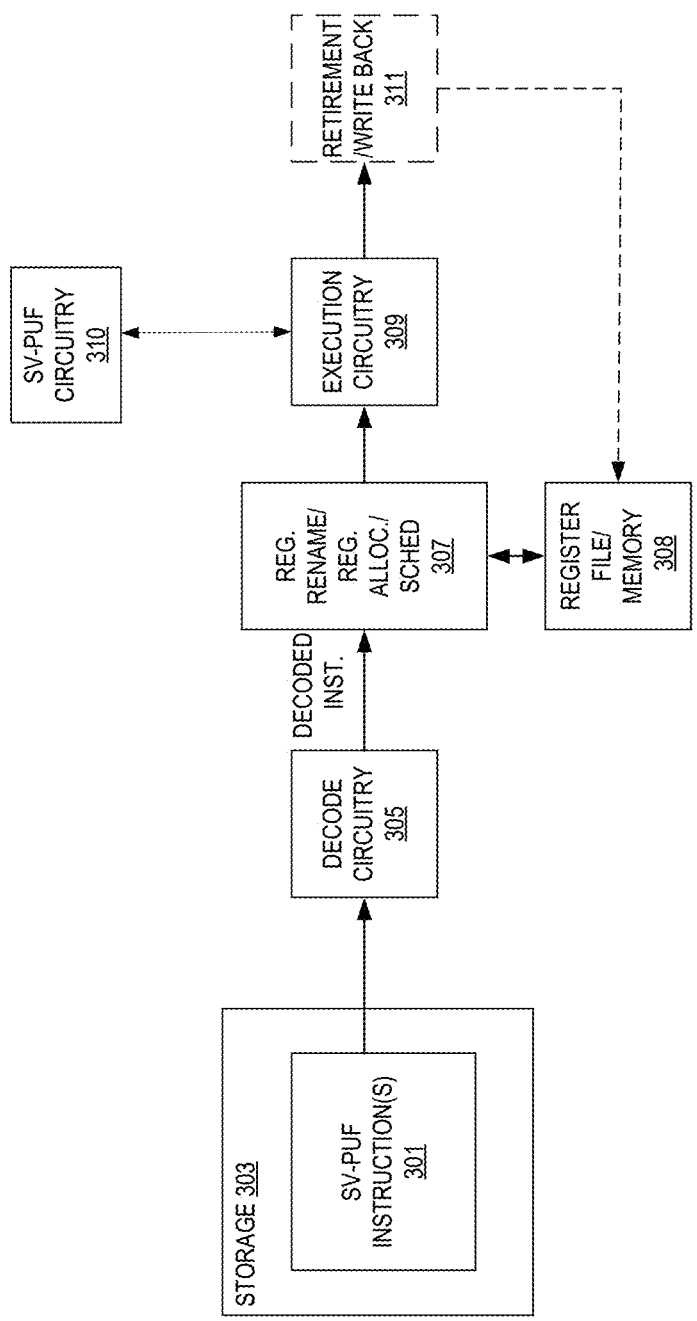
FIG. 3 illustrates embodiments of hardware to process an instruction, such as a SV-PUF instruction.

FIG. 3 illustrates embodiments of hardware to process an instruction, such as a SV-PUF instruction. As illustrated, storage 303 stores a SV-PUF instruction 301 to be executed.

The instruction 301 is received by decode circuitry 305. For example, the decode circuitry 305 receives this instruction from fetch logic/circuitry. The instruction includes fields for an opcode, first and second sources, and a destination. In some embodiments, the sources and destination are registers, and in other embodiments one or more are memory locations. In some embodiments, the opcode details which arithmetic operation(s) is/are to be performed.

More detailed embodiments of at least one instruction format will be detailed later. The decode circuitry 305 decodes the instruction into one or more operations. In some embodiments, this decoding includes generating a plurality of micro-operations to be performed by execution circuitry (such as execution circuitry 309). The decode circuitry 305 also decodes instruction prefixes.

In some embodiments, register renaming, register allocation, and/or scheduling circuitry 307 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

Registers (register file) and/or memory 308 store data as operands of the instruction to be operated on by execution circuitry 309. Example register types include packed data registers, general purpose registers, and floating-point registers.

Execution circuitry 309 executes the decoded instruction (e.g., a SV-PUF instruction). Example detailed execution circuitry is shown in other figures, including at least FIG. 22. The execution of the decoded SV-PUF instruction causes the execution circuitry to perform the act(s) indicated by the opcode of the instruction. For some of the instructions, the execution circuitry 309 interacts with SV-PUF circuitry 310 (if that circuitry is not included in the execution circuitry 309. In some embodiments, the SV-PUF circuitry 310 is a part of a core. In some embodiments, the SV-PUF circuitry 310 is external to a core.

In some embodiments, retirement/write back circuitry 311 architecturally commits the destination register into the registers or memory 308 and retires the instruction.

A first instruction of the SV-PUF ISA is a wrapping instruction (WRP). An execution of a WRP instruction causes data to be encrypted using a key generated by a SV-PUF. In some embodiments, the WRP instruction is associated with a most-privileged protection ring (e.g., ring-0). Therefore, when the software invokes the WRP instruction, a confirmation may be needed to determine that the software has the necessary privileges before completing the wrapping process. To invoke the WRP instruction, the software passes, to the SV-PUF WRP instruction, an input memory buffer location, an output memory buffer location, and the challenge to be provided to the PUF to generate the wrapping key. The WRP instruction operates using BIND_STRUCT (described below) as an input and output structure, which allows specification of target-specific data. In some embodiments, the WRP instruction identifies three operands. A source operand is to store a location of a source (input) BIND_STRUCT. A first destination operand is to store an operation status of the execution of the WRP instruction. A second destination operand is to store a location of a destination (output) BIND_STRUCT.

In some embodiments, one or more of the identified operands are registers (e.g., RAX, RBC, RCX, etc.). In some embodiments, one or more of the identified operands are memory locations. The location of the structs is provided by an address in some embodiments. For example, the first source operand stores an address for the input struct, etc. The WRP instruction affects the following flags or condition codes in some embodiments, a zero flag, a carry flag, a parity flag, an overflow flag, an adjust flag, and/or a sign flag. The zero flag (ZF) is cleared on a successful wrap, and set to 1 otherwise whereas CF, PF, AF, OF, and SF are always cleared.

The WRP instruction includes one or more fields to be used to encode an opcode. The opcode is to indicate that execution circuitry is to encrypt at least encrypt secret information from the input data structure with a PUF generated wrapping key, bind the wrapped secret information to a target, update the input data structure, generate a MAC over the updated data structure, store the MAC in the input data structure to generate an output data structure, store an output data structure having the wrapped secret information and an indication of the target according to the second destination operand's usage for the instruction. An operational stats may be updated too.

The table below shows the structure of BIND_STRUCT, and the fields of BIND_STRUCT are described just below the table.

Tying the wrapped data to a particular use enhances the security of the data wrapping process, as further described below.

Figure 4:
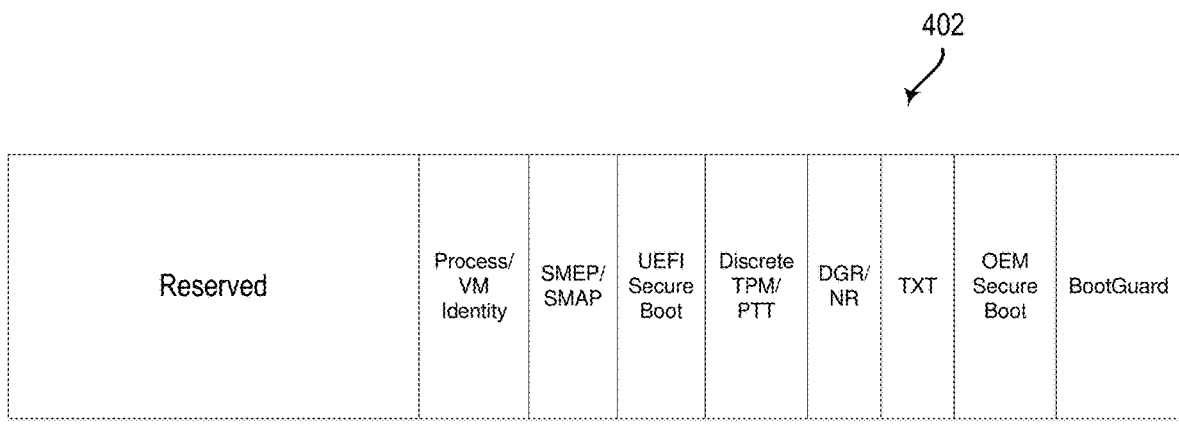
FIG. 4 is a functional block diagram illustrating a bitvector representing a platform/processor configuration to which the wrapped data is to be bound.

FIG. 4 is a functional block diagram illustrating a bitvector representing a platform/processor configuration to which the wrapped data is to be bound. The fields in the bitvector 402 indicate whether the corresponding program is active or inactive, and the state of the bit positions collectively indicates a platform/processor configuration. In some embodiments, the WRP instruction microcode uses this bitvector 402 during the wrapping process and binds the blob to the configuration indicated by the bitvector 402 by including it in the MAC generated on the output BIND_STRUCT (Table 1). In some embodiments, the execution of the WRP instruction does not do any checks, but the unwrapping instructions (e.g., UNWRP, UNWRPMAC, and/or PCONFIG) check for platform/processor configurations and only allow unwrapping if the configuration that the

| Field | Offset (Bytes) | Size (Bytes) | Input/ Output | Description | Integrity Protected? | Confidentiality Protected? |
|---|---|---|---|---|---|---|
| BIND_STRUCT | | | | | | |
| MAC | 0 | 16 | Output | MAC on BIND_STRUCT | N/A | N/A |
| BTID | 16 | 4 | Input | Target for wrapping (e.g., MKTME engine) | Y | N |
| RSVD | 20 | 4 | Input | RSVD, must be zero | Y | N |
| SEQID | 24 | 8 | Output | Seed for generating initialization vector (IV) | Y | N |
| RSVD | 32 | 32 | Input | RSVD, must be zero | Y | N |
| BTENCDATA | 64 | 64 | Input/ Output | Target-specific encrypted data | Y | Y |
| BTDATA | 128 | 128 | Input | Target-specific data (challenge) | Y | N |

Note that the MAC is generated on a data structure having generated SEQID, encrypted BTENCDATA (or a portion of that data), BTDATA, and reserved fields which is what it is not integrity protected (it provides that protection). In some embodiments, the MAC is generated using a GHASH function.

MAC: This field is a Message Authentication Code over the data structure generated by the WRP instruction. The software does not populate this field. Therefore, on the input side this field may be empty.

A message authentication code (MAC) is a cryptographic checksum on data that uses a session key to detect both accidental and intentional modifications of the data. A MAC requires two inputs: a message and a secret key known only to the originator of the message and its intended recipient(s). This allows the recipient of the message to verify the integrity of the message and authenticate that the message's sender has the shared secret key. If a sender does not know the secret key, the hash value would then be different, which would tell the recipient that the message was not from the original sender.

BTID: This field is a target for wrapping, and is populated by the software. There be one or more targets for the uses according to the present embodiments. Examples include a CPU (or core), a memory encryption engine, etc.

software provided (as part of BTDATA (detailed below) in BIND_STRUCT) is active at the time of unwrapping. Therefore, the software checks the current platform/processor configuration before requesting binding to ensure that it doesn't bind secrets to a configuration that is not active on the platform. Binding done for an inactive configuration will result in a blob that cannot be unwrapped to retrieve the secret(s). For example, if a platform firmware verification program (e.g., Intel Boot Guard) was not enabled at the time of wrapping, and the software requested binding without first verifying that Boot Guard was enabled, then the UNWRP instruction will disallow unwrapping the blob if Boot Guard is not enabled at unwrapping time.

As another example embodiment, the WRP instruction allows wrapping to the software identity (e.g., process identity, enclave measurement, virtual machine/trust domain measurement). The execution of the WRP instruction, if requested to bind to the identity of the software, picks the identity from hardware and includes it in the MAC generated. On unwrapping, the execution of the unwrapping instruction uses the identity from hardware to verify the MAC. If the software unwrapping a blob does not own the blob, the unwrapping will fail.

SEQID: This field is an initialization vector used for authenticated encryption performed by the WRP instruction.

In some embodiments, microcode randomly generates this vector and uses it for encryption and MAC generation. This field is later used during the unwrapping process to decrypt and verify the MAC.

BTENCDATA: This field carries the data (secret) that the software is requesting to be wrapped. As an example, for MKTME key programming, this field carries two keys: A data encryption key, and a tweak key to be used for encryption using Advanced Encryption Standard (AES) in XTS mode (XEX-based tweaked-codebook mode with ciphertext stealing). In some embodiments, each key can be up to 256b in size. Advantageously, the software can cryptographically protect any amount of data using a key, and then use the present SV-PUF ISA to protect the key, thereby allowing arbitrarily large amounts of data to be protected with the SV-PUF.

BTDATA: This field carries information such as the challenge to be used by the PUF circuit to generate the key, and a configuration vector to indicate, to the WRP instruction, the platform and processor configuration to be included with the data wrapping. In some embodiments, this field may include one or more sub-fields that control the data wrapping using the PUF-derived key. For example, and as shown the table below, there may be two sub-fields: 1) The challenge used to generate the PUF-derived key, and 2) A bit vector to carry the platform/processor configuration to which the wrapped data is to be bound.

| BTDATA | | | |
| --- | --- | --- | --- |
| Field | Offset (Bytes) | Size (Bytes) | Description |
| USER_SUP_CHALLENGE | 0 | 32 | User-supplied challenge used to obtain wrapping key from PUF |
| PLATFORM_CPU_CONFIG | 32 | 8 | Bit vector to identify platform and processor configurations to bind to |
| RSVD | 40 | 24 | RSVD, must be zero |

FIG. 5 illustrates an embodiment of method performed by a processor to process a WRP instruction. For example, a processor core as shown in FIG. 22(B), a pipeline as detailed, etc. performs this method. At 501, a single WRP instruction is fetched. For example, a WRP instruction is fetched. The WRP instruction includes fields for an opcode, a first destination operand which is to store an operation status of the execution of the WRP instruction, a source operand which is to store or encode a location (e.g., address) of an input/source BIND_STRUCT, and a destination operand which is to store or encode a location (e.g., address) of an output/destination location. Note that in some embodiments, one or more of the BIND_STRUCTS are stored in one or more registers and in some embodiments one or more of the BIND_STRUCTS are stored in one or more registers. In some embodiments, the WRP instruction further includes a field for a writemask. In some embodiments, the WRP instruction is fetched from an instruction cache. The opcode is to indicate that execution circuitry is to encrypt at least encrypt secret information from the input data structure with a PUF generated encryption key, bind the wrapped secret information to a target, update the input data structure, generate a MAC over the updated data structure, store the MAC in the input data structure to generate a wrapped output data structure, store the wrapped output data structure having the encrypted secret information and an indication of the target according to the second destination operand's usage for the instruction. Additionally, the operational status of execution is stored in the identified first destination operand.

In some embodiments, the execution circuitry is to encrypt data from the input data structure using a key generated by a PUF and store the encrypted data in an output data structure, wherein a challenge to excite the PUF is found in the input data structure, and store an operation status in the identified first destination operand. In some embodiments, the encryption is performed by using the generated key and a temporary value used as an initial vector for a cryptography engine. In some embodiments, a MAC is computed using the PUF generated key over the entire input data structure (including updates to SEQID and encrypted data) and stored in an output data structure (which is the updated input data structure). Note that in some embodiments, the entire input data structure is copied into the output data structure prior to other operations (however, some fields may be overwritten).

In some embodiments, the fetched single instruction is translated into one or more instructions of a different instruction set architecture prior to decoding at 502. Executing of the one or more instructions of the different instruction set architecture is to be functionally equivalent as the executing according to the opcode of the single instruction The fetched single instruction (or translated instruction(s)) is/are decoded at 503. For example, the fetched WRP instruction is decoded by decode circuitry such as that detailed herein.

Data values associated with the source operand of the decoded instruction is retrieved at 505. For example, when one or more of the source operands are memory operands, the data from the indicated memory location is retrieved.

At 507, the decoded instruction (or translated instruction(s)) is/are executed by execution circuitry (hardware) such as that detailed herein. For the WRP instruction, the execution will cause execution circuitry to execute the decoded instruction according to the opcode to at least encrypt secret information from the input data structure with a PUF generated encryption key, bind the wrapped secret information to a target, update the input data structure, generate a MAC over the updated data structure, store the MAC in the input data structure to generate a wrapped output data structure, store the wrapped output data structure having the encrypted secret information and an indication of the target according to the second destination operand's usage for the instruction encrypt.

In some embodiments, the execution circuitry is to encrypt data from the input data structure using a key generated by a PUF and store the encrypted data in the input data structure (which will be made to be the output data structure), wherein a challenge to excite the PUF is found in the input data structure, and store an operation status in the identified first destination operand. In some embodiments, the encryption is performed by using the generated key and a temporary value used as an initial vector as input to a cryptography engine. The initial vector is stored as the SEQID in the output data structure. In some embodiments, a MAC is computed using the PUF generated key over the entire data structure and is stored in the output data structure. Note that in some embodiments, the entire input data structure is copied into the output data structure prior to other operations (however, some fields may be overwritten such as the SEQID, MAC, BTENCDATA).

In some embodiments, the instruction is committed or retired at 509.

Figure 6B:
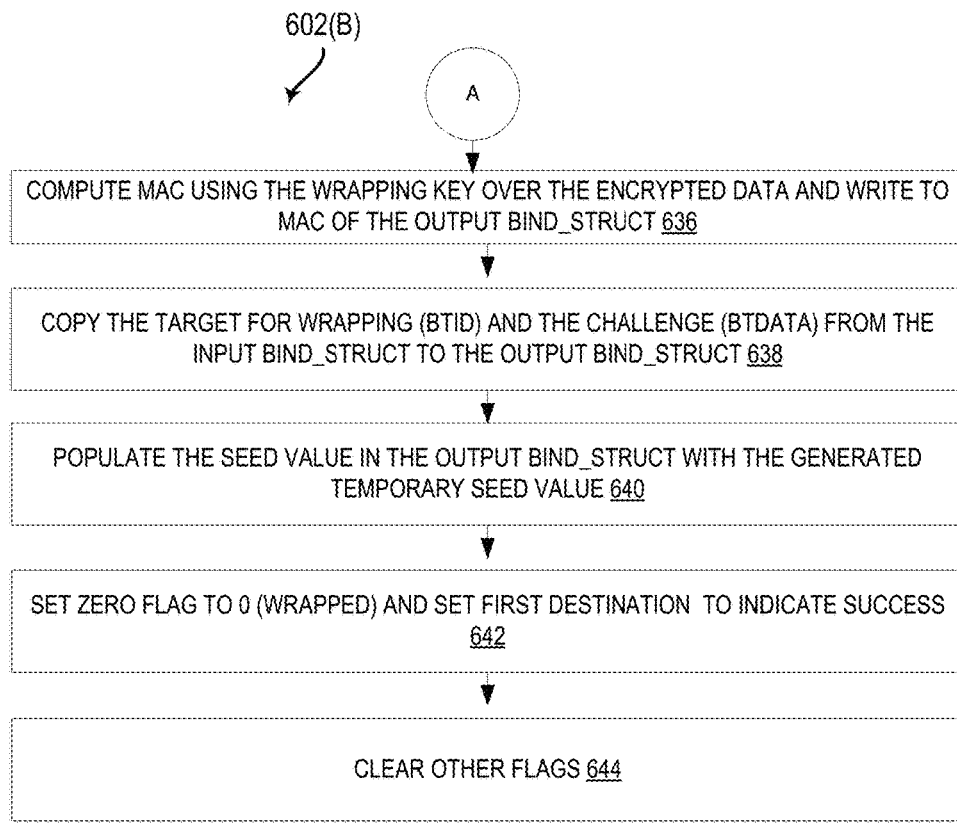
FIGS. 6(A)-(B) illustrate a method for the execution of a wrap (WRP) instruction according to the present embodiments.
Figure 6A:
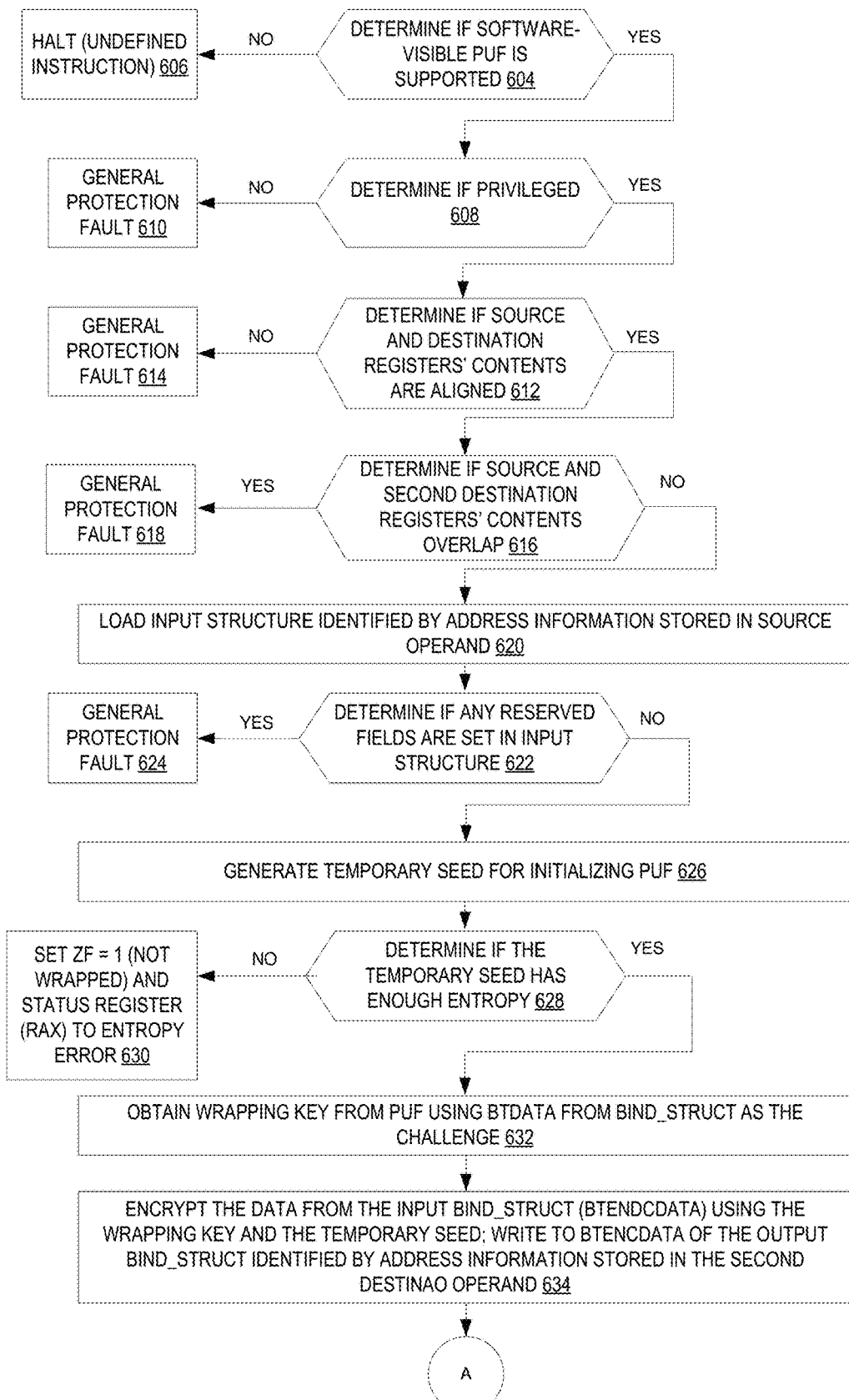

FIG. 6 illustrates a method for the execution of a wrap (WRP) instruction according to the present embodiments. Note the execution may be performed by execution circuitry and/or SV-PUF circuitry. A determination of whether the SV-PUF is supported is made at 604. In some embodiments, this aspect is set in a model specific register (MSR). If it is determined that the SV-PUF is not supported, then the execution halts at 606 due to an undefined instruction. If, however, it is determined that the SV-PUF is supported, then the execution advances to 608 where it is determined whether the software requesting wrapping is privileged (e.g., ring-0). If it is determined that the software requesting wrapping is not privileged, then the execution exits at 610 due to a general protection fault. If, however, it is determined that the software requesting wrapping is privileged, then the execution advances to 612, where it is determined whether the contents of the source and destination registers are aligned. If it is determined that the contents of the source and destination registers are not aligned, then the process exits at 614 due to a general protection fault. If, however, it is determined that the contents of the source and second destination registers are aligned, then the process advances to 616, where it is determined whether the contents of the source and destination registers overlap. If it is determined that the contents of the source and destination registers overlap, then the process exits at 618 due to a general protection fault. If, however, it is determined that the contents of the source and destination registers do not overlap, then the process advances to 620, where the input structure identified by the address information stored in the source operand (e.g., RBX) is loaded into memory. The process 602 then advances to 622.

At 622, it is determined whether any reserved fields are set in the input structure identified by the address information stored in the source operand. If it is determined that there are reserved fields set in the input structure identified by the address information stored in the source operand, then the process exits at 624 due to a general protection fault. If, however, it is determined that there are no reserved fields set in the input structure identified by the address information stored in the source operand, then the process advances to 626, where a temporary seed for encryption is generated (for example, using a hardware number generator). The process 602 then advances to 628.

At 628, it is determined whether the temporary seed has enough entropy (randomness). If it is determined that the temporary seed does not have enough entropy, then the process advances to 630 where the zero flag is set to 1, to indicate that the data was not wrapped, and the status register (e.g., RAX) is set to indicate an entropy error. If, however, it is determined that the temporary seed has enough entropy, then the process advances to 632, where the wrapping key is obtained from the PUF using the challenge stored in the BTDATA field of BIND_STRUCT. The process 602 then advances to 634.

At 634, the data from the BTENDCDATA field of the input BIND_STRUCT is encrypted using the wrapping key and the temporary seed from the SEQID field of the input BIND_STRUCT. The encrypted data is then written to the BTENDCDATA field of the output BIND_STRUCT identified by address information stored in the second destination operand (e.g., RCX).

At 636, the MAC is computed using the wrapping key over the encrypted data, and the MAC is then written to the MAC field of the output BIND_STRUCT.

At 638, the target for wrapping (BTID) and the challenge (BTDATA) are copied from their respective fields in the input BIND_STRUCT to their respective fields in the output BIND_STRUCT.

At 640, the seed value in the output BIND_STRUCT is populated with the generated temporary seed value.

At 642, the zero flag is set to 0, indicating that the data was successfully wrapped, and the destination register (e.g., RAX) is set to indicate success.

At 644, all other flags are cleared.

FIG. 7 illustrates embodiments of pseudocode for the execution of the WRP instruction.

Generally, the UNWRP instruction allows for the decryption of the data contained within wrapped blobs generated by the WRP instruction. The UNWRP instruction takes the wrapped blob, unwraps the blob (confirms the MAC is correct, for example), and returns the decrypted secret. If the software passes a different unwrapping target (indicated by BTID in BIND_STRUCT) to the UNWRP instruction, the unwrapping process will fail. Advantageously, at wrapping time the BTID is included as a part of the MAC. Therefore, untrusted software cannot change the BTID to use a blob for a purpose different from the one specified at wrapping time. In other words, the WRP instruction ensures the wrapped data is bound to the target.

In some embodiments, the UNWRP instruction is associated with a most-privileged protection ring (e.g., ring-0). Therefore, when the software invokes the UNWRP instruction, the SV-PUF ISA may confirm that the software has the necessary privileges before completing the wrapping process. To invoke the UNWRP instruction, the software passes the wrapped blob that was generated using the WRP instruction, a pointer to an output buffer that will receive the unwrapped data, and the challenge to be provided to the PUF to generate the unwrapping key. The UNWRP instruction operates using BIND_STRUCT (described above) as the input structure, which allows specification of target-specific data.

The UNWRP instruction operates using BIND_STRUCT (described below) as an input and output structure, which allows specification of target-specific data. In some embodiments, the UNWRP instruction identifies three operands. A source operand is to store a location of a source (input) wrapped BIND_STRUCT. A second destination operand is to store a location of a destination (output) unwrapped BIND_STRUCT. A first destination operand is to store an operation status of the execution of the UNWRP instruction. The UNWRP instruction affects the following flags: ZF is cleared on a successful unwrap, and set to 1 otherwise; CF, PF, AF, OF, and SF are always cleared.

Figure 8:
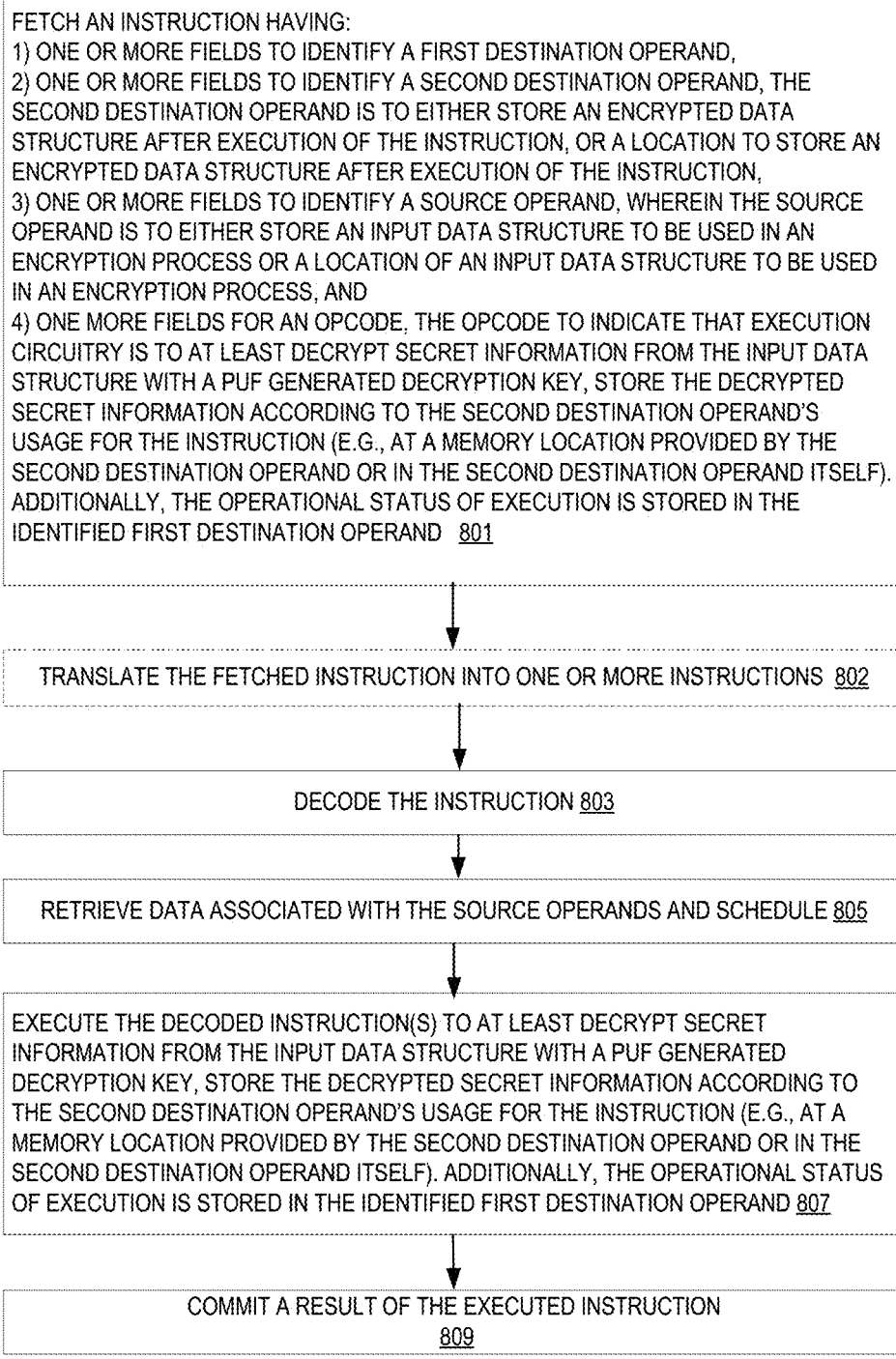
FIG. 8 illustrates embodiments of processing an UNWRP instruction.

FIG. 8 illustrates embodiments of processing an UNWRP instruction. The processing utilizes one or more of execution circuitry, PUF circuitry, encryption circuitry, and/or MAC circuitry.

At 801, a single UNWRP instruction is fetched. For example, a UNWRP instruction is fetched. The UNWRP instruction includes fields for an opcode, a first destination operand which is to store an operation status of the execution of the UNWRP instruction, a source operand which is to store or encode a location (e.g., address) of an input/source BIND_STRUCT, and a destination operand which is to store or encode a location (e.g., address) of an output/destination location. Note that in some embodiments, one or more of the BIND_STRUCTS are stored in one or more registers and in some embodiments one or more of the BIND_STRUCTS are stored in one or more registers. In some embodiments, the UNWRP instruction further includes a field for a writemask. In some embodiments, the UNWRP instruction is fetched from an instruction cache. The opcode is to indicate that execution circuitry is to at least decrypt secret information from the input data structure with a puf generated decryption key, store the decrypted secret information according to the second destination operand's usage for the instruction (e.g., at a memory location provided by the second destination operand or in the second destination operand itself). additionally, the operational status of execution is stored in the identified first destination operand. Additionally, the operational status of execution is stored in the identified first destination operand.

In some embodiments, the execution circuitry is to decrypt data from the input data structure using a key generated by a PUF and store the decrypted data in the output data structure, wherein a challenge to excite the PUF is found in the input data structure, and store an operation status in the identified first destination operand. In some embodiments, the decryption is performed by providing the generated key and a sequence ID from the input data structure to a cryptography engine. In some embodiments, the input data structure is first verified using a MAC comparison. For example, a MAC is computed by removing the MAC from the input data structure and then generating a MAC on the remaining data. The MAC of the input data structure and generated MAC are then compared to determine if any data of the wrapped blob has changed. Note that in some embodiments, the entire input data structure is copied into the output data structure prior to other operations.

In some embodiments, the fetched single instruction is translated into one or more instructions of a different instruction set architecture prior to decoding at 802. Executing of the one or more instructions of the different instruction set architecture is to be functionally equivalent as the executing according to the opcode of the single instruction The fetched single instruction (or translated instruction(s)) is/are decoded at 803. For example, the fetched UNWRP instruction is decoded by decode circuitry such as that detailed herein.

Data values associated with the source operand of the decoded instruction is retrieved at 805. For example, when one or more of the source operands are memory operands, the data from the indicated memory location is retrieved.

At 807, the decoded instruction (or translated instruction(s)) is/are executed by execution circuitry (hardware) such as that detailed herein. For the UNWRP instruction, the execution will cause execution circuitry to execute the decoded instruction according to the opcode to at least decrypt secret information from the input data structure with a puf generated decryption key, store the decrypted secret information according to the second destination operand's usage for the instruction (e.g., at a memory location provided by the second destination operand or in the second destination operand itself). additionally, the operational status of execution is stored in the identified first destination operand. Additionally, the operational status of execution is stored in the identified first destination operand.

In some embodiments, the execution circuitry is to decrypt data from the input data structure using a key generated by a PUF and store the decrypted data in the output data structure, wherein a challenge to excite the PUF is found in the input data structure, and store an operation status in the identified first destination operand. In some embodiments, the decryption is performed by providing the generated key and a sequence ID from the input data structure to a cryptography engine. In some embodiments, the input data structure is first verified using a MAC comparison. For example, a MAC is computed by removing the MAC from the input data structure and then generating a MAC on the remaining data. The MAC of the input data structure and generated MAC are then compared to determine if any data of the wrapped blob has changed. Note that in some embodiments, the entire input data structure is copied into the output data structure prior to other operations.

In some embodiments, the instruction is committed or retired at 809.

Figure 9A:
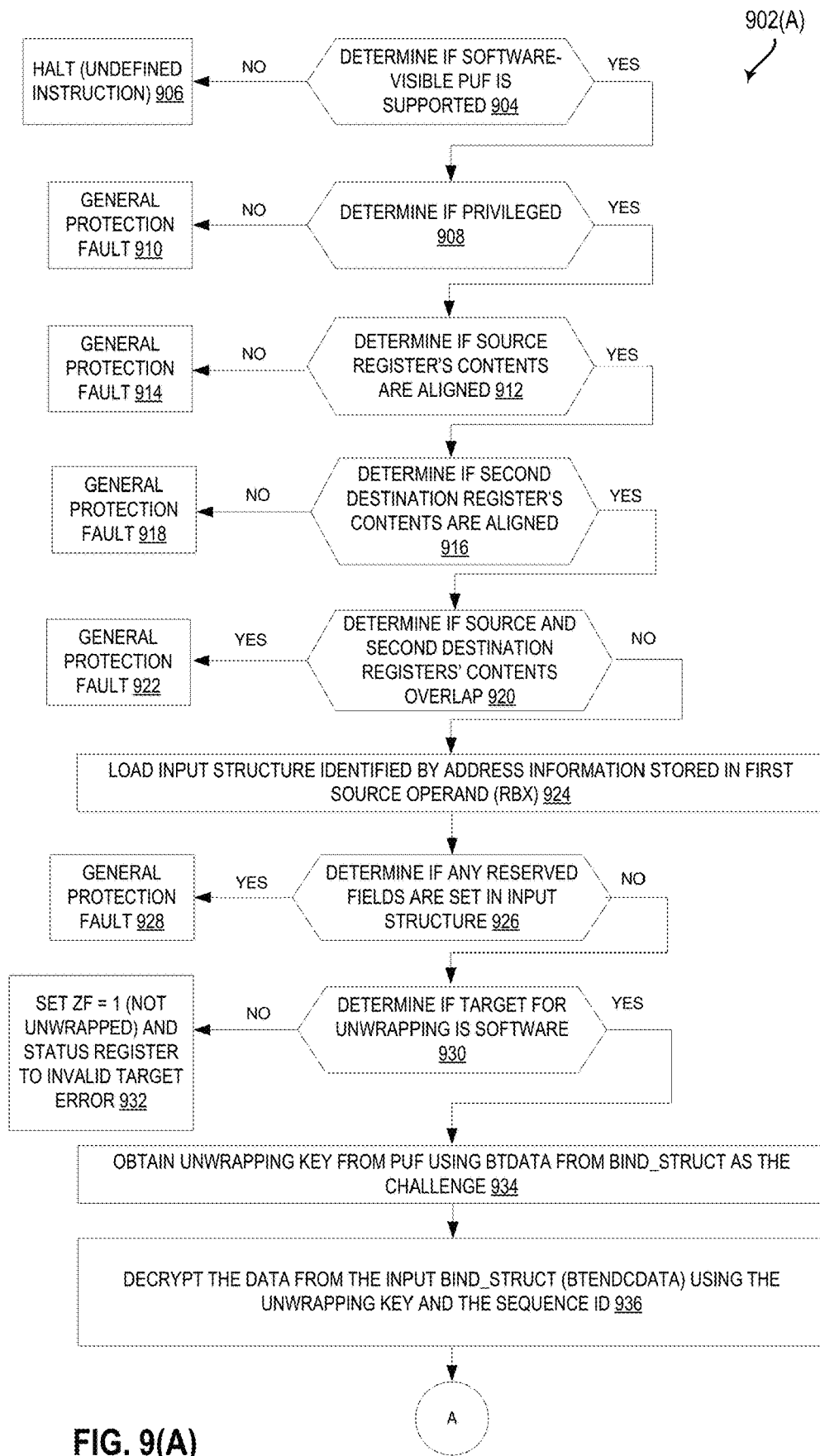
FIGS. 9(A)-(B) illustrate a method performed by a processor to execute an unwrap (UNWRP) instruction according to the present embodiments.
Figure 9B:
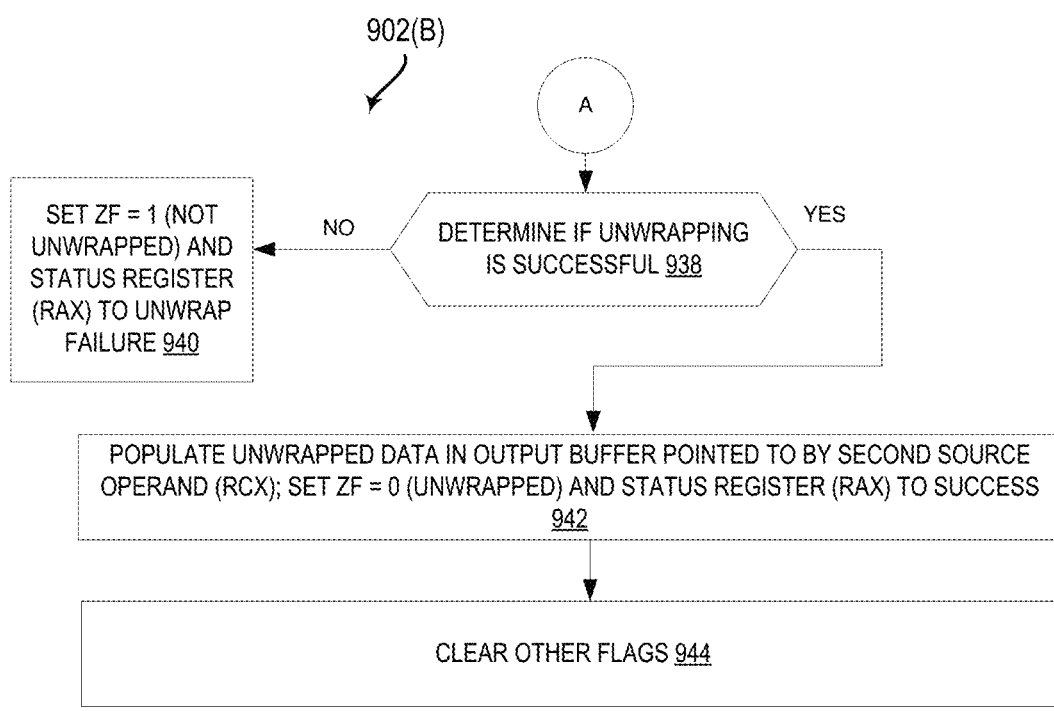

FIG. 9 illustrates a method 902 performed by a processor to execute an unwrap (UNWRP) instruction according to the present embodiments. Note that an SV-PUF circuit is also involved for the generation of the key. At 904 it is determined whether the SV-PUF is supported. In some embodiments, this aspect is set in a model specific register (MSR). If it is determined that the SV-PUF is not supported, then the process halts at 906 due to an undefined instruction. If, however, it is determined that the SV-PUF is supported, then the process advances to 908, where it is determined whether the software requesting wrapping is privileged (e.g., ring-0). If it is determined that the software requesting wrapping is not privileged, then the process exits at 910 due to a general protection fault. If, however, it is determined that the software requesting wrapping is privileged, then the process advances to 912, where it is determined whether the contents of the source register are aligned. If it is determined that the contents of the source register are not aligned, then the process exits at 914 due to a general protection fault. If, however, it is determined that the contents of the source register are aligned, then the process advances to 916, where it is determined whether the contents of the second destination register are aligned.

If it is determined that the contents of the source register are not aligned, then the process exits at 918 due to a general protection fault. If, however, it is determined that the contents of the destination register are aligned, then the process advances to 920, where it is determined whether the contents of the source and second destination registers overlap.

If it is determined that the contents of the source and destination registers overlap, then the process exits at 922 due to a general protection fault. If, however, it is determined that the contents of the source and destination registers do not overlap, then the process advances to 924, where the input structure identified by the address information stored in the first source operand (e.g., RBX) is loaded into memory. The process 902 then advances to 926.

At 926, it is determined whether any reserved fields are set in the input structure identified by the address information stored in the first source operand. If it is determined that there are reserved fields set in the input structure identified by the address information stored in the first source operand, then the process exits at 928 due to a general protection fault. If, however, it is determined that there are no reserved fields set in the input structure identified by the address information stored in the first source operand, then the process advances to 930, where it is determined whether the unwrapping target (e.g., indicated by BTID in BIND_STRUCT) is the software. If it is determined that the unwrapping target is not the software, then the process advances to 932 where the zero flag is set to 1, to indicate that the data was not unwrapped, and the status register (first destination such as RAX) is set to indicate an invalid target error. If, however, it is determined that the unwrapping target is the software, then the process advances to 934, where the unwrapping key is obtained from the PUF using the challenge stored in the BTDATA field of BIND_STRUCT. The process 902 then advances to 936.

At 936, the data from the BTENDCDATA field of the input BIND_STRUCT is decrypted using the unwrapping key and the SEQID field of the input BIND_STRUCT. The process 902 then advances to 938.

At 938, it is determined whether the unwrapping is successful. If it is determined that the unwrapping is not successful (e.g., because of a MAC mismatch), then the process advances to 940 where the zero flag is set to 1, to indicate that the data was not unwrapped, and the status register (e.g., RAX) is set to indicate an unwrap failure. If, however, it is determined that the unwrapping is successful (e.g., because of a MAC match), then the process advances to 942, where the unwrapped data is written to the output buffer identified by address information stored in the second source operand (e.g., RCX), the zero flag is set to 0, indicating that the data was successfully unwrapped, and the destination register (e.g., RAX) is set to indicate success. The process 902 then advances to 944, where all other flags are cleared.

FIG. 10 illustrates embodiments of pseudocode for the execution of the UNWRP instruction.

In some embodiments, an unwrapping instruction includes a way to point to the wrapped with the device identity/key and includes an identifier of a 64-bot input which can be used to provide the identity challenge received from the server. In addition, this unwrapping instruction (using opcode mnemonic UNWRPMAC) also takes an input to control the signing algorithm.

If a different usage blob (indicated by BTID) is passed to UNWRPMAC, the unwrapping will fail. Note that at wrapping time, the BTID is included as part of the MAC and hence untrusted software cannot just change the BTID to use blob for one usage for another usage. In other words, the WRP instruction ensures binding to the target/usage. An output of the UNWRPMAC instruction is a signed response.

In some embodiments, the UNWRPMAC instruction is a ring 0 instruction. In some embodiments, the UNWRPMAC instruction utilizes four operands: 1) a source/destination operand which as a source provides an identity challenge for a SV-PUF circuit to generate a key and as a destination is store an operation status after execution; 2) a first source which is to provide an indication of a signature algorithm to use (note this source may be a register, memory location, or an encoded immediate); 3) a second source which is to store or encode a location (e.g., register or memory location) of an input structure holding an (un)wrapping key to use during execution; and 4) a destination operand that is to store or encode a location (e.g., register or memory location) of where a signed response generated during execution is to be placed. The execution of the UNWRPMAC instruction may clear the ZF when successful (or set to 1 otherwise), and clear other flags of a condition code or flags register.

Figure 11:
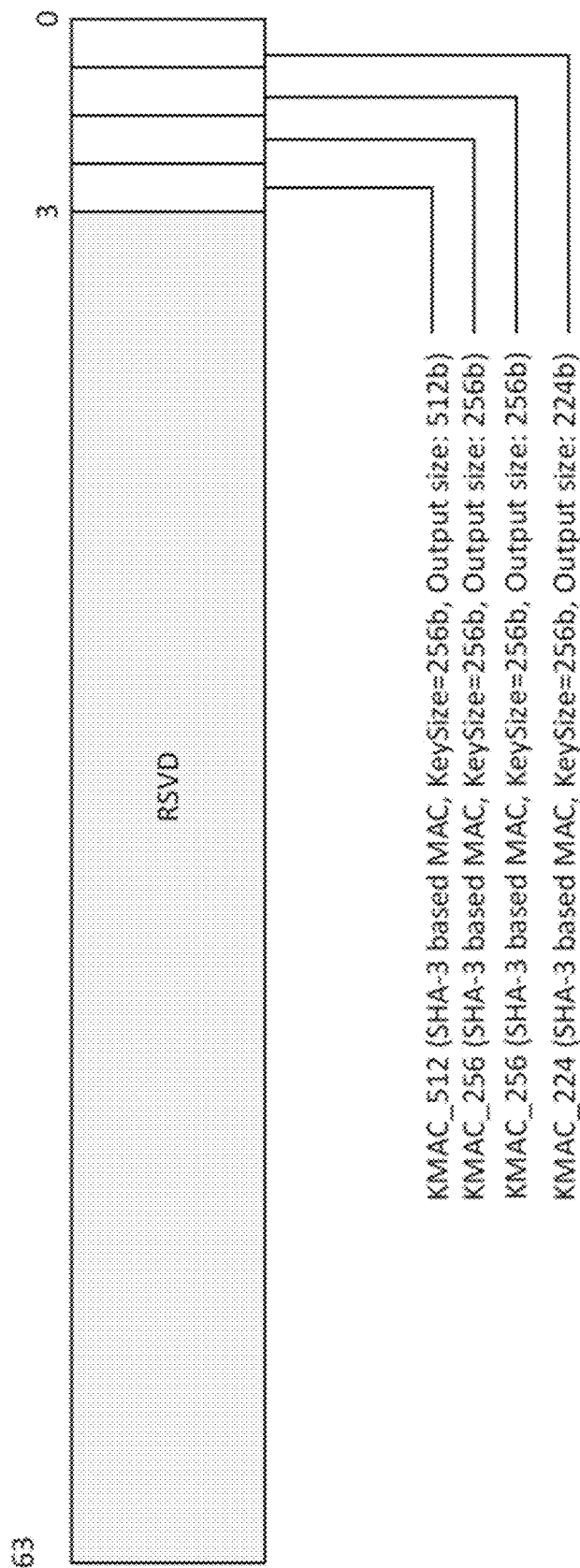
FIG. 11 illustrates embodiments of a signature data structure used to define which signing algorithm is to be used during the execution of UNWRPMAC.

FIG. 11 illustrates embodiments of a signature data structure used to define which signing algorithm is to be used during the execution of UNWRPMAC. As shown, this signature control data structure is a bitvector with each bit position representing a signature function (e.g., MAC generation function). In this example, there are fours SHA-3 based MAC functions having varying output sizes (e.g., from 224-bit to 512-bit). In some embodiments, a generated output will be padded to 512-bit. In some embodiments the signature control data structure is stored in a register as a MSR or GPR. In some embodiments, the signature control data structure is encoded in an immediate of an instruction. In some embodiments the signature control data structure is stored in a memory location.

FIG. 12 illustrates embodiments of processing an UNWRPMAC instruction. At 1201, a single UNWRPMAC instruction is fetched. For example, a UNWRPMAC instruction is fetched. The UNWRPMAC instruction includes one or more fields for an opcode, one or more fields to identify a source/destination operand which as a source provides an identity challenge for a SV-PUF circuit to generate a key and as a destination is store an operation status after execution, one or more fields to identify a first source operand which is to provide an indication of a signature algorithm to use, one or more fields to identify a second source operand which is to store or encode a location of an input data structure to hold an (un)wrapping key to use during execution and data to be decrypted, and one or more fields to identify a destination operand that is to store or encode a location of where a signed response generated during execution is to be placed. The opcode is to indicate that execution circuitry is to is to at least decrypt secret information from the input data structure of the second source operand with a PUF generated wrapping key, generate a signed response of the unwrapped secret information using the identity challenge of the source/destination operand according to the signature algorithm indicated by the first source operand, and store the signed response in the identified destination. Additionally, the operational status of execution is stored in the identified source/destination operand.

In some embodiments, the fetched single instruction is translated into one or more instructions of a different instruction set architecture prior to decoding at 1202. Executing of the one or more instructions of the different instruction set architecture is to be functionally equivalent as the executing according to the opcode of the single instruction The fetched single instruction (or translated instruction(s)) is/are decoded at 1203. For example, the fetched UNWRPMAC instruction is decoded by decode circuitry such as that detailed herein.

Data values associated with the source operand of the decoded instruction is retrieved at 1205. For example, when one or more of the source operands are memory operands, the data from the indicated memory location is retrieved.

At 1207, the decoded instruction (or translated instruction(s)) is/are executed by execution circuitry (hardware) such as that detailed herein. For the UNWRPMAC instruction, the execution will cause execution circuitry to execute the decoded instruction according to the opcode is to at least decrypt secret information from the input data structure of the second source operand with a PUF generated key, generate a signed response of the decrypted secret information using the identity challenge of the source/destination operand according to the signature algorithm indicated by the first source operand, and store the signed response in the identified destination. Additionally, the operational status of execution is stored in the identified source/destination operand.

In some embodiments, the decryption is performed by providing the generated key and a sequence ID from the input data structure to a cryptography engine. In some embodiments, the input data structure is first verified using a MAC comparison. For example, a MAC is computed by removing the MAC from the input data structure and then generating a MAC on the remaining data. The MAC of the input data structure and generated MAC are then compared to determine if any data of the wrapped blob has changed.

Note that in some embodiments, the entire input data structure is copied into the output data structure prior to other operations.

In some embodiments, the instruction is committed or retired at 1209.

Figure 13A:
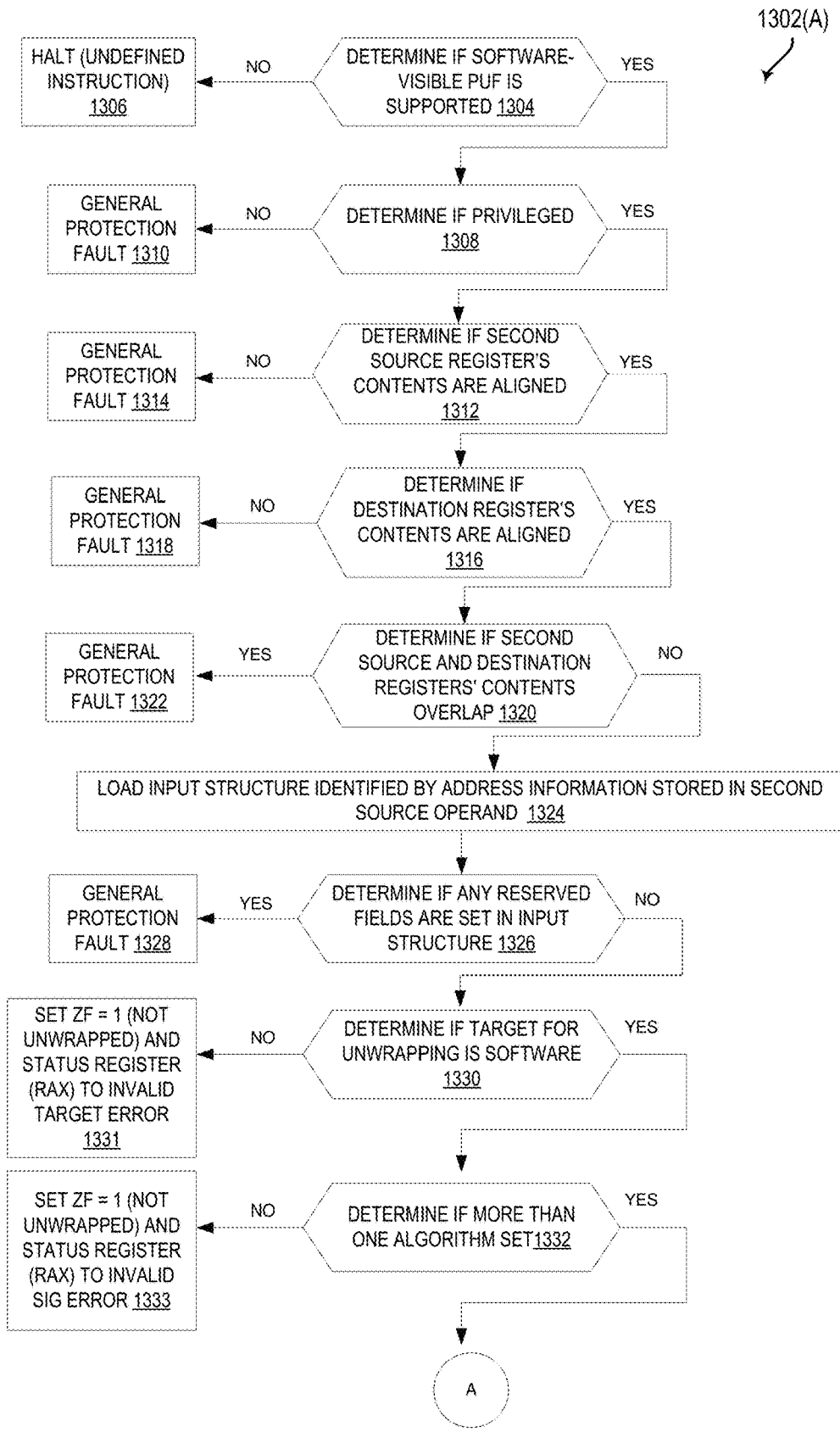
FIGS. 13(A)-(B) illustrate a method 1302 performed by a processor to process an UNWRPMAC instruction according to the present embodiments.
Figure 13B:
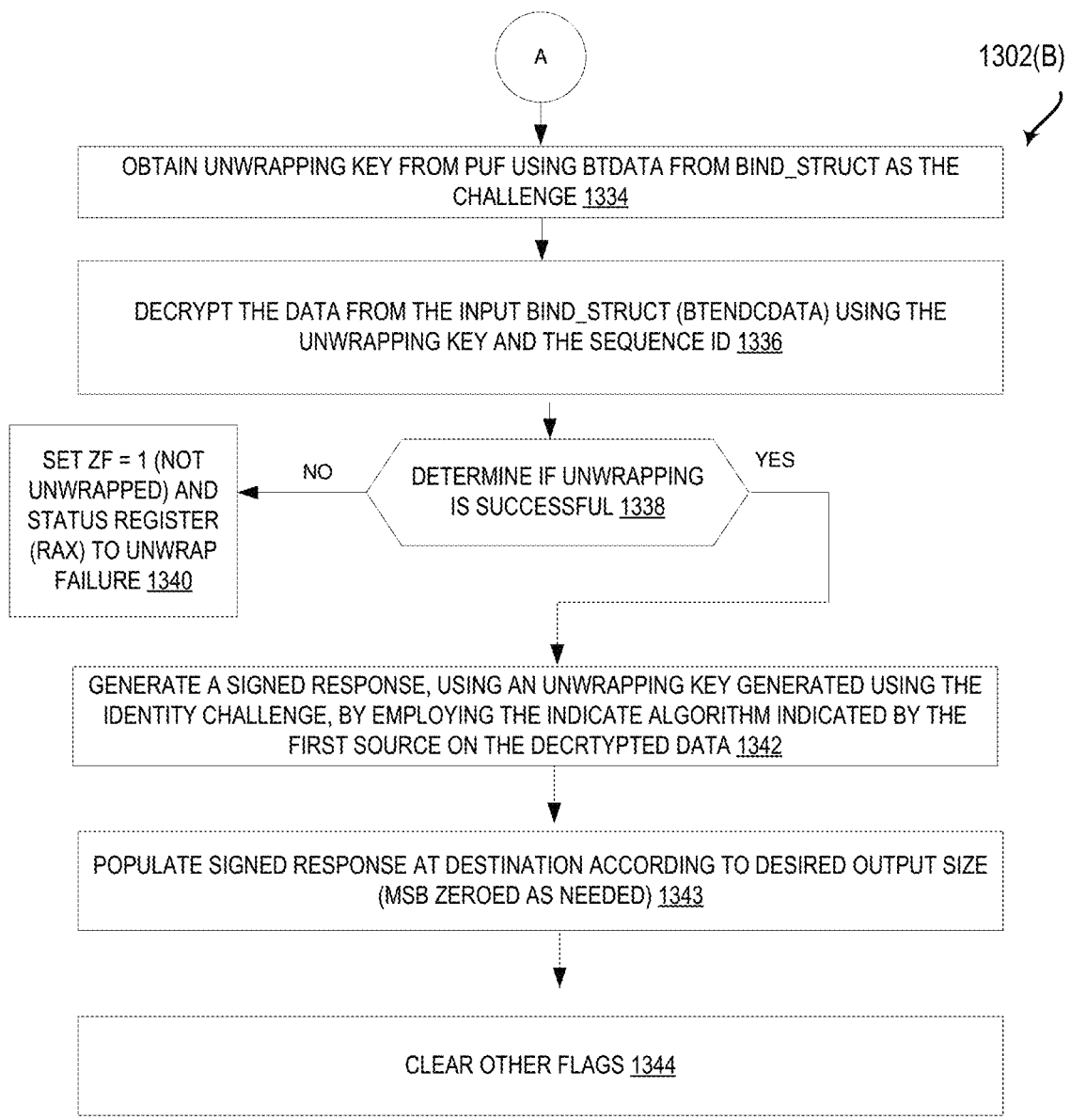

FIG. 13 illustrates a method 1302 performed by a processor to process an unwrapmac instruction according to the present embodiments. Note that an SV-PUF circuit is also involved for the generation of the key. At 1304 it is determined whether the SV-PUF is supported. In some embodiments, this aspect is set in a model specific register (MSR). If it is determined that the SV-PUF is not supported, then the process halts at 1306 due to an undefined instruction. If, however, it is determined that the SV-PUF is supported, then the process advances to 1308, where it is determined whether the software requesting wrapping is privileged (e.g., ring-0). If it is determined that the software requesting wrapping is not privileged, then the process exits at 1310 due to a general protection fault. If, however, it is determined that the software requesting wrapping is privileged, then the process advances to 1312, where it is determined whether the contents of the second source register are aligned. If it is determined that the contents of the source register are not aligned, then the process exits at 1314 due to a general protection fault. If, however, it is determined that the contents of the source register are aligned, then the process advances to 1316, where it is determined whether the contents of the destination register are aligned.

If it is determined that the contents of the source register are not aligned, then the process exits at 1318 due to a general protection fault. If, however, it is determined that the contents of the destination register are aligned, then the process advances to 1320, where it is determined whether the contents of the second source and destination registers overlap.

If it is determined that the contents of the source and destination registers overlap, then the process exits at 1322 due to a general protection fault. If, however, it is determined that the contents of the source and destination registers do not overlap, then the process advances to 1324, where the input structure identified by the address information stored in the second source operand (e.g., RBX) is loaded into memory. The process 1302 then advances to 1326.

At 1326, it is determined whether any reserved fields are set in the input structure identified by the address information stored in the first source operand. If it is determined that there are reserved fields set in the input structure identified by the address information stored in the first source operand, then the process exits at 1328 due to a general protection fault. If, however, it is determined that there are no reserved fields set in the input structure identified by the address information stored in the first source operand, then the process advances to 1330, where it is determined whether the unwrapping target (e.g., indicated by BTID in BIND_STRUCT) is the software. If it is determined that the unwrapping target is not the software, then the process advances to 1331 where the zero flag is set to 1, to indicate that the data was not unwrapped, and the source/destination (e.g., status register such as RAX) is set to indicate an invalid target error. If, however, it is determined that the unwrapping target is the software, then the process advances to 1332 where a determination of if more than one algorithm is set in the first source operand. If more than algorithm is set, then the zero flag is set to 1 and the status in the source/destination is set to invalid signature. When only one algorithm is set, the flow continues to 1334, where the unwrapping key is obtained from the PUF using the challenge stored in the BTDATA field of BIND_STRUCT as the challenge. The process 1302 then advances to 1336.

At 1336, the data from the BTENDCDATA field of the input BIND_STRUCT is decrypted using the unwrapping key and the SEQID field of the input BIND_STRUCT. The process 1302 then advances to 1338.

At 1338, it is determined whether the unwrapping is successful. If it is determined that the unwrapping is not successful (e.g., because of a MAC mismatch), then the process advances to 1340 where the zero flag is set to 1, to indicate that the data was not unwrapped, and the source/destination (e.g., RAX) is set to indicate an unwrap failure. If, however, it is determined that the unwrapping is successful (e.g., because of a MAC match), then the process advances to 1342, where a signed response is generated, using a key generated by the identify challenge of the source/destination, according to the algorithm indicated by the first source. Note the key may be generated by providing the identity challenge to an SV-PUF.

The signed response is populated at the indicated destination at 1343. In some embodiments, the signed response is padded such that the size is 512-bit.

The process 1302 then advances to 1344, where all other flags are cleared.

Figure 14:
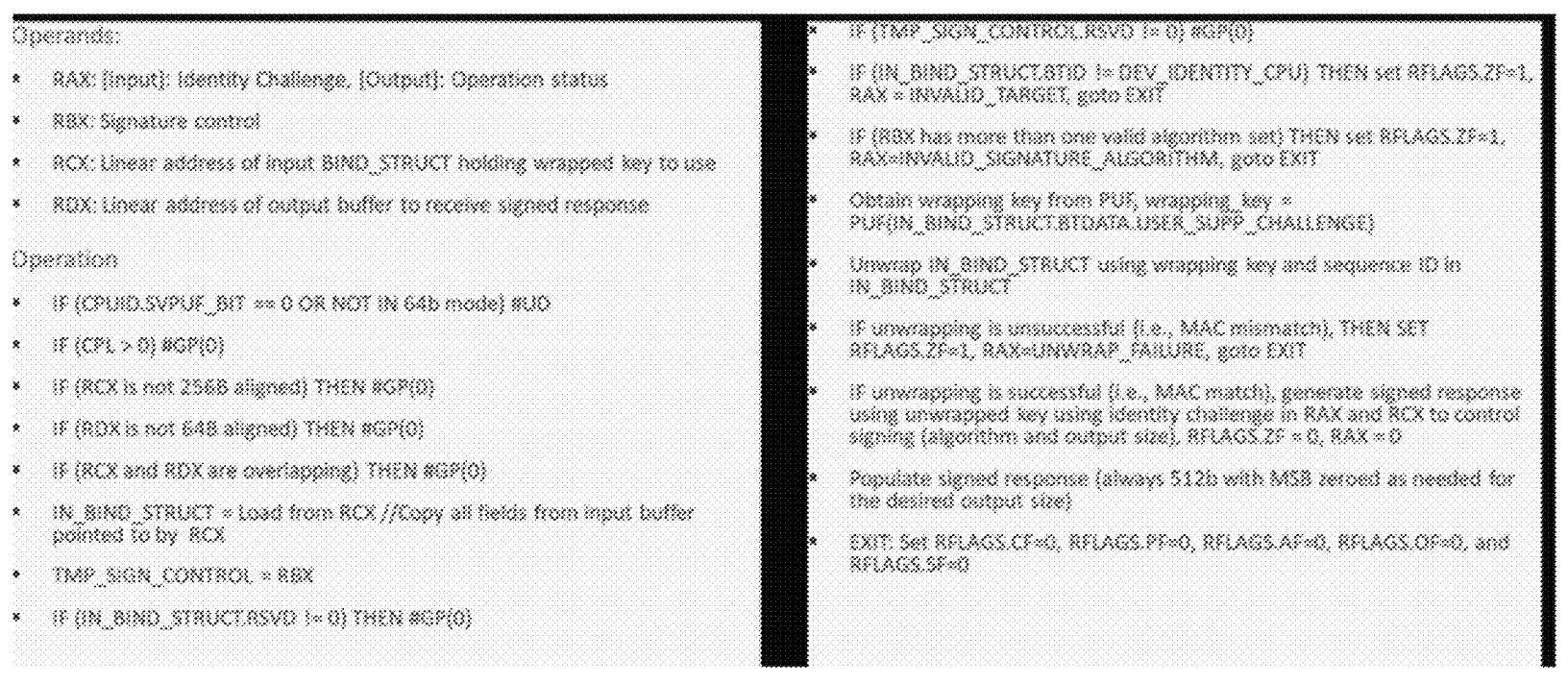

FIG. 14 illustrates embodiments of pseudocode for the execution of an UNWRPMAC instruction.

In some embodiments, protected domains may be defined and/or configured using a processor instruction implemented by a processor, such as the "platform configuration" (PCONFIG) instruction described in connection with FIG. 15 and throughout this disclosure. The PCONFIG instruction, for example, may be used to define and/or configure a protected domain by programming a new entry—or modifying an existing entry—in a key table of memory a security engine. The key table including keyIDs, keys, and an indication of usage for the keys (or lack thereof). In this manner, protected domains can be defined and configured programmatically (e.g., by management software) using the PCONFIG instruction.

Figure 15:
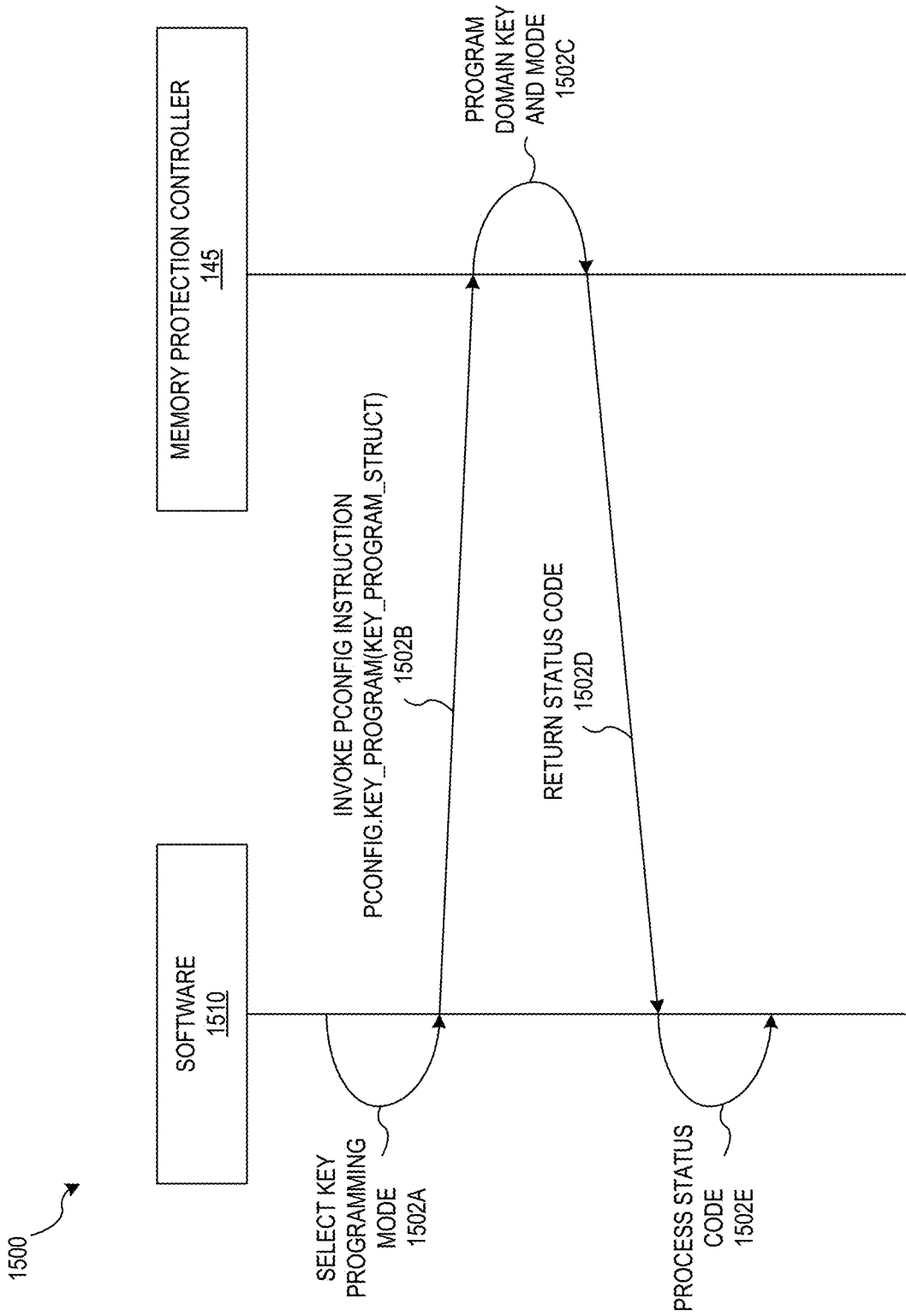
FIG. 15 illustrates an example of configuring a protected domain using a configuration instruction.

FIG. 15 illustrates an example of configuring a protected domain using a processor instruction. In some embodiments, for example, a processor may implement an instruction that can be used to configure the protected domains associated with a memory protection system. For example, the processor instruction could be a "platform configuration" (PCONFIG) instruction, a "trusted platform action supervisor" (TPAS) instruction, and/or any other suitable type of instruction.

A "platform configuration" (PCONFIG) instruction, for example, may be used to define and/or configure a protected domain by programming a new entry—or modifying an existing entry—in a domain key table of a memory protection controller (e.g., a domain key table of a memory encryption engine). In this manner, protected domains can be defined and configured programmatically using the PCONFIG instruction. Once a protected domain has been configured using the PCONFIG instruction, memory addresses associated with the protected domain are protected in the manner specified by the configuration for the protected domain. For example, when using encryption protection, data is encrypted before being written to memory addresses within the protected domain, and data read from memory addresses within the protected domain is decrypted before being returned to the requesting processor.

In some embodiments, the PCONFIG instruction may require a certain privilege level or privilege ring. For example, the processor may support a hierarchy of privilege levels or privilege rings to restrict access to certain resources. In some embodiments, privilege ring 0 may be the least restrictive level, while privilege rings with higher numbers may be increasingly more restrictive. For example, privilege ring 0 may be used for system management software (e.g., the operating system kernel and device drivers), while privilege ring 3 may be used for userland applications. Accordingly, in some embodiments, the PCONFIG instruction may be a ring-0 instruction that can only be used by software executing in the highest privilege ring (e.g., management software used to configure protected domains). Alternatively, or additionally, the PCONFIG instruction may be a ring-3 instruction that can be used by any userland application to configure its own protected domain.

The opcode of the PCONFIG instruction is to indicate execution circuitry is to execute one or more functions for configuring platform features. In some embodiments, there are explicit operands for the PCONFIG instruction, but there are multiple implicit operands. In particular, a first register (e.g., EAX) stores an indication of a leaf function to be invoked and one or more other registers (e.g., RBX, RCX, and/or RDX) are used for leaf-specific purposes. Note that leaves allow for the single instruction to perform different functions based on the values of these registers.

For the description below, the PCONFIG function to perform is to support MKTME key programming using a wrapped blog, or other encryption engine programming using a wrapped blob. In some embodiments, the first register is set to a value other than 0 or 1. In some embodiments, one of the "other" registers (e.g., RBX) indicates a keyID control value and another of these registers (e.g., RCX) provides an address of a wrapped BIND_STRUCT. The keyID control value is used to The illustrated example identifies the call flow between software 1510 performing domain configuration using the PCONFIG instruction and a memory security engine 145. Memory security engine 145 may include any engine, controller, or other component that provides cryptographic memory protection. Software 1510 may include any software used to configure the domains protected by memory security engine, such as a virtual machine manager and/or other management software. The illustrated call flow begins by software 1510 selecting a key programming mode for programming an encryption key for a particular domain (call 1502a). For example, as discussed further below, software 1510 may directly specify a key for the domain, or may request that a random key be generated. Software 1510 may then invoke the PCONFIG processor instruction to perform the domain configuration (call 1502b). When the PCONFIG instruction is invoked, memory security engine is programmed for the key and protection mode for the particular domain (call 1502c). Memory security engine then returns a status code to software 1510 (call 1502d), and the status code is then processed by software 1510 (call 1502e).

In some embodiments, the PCONFIG instruction may support various leaf functions for configuring and managing protected domains. When the PCONFIG instruction is executed, for example, the particular leaf function to invoke may be specified in a hardware register (e.g., the EAX register). In some embodiments, the parameters used by a particular leaf function may also be specified in hardware registers (e.g., the RBX/RCX/RDX registers).

The table below illustrates an example of PCONFIG leaf encodings that could be used to enable support for multiple leaf functions. Although only one leaf function is defined (the KEY_PROGRAM leaf), additional leaf functions can be defined using the reserved leaf encodings in order to extend the functionality of the PCONFIG instruction.

| PCONFIG Leaf Function Encodings | | |
|---|---|---|
| LEAF | ENCODING | DESCRIPTION |
| KEY_PROGRAM | 0x00000000 | This leaf function is used to program the key associated with a domain. |
| OTHER | 0x00000001-0x66FF | Additional leaf functions can be defined using these reserved leaf encodings for future extensions to the functionality of the PCONFIG instruction. |

The key program leaf function (KEY_PROGRAM) of the PCONFIG instruction can be used to program a key for a protected domain. In some embodiments, the parameters used by the key program leaf function may be specified in a key program structure (KEY_PROGRAM_STRUCT), and the address of the key program structure may be specified in a hardware register (e.g., the RBX register). The table below illustrates an example embodiment of the key program structure (KEY_PROGRAM_STRUCT).

| Key Program Structure (KEY_PROGRAM_STRUCT) | | |
|---|---|---|
| FIELD | SIZE (bytes) | DESCRIPTION |
| KEYID | 2 | This field identifies the KeyID of a domain that is being programmed. |
| KEYID_CTRL | 4 | Bits [7:0] = command<br>Bits [23:8] = crypto algorithm<br>Bits [31:24] = reserved |
| RESERVED | 58 | This field may be used to select an encryption algorithm to use for the domain (based on the available encryption algorithms). |
| KEYID_FIELD_1 | 64 | Software supplied KeyID data key or entropy for KeyID data key |
| KEYID_FIELD_2 | 64 | Software supplied KeyID tweak key or entropy for KeyID tweak key |

As shown the key program structure identifies the KeyID of the particular domain being programmed, and it also specifies a key programming command. In some embodiments, for example, the key program leaf function may support multiple key programming commands, and the desired command may be specified in the key program structure. Moreover, in some embodiments, the key program structure may also include reserved field(s) that can be used for subsequent extensions to the key program leaf function.

The table below illustrates examples of key programming commands that may be supported by the key program leaf function.

| Key Programming Commands | | |
|---|---|---|
| KEY DOMAIN (KD) COMMAND | ENCODING | DESCRIPTION |
| Set Key Direct (KD_SET_KEY_DIRECT) | 0 | This command sets the key for a domain directly using the key specified in the key program structure (KEY_PROGRAM_STRUCT). The key is provided by the software that initiates this key programming command. The domain is then protected in custom encryption mode. |
| Set Key Random (KD_SET_KEY_RANDOM) | 1 | This command sets the key for a domain using a randomly generated key. For example, a key may be randomly generated by a processor and/or a random number generator, and thus may not be known by (or shared with) the software that initiates the key programming command. The domain is then protected in custom encryption mode. |
| Clear Key (KD_CLEAR_KEY) | 2 | This command clears the key that was previously set for a domain. The domain is then protected in default encryption mode. |
| No Key (KD_NO_KEY) | 3 | This command disables memory encryption for a domain. The domain is then protected in plaintext mode. |

After the key program leaf function is executed, a return value or status code may be specified in a hardware register to indicate whether the key program function was successful. The table below illustrates examples of the status codes that may be returned by the key program leaf function.

revealing the keys to management software. In some embodiments, for example, additional PCONFIG leaf functions may be implemented to enable keys to be wrapped and then subsequently programmed to memory security engine after being unwrapped.

| Status codes returned by key program leaf function (KEY_PROGRAM) | | |
|---|---|---|
| STATUS CODE | ENCODING | Description |
| PROG_SUCCESS | 0 | The domain is programmed successfully. |
| INVALID_PROG_CMD | 1 | The key programming command is invalid. |
| ENTROPY_ERROR | 2 | The entropy of a randomly generated key is insufficient. |
| INVALID_KEYID | 3 | The domain KeyID is invalid. |
| INVALID_ENC_ALG | 4 | An invalid encryption algorithm is selected. |
| DEVICE_BUSY | 5 | A lock for the domain key table cannot be obtained. |

While the illustrated embodiment uses the PCONFIG processor instruction to perform domain configuration, other embodiments may use alternative and/or additional approaches for domain configuration. For example, in some embodiments, domain configuration may be performed using hardware registers. For example, a PCONFIG model-specific register (MSR) may be implemented for performing domain configuration, allowing software to invoke the PCONFIG operation by writing to the PCONFIG MSR (e.g., executing a WRMSR instruction with the index for the PCONFIG MSR passed in a register, such as the ECX register). Moreover, certain parameters for the PCONFIG operation (and its associated leaf functions and commands) may be passed in hardware registers. For example, the address of the key program structure (KEY_PROGRAM_STRUCT) can be passed in a hardware register, such as the EDX register, EAX register, or both of those registers (e.g., for 64-bit memory addresses). The PCONFIG operation can then be performed in a similar manner as described above.

Moreover, in some embodiments, a PCONFIG operation may utilize wrapped blobs for domain key programming. In this manner, domain keys can be programmed without In some embodiments, a memory encryption capability register (ME_CAPABILITY_MSR) may be used to allow software to discover the memory encryption capabilities. For example, software can read the ME_CAPABILITY_MSR (e.g., using a read MSR (RDMSR) instruction) to identify the supported encryption types and/or algorithms, the maximum number of encryption keys that can be used concurrently, the maximum number of bits used for keyID, and so forth. The ME_CAPABILITY_MSR may be used to identify supported encryption algorithms, a maximum number of keyIDs, a maximum number of keys, etc.

The memory encryption activation register (ME_ACTIVATE_MSR) may be used to activate the cryptographic memory protection (e.g., MKTME). This MSR may include a field to engage a read-only lock (which locks at least this register), a field to enable memory encryption, a field to select a key for default encryption, a field to specify what happens to a default key upon resuming from standby, field to identify a default encryption algorithm to use, a field to identify a number of bits to use for keyIDs, and a field to restrict encryption algorithms that can be used.

Example pseudocode for implementing the PCONFIG instruction is provided below:

```
// #UD (undefined opcode exception) if PCONFIG is not enumerated or in VM86, or CPL>0
if (CPUID.7.0:ECX[PCONFIG] == 0 OR RFLAGS.VM == 1 OR CPL > 0) #UD;
if (in VMX non-root mode)
{
    if (VMCS.PCONFIG)
    {
    if ((EAX > 62 AND VMCS.PCONFIG_EXITING[63] ==1) OR
        (EAX < 63 AND VMCS.PCONFIG_EXITING[EAX] == 1))
    {
    Set VMCS.EXIT_REASON = PCONFIG; //No Exit qualification
    Deliver VMEXIT;
    }
        }
    else
    {
    #UD
    }
}
// #GP(0) (general protection fault) for an unsupported leaf
if(EAX != 0) #GP(0)
// KEY_PROGRAM leaf flow
if (EAX == 0)
{
//#GP(0) if ME_ACTIVATE_MSR is not locked or does not enable memory encryption (ME) or
multiple keys are not enabled
if (ME_ACTIVATE_MSR.LOCK != 1 OR ME_ACTIVATE_MSR.ENABLE != 1 OR
ME_ACTIVATE_MSR.ME_KEYID_BITS == 0) #GP(0)
    // Check KEY_PROGRAM_STRUCT is 256B aligned
    if(DS:RBX is not 256B aligned) #GP(0);
    // Check that KEY_PROGRAM_STRUCT is read accessible
    <<DS: RBX should be read accessible>>
    // Copy KEY_PROGRAM_STRUCT to a temporary variable
    IMP_KEY_PROGRAM_STRUCT = DS:RBX.*;
    // RSVD field check
    if(TMP_KEY_PROGRAM_STRUCT.RSVD !=0) #GP(0);
    if(TMP_KEY_PROGRAM_STRUCT.USUPP_KEYID_KEY.BYTES[63:16] != 0) #GP(0);
        if(TMP_KEY_PROGRAM_STRUCT.USUPP_KEYID_TWEAK_KEY.BYTES[63:16]
!= 0)
#GP(0);
// Check for a valid command
if(TMP_KEY_PROGRAM_STRUCT. KEYID_CMD.COMMAND is not a valid command)
{
    RFLAGS.ZF = 1;
    RAX = INVALID_PROG_CMD;
        goto EXIT;
}
// Check that the KEYID being operated upon is a valid KEYID
if(TMP_KEY_PROGRAM_STRUCT.KEYID >
2^ME_ACTIVATE_MSR.ME_KEYID_BITS - 1
OR IMP_KEY_PROGRAM_STRUCT.KEYID >
ME_CAPABILITY_MSR.ME_MAX_KEYS
OR IMP_KEY_PROGRAM_STRUCT.KEYID == 0)
{
RFLAGS.ZF = 1;
    RAX = INVALID_KEYID;
        goto EXIT;
}
// Check that only one algorithm is requested for the KEYID domain and it is one of the acti-
vated
algorithms
if(NUM_BITS(TMP_KEY_PROGRAM_STRUCT.KEYID_CMD.ENC_ALG) !=1 | |
(TMP_KEY_PROGRAM_STRUCT.KEYID_CMD.ENC_ALG &
ME_ACTIVATE_MSR.ME_ALG_ENABLE ==0))
{
RFLAGS.ZF = 1;
    RAX = INVALID_ENC_ALG;
        goto EXIT;
}
// Try to acquire exclusive lock
if (NOT KEY_TABLE_LOCK.ACQUIRE(WRITE))
{
    // PCONFIG failure
    RFLAGS.ZF = 1;
    RAX = DEVICE_BUSY;
        goto EXIT;
}
// Lock is acquired
switch(TMP_KEY_PROGRAM_STRUCT.KEYID_CMD.COMMAND)
```

```
{
case KD_SET_KEY_DIRECT:
    <<Write
KEY=TMP_KEY_PROGRAM_STRUCT.USUPP_KEYID_KEY,
TWEAK_KEY=TMP_KEY_PROGRAM_STRUCT.USUPP_KEYID_TWEAK_KEY,
KEY_CONTROL=2'b01,
to ME Key table at index TMP_KEY_PROGRAM_STRUCT.KEYID
>>
// Do a read to guarantee completion of previous writes
<<Read KEY_CONTROL bits at index TMP_KEY_PROGRAM_STRUCT.KEYID>>
    break;
case KD_SET_KEY_RANDOM:
TMP_RND_KEY = <<Generate a random key using RDSEED>>
    if (NOT ENOUGH ENTROPY)
    {
RFLAGS.ZF = 1;
    RAX = ENTROPY_ERROR;
    goto EXIT;
}
TMP_RND_TWEAK_KEY = <<Generate a random key using RDSEED>>
    if (NOT ENOUGH ENTROPY)
    {
RFLAGS.ZF = 1;
    RAX = ENTROPY_ERROR;
    goto EXIT;
}
// Mix user supplied entropy to the data key and tweak key
TMP_RND_KEY = TMP_RND_KEY XOR
TMP_KEY_PROGRAM_STRUCT.USUPP_KEYID_KEY.BYTES[15:0];
TMP_RND_TWEAK_KEY = TMP_RND_TWEAK_KEY XOR
TMP_KEY_PROGRAM_STRUCT.USUPP_KEYID_TWEAK_KEY.BYTES[15:0];
<<Write
KEY=TMP_RND_KEY,
TWEAK_KEY=TMP_RND_TWEAK_KEY,
KEY_CONTROL=2'b01,
to ME_KEY_TABLE at index IMP_KEY_PROGRAM_STRUCT.KEYID
>>
// Do a read to guarantee completion of previous writes
<<Read KEY_CONTROL bits at index TMP_KEY_PROGRAM_STRUCT.KEYID>>
    break;
case KD_CLEAR_KEY:
    <<Write
KEY='0,
    TWEAK_KEY='0,
KEY_CONTROL = 2'b00,
to ME_KEY_TABLE at index IMP_KEY_PROGRAM_STRUCT.KEYID
>>
// Do a read to guarantee completion of previous writes
<<Read KEY_CONTROL bits at index TMP_KEY_PROGRAM_STRUCT.KEYID>>
    break;
case KD_NO_KEY:
    <<Write
KEY_CONTROL=2'b11,
to ME Key table at index TMP_KEY_PROGRAM_STRUCT.KEYID
>>
// Do a read to guarantee completion of previous writes
<<Read KEY_CONTROL bits at index TMP_KEY_PROGRAM_STRUCT.KEYID>>
    break;
}
RAX = 0;
RFLAGS.ZF = 0;
// Release Lock
KEY_TABLE_LOCK(RELEASE);
EXIT:
RFLAGS.CF=0;
RFLAGS.PF=0;
RFLAGS.AF=0;
RFLAGS.OF=0;
RFLAGS.SF=0;
}
```

Figure 16:
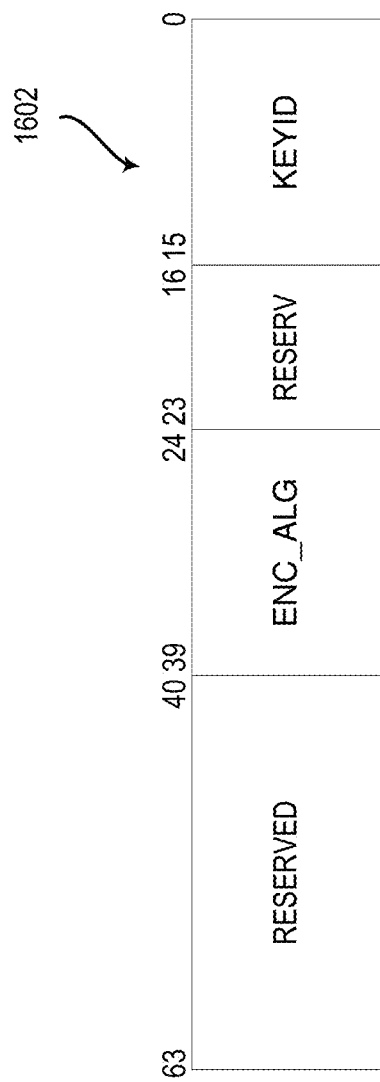
FIG. 16 illustrates an example configuration for KEYID_CTRL to be stored in one of the "other" registers.

FIG. 16 illustrates an example configuration for KEYID_CTRL to be stored in one of the "other" registers (e.g., RBX). This control provides an encryption algorithm and keyID which are used to determine if the MKTME engine can be programmed.

FIG. 17 illustrates embodiments of processing an PCONFIG instruction. The processing utilizes one or more of execution circuitry, PUF circuitry, encryption circuitry, and/or MAC circuitry.

At 1701, a single PCONFIG instruction is fetched. For example, a PCONFIG instruction is fetched. The PCONFIG instruction includes fields for an opcode to indicate a memory protection controller is to be programmed according to a leaf operation, wherein a first implicit operand is to provide an indication of the leaf operation, a second implicit operand is to provide a key identifier (keyID) and an indication of an encryption algorithm, a third implicit operand to provide a location of an input data structure, wherein the opcode is to indicate execution circuitry is to decrypt encrypted data from the input data structure using an unwrapping key generated by a physical unclonable function (PUF), the decrypted data comprising concatenated keys, program the memory protection controller using the concatenated keys (e.g., one or more of data key and one or more tweak keys) based on the for the keyID based on the indicated encryption algorithm, and set an operational status.

In some embodiments, the execution circuitry is to decrypt data from the input data structure using a key generated by a PUF and store the decrypted data in the output data structure, wherein a challenge to excite the PUF is found in the input data structure, and store an operation status in the identified first destination operand. In some embodiments, the decryption is performed by providing the generated key and a sequence ID from the input data structure to a cryptography engine. In some embodiments, the input data structure is first verified using a MAC comparison. For example, a MAC is computed by removing the MAC from the input data structure and then generating a MAC on the remaining data. The MAC of the input data structure and generated MAC are then compared to determine if any data of the wrapped blob has changed. Note that in some embodiments, the entire input data structure is copied into the output data structure prior to other operations.

In some embodiments, the fetched single instruction is translated into one or more instructions of a different instruction set architecture prior to decoding at 1702. Executing of the one or more instructions of the different instruction set architecture is to be functionally equivalent as the executing according to the opcode of the single instruction The fetched single instruction (or translated instruction(s)) is/are decoded at 1703. For example, the fetched PCONFIG instruction is decoded by decode circuitry such as that detailed herein.

Data values associated with the source operand of the decoded instruction is retrieved at 1705. For example, when one or more of the source operands are memory operands, the data from the indicated memory location is retrieved.

At 1707, the decoded instruction (or translated instruction(s)) is/are executed by execution circuitry (hardware) such as that detailed herein. For the PCONFIG instruction, the execution will cause execution circuitry to execute the decoded instruction according to the opcode as noted above.

In some embodiments, the execution circuitry is to decrypt data from the input data structure using a key generated by a PUF and store the decrypted data in the output data structure, wherein a challenge to excite the PUF is found in the input data structure, and store an operation status in the identified first destination operand. In some embodiments, the decryption is performed by providing the generated key and a sequence ID from the input data structure to a cryptography engine. In some embodiments, the input data structure is first verified using a MAC comparison. For example, a MAC is computed by removing the MAC from the input data structure and then generating a MAC on the remaining data. The MAC of the input data structure and generated MAC are then compared to determine if any data of the wrapped blob has changed. Note that in some embodiments, the entire input data structure is copied into the output data structure prior to other operations.

In some embodiments, the instruction is committed or retired at 1709.

Figure 18A:
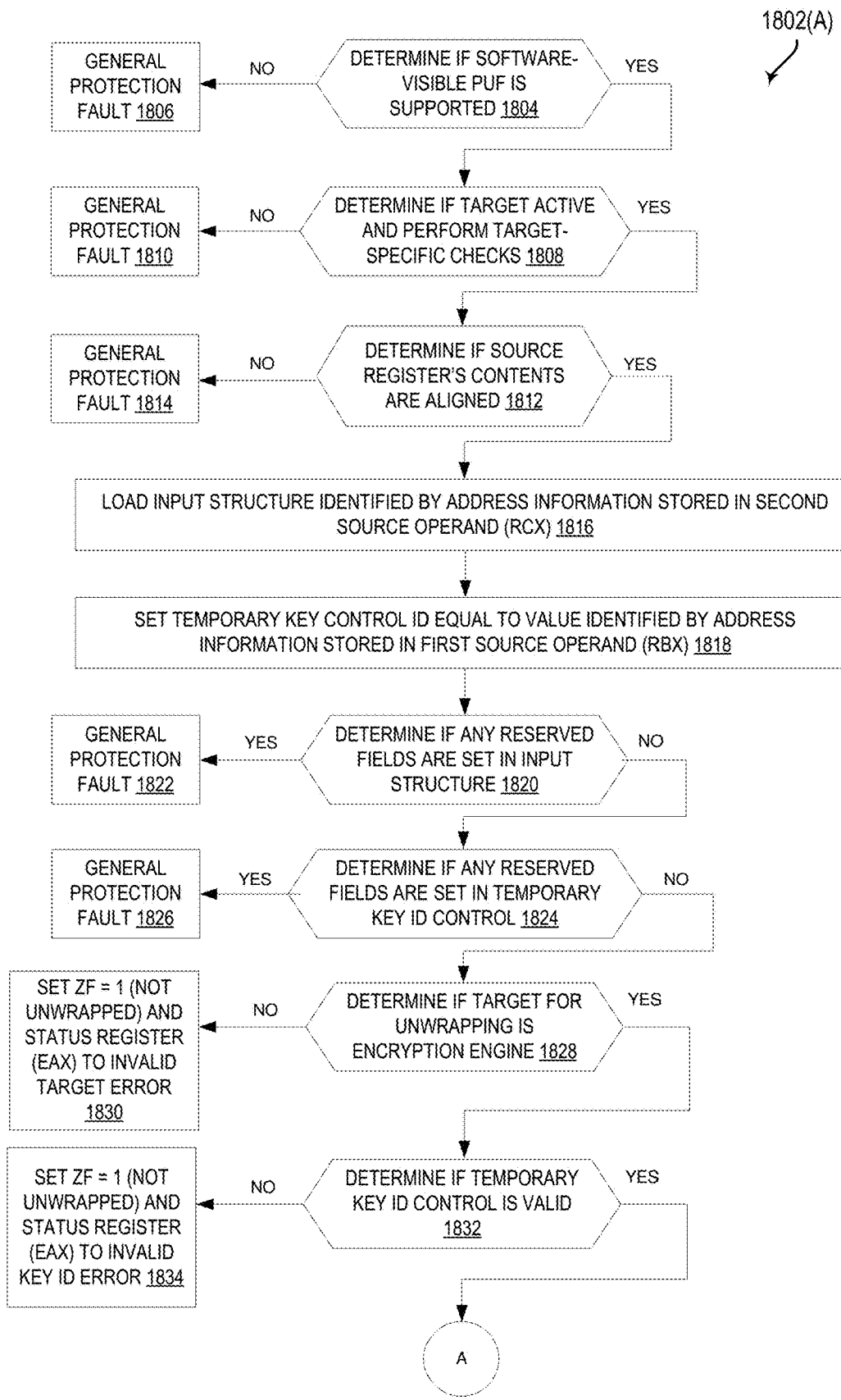
FIGS. 18(A)-(B) illustrates a method performed by a processor to execute an encryption key programming instruction to program a target according to the present embodiments.
Figure 18B:
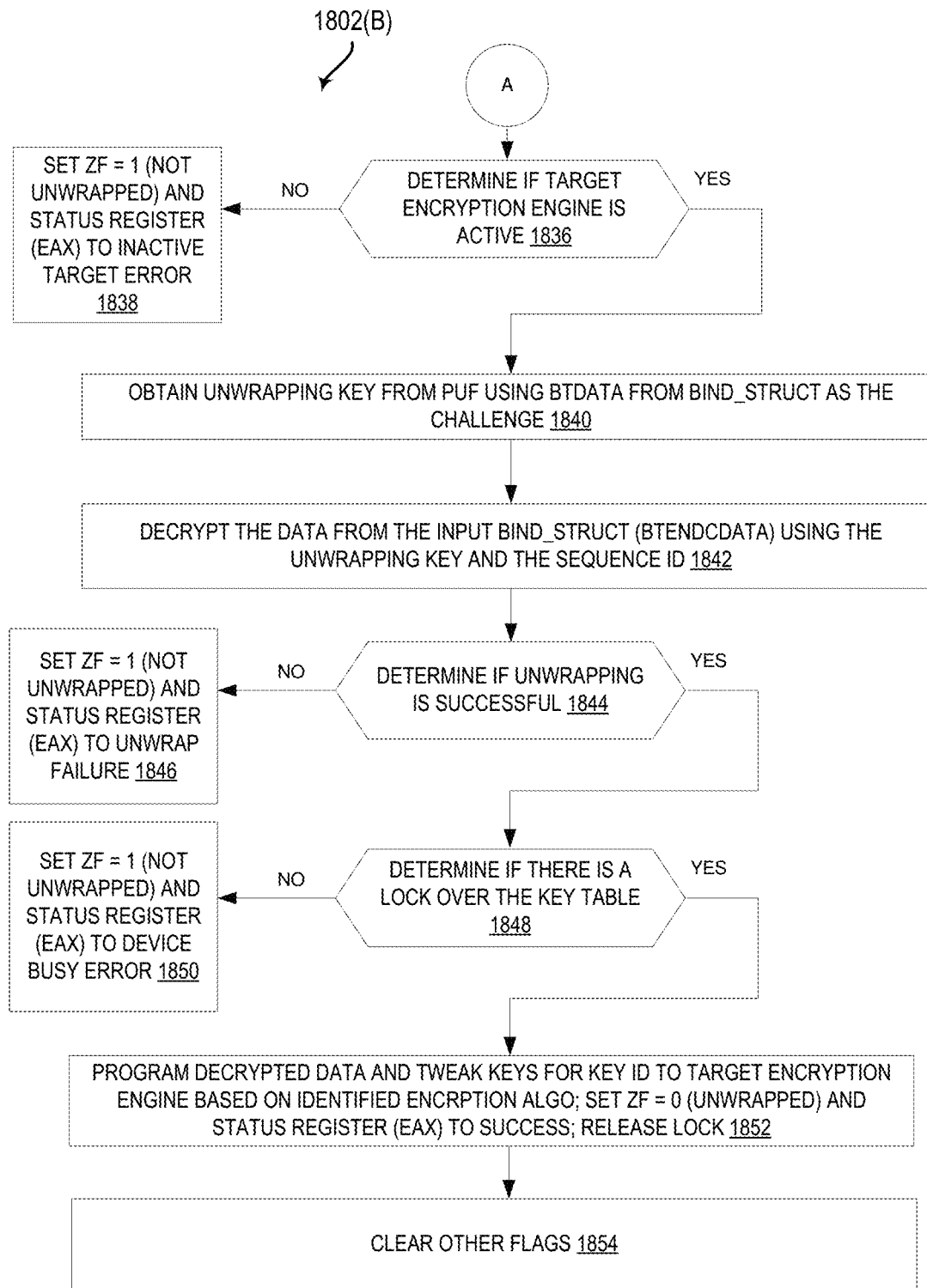

FIG. 18 illustrates a method 1802 performed by a processor to execute an encryption key programming (PCONFIG) instruction to program a target according to the present embodiments. Generally, the PCONFIG instruction allows the software to program encryption keys and other target-specific information to desired targets. More specifically, the target identifies the encryption engine to which the key is to be programmed. For example, the target may be an instance of MKTME (Multi-Key Total Memory Encryption available from Intel Corporation of Santa Clara, Calif.) executing on the platform.

At 1804 it is determined whether the SV-PUF is supported. In some embodiments, this aspect is set in a model specific register (MSR). If it is determined that the SV-PUF is not supported, then the process exits at 1806 due to a general protection fault. If, however, it is determined that the SV-PUF is supported, then the process advances to 1808, where it is determined whether the target identified by the software (e.g., an encryption engine) is currently active, and other target-specific checks are performed. For example, where the target is an encryption engine, the PCONFIG instruction may check whether the KEYID provided by the software is within range. If it is determined that the target identified by the software is not currently active, then the process exits at 1810 due to a general protection fault. If, however, it is determined that the target identified by the software is currently active, then the process advances to 1812, where it is determined whether the contents of the source register are aligned. If it is determined that the contents of the source register are not aligned, then the process exits at 1814 due to a general protection fault. If, however, it is determined that the contents of the source register are aligned, then the process advances to 1816.

At 1816, the input structure identified by the address information stored in the second source operand (e.g., RCX) is loaded into memory. The process 1802 then advances to 1818. At 1818, the temporary key ID control is set equal to the value identified by the address information stored in the first source operand (e.g., RBX). The process 1802 then advances to 1820).

At 1820, it is determined whether any reserved fields are set in the input structure identified by the address information stored in the first source operand. If it is determined that there are reserved fields set in the input structure identified by the address information stored in the first source operand, then the process exits at 1822 due to a general protection fault. If, however, it is determined that there are no reserved fields set in the input structure identified by the address information stored in the first source operand, then the process advances to 1824, where it is determined whether any reserved fields are set in the temporary key ID control identified by the address information stored in the first source operand. If it is determined that there are reserved fields set in the temporary key ID control identified by the address information stored in the first source operand, then the process exits at 1826 due to a general protection fault. If, however, it is determined that there are no reserved fields set in the temporary key ID control identified by the address information stored in the first source operand, then the process advances to 1828.

At 1828, it is determined whether the unwrapping target (e.g., indicated by BTID in BIND_STRUCT) is the encryption engine (or another target that was specified by the software during the WRP process). If it is determined that the unwrapping target is not the encryption engine, then the process advances to 1830 where the zero flag is set to 1, to indicate that the data was not unwrapped, and the destination register (e.g., EAX) is set to indicate an invalid target error. If, however, it is determined that the unwrapping target is the encryption engine, then the process advances to 1832, where it is determined whether the temporary key ID control is valid. For example, do the values of the temporary key ID control alight with the KEY_PROGRAM_STRUCT (are the key IDs and encryption algorithms the same)?

If it is determined that the temporary key ID control is not valid, then the process advances to 1834 where the zero flag is set to 1, to indicate that the data was not unwrapped, and the destination register (e.g., EAX) is set to indicate an invalid key ID error. If, however, it is determined that the temporary key ID control is valid, then the process advances to 1836, where it is determined whether the target is active. If it is determined that the target is not active, then the process advances to 1838 where the zero flag is set to 1, to indicate that the data was not unwrapped, and the destination register (e.g., EAX) is set to indicate an inactive target error. If, however, it is determined that the target is active, then the process advances to 1840.

At 1840, an unwrapping key is obtained from the PUF using the challenge stored in the BTDATA field of BIND_STRUCT. The process 1802 then advances to 1842, where the data from the BTENDCDATA field of the input BIND_STRUCT is decrypted using the unwrapping key and the SEQID field of the input BIND_STRUCT. The process 1802 then advances to 1844.

At 1844, it is determined whether the unwrapping is successful. If it is determined that the unwrapping is not successful (e.g., because of a MAC mismatch), then the process advances to 1846 where the zero flag is set to 1, to indicate that the data was not unwrapped, and the destination register (e.g., EAX) is set to indicate an unwrap failure. If, however, it is determined that the unwrapping is successful (e.g., because of a MAC match), then the process advances to 1848, where it is determined whether there the key table is locked. If it is determined that there is no lock, then the process advances to 1850 where the zero flag is set to 1, to indicate that the data was not unwrapped, and the destination register (e.g., EAX) is set to indicate a device busy error. If, however, it is determined that there is a lock, then the process advances to 1852, where the unwrapped data and the tweak key(s) for the key ID are programmed to the target encryption engine, the zero flag is set to 0, indicating that the data was successfully unwrapped, the destination register (e.g., EAX) is set to indicate success, and the lock is released. The process 1802 then advances to 1854, where all other flags are cleared.

FIG. 19 illustrates embodiments of pseudocode for the execution of an PCONFIG instruction.

The above instructions, etc. may be embodied in a plurality of architectures, systems, formats, etc. and examples of which are detailed below.

Example Computer Architectures

Detailed below are descriptions of example computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices, are also suitable. In general, a huge variety of systems or electronic devices capable of incorporating a processor and/or other execution logic as disclosed herein are generally suitable.

Figure 20:
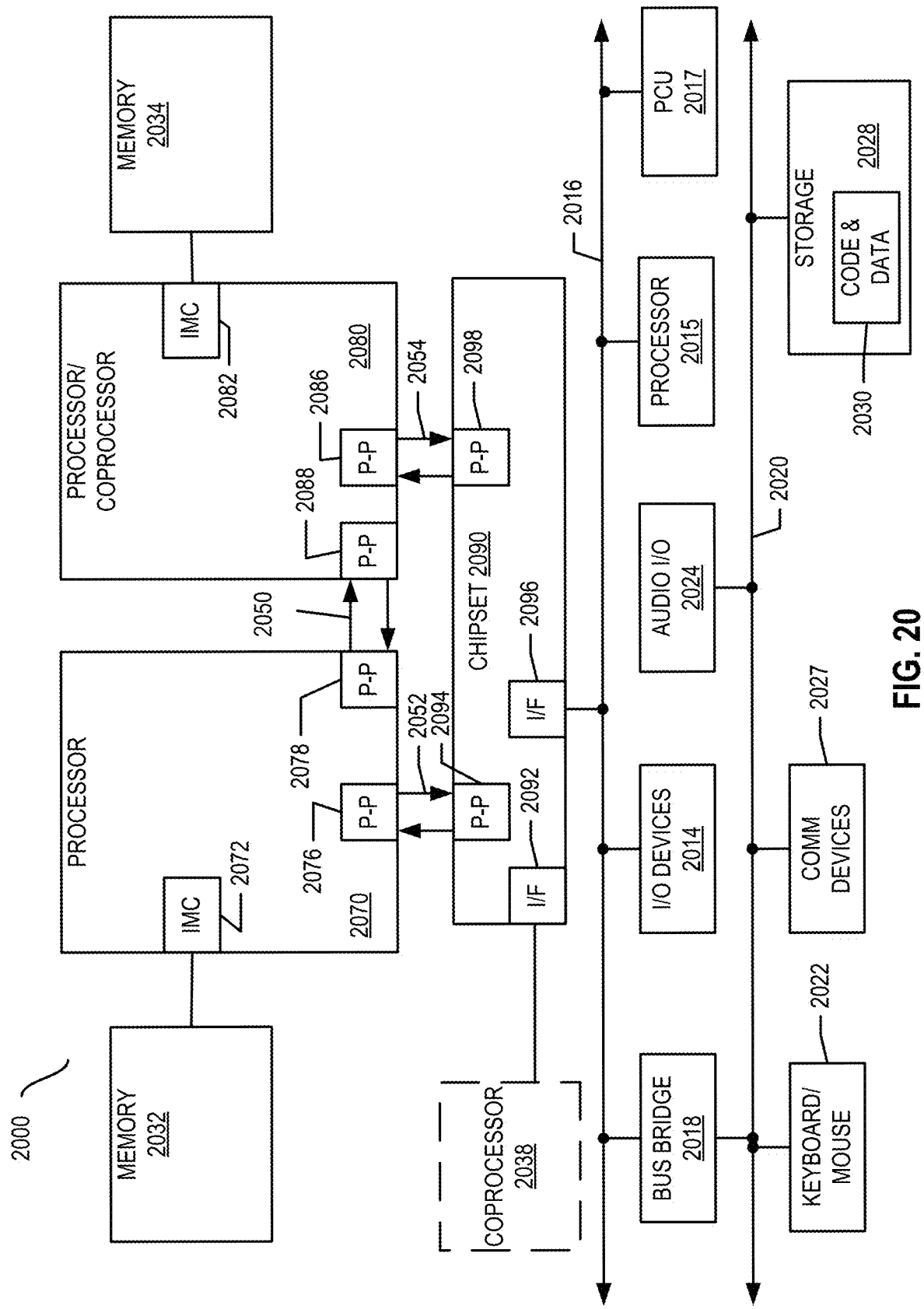
FIG. 20 is a functional block diagram illustrating hardware of an example system for processing instructions according to the present embodiments.

FIG. 20 illustrates embodiments of an example system. Multiprocessor system 2000 is a point-to-point interconnect system and includes a plurality of processors, including a first processor 2070 and a second processor 2080 coupled via a point-to-point interconnect 2050. In some embodiments, the first processor 2070 and the second processor 2080 are homogeneous. In some embodiments, the first processor 2070 and the second processor 2080 are heterogenous.

Processors 2070 and 2080 are shown including integrated memory controller (IMC) circuitry 2072 and 2082, respectively. Processor 2070 also includes as part of its interconnect controller units' point-to-point (P-P) interfaces 2076 and 2078; similarly, second processor 2080 includes P-P interfaces 2086 and 2088. Processors 2070, 2080 may exchange information via the point-to-point (P-P) interconnect 2050 using P-P interfaces 2078, 2088. IMCs 2072 and 2082 couple the processors 2070, 2080 to respective memories, namely a memory 2032 and a memory 2034, which may be portions of main memory locally attached to the respective processors.

Processors 2070, 2080 may each exchange information with a chipset 2090 via individual P-P interfaces 2052, 2054 using P-P interfaces 2076, 2094, 2086, 2098. Chipset 2090 may optionally exchange information with a coprocessor 2038 via a high-performance interface 2092. In some embodiments, the coprocessor 2038 is a special-purpose processor, such as, for example, a high-throughput MIC processor, a network or communication processor, compression engine, graphics processor, GPGPU, embedded processor, or the like.

A shared cache (not shown) may be included in either processor 2070, 2080 or outside of both processors, yet connected with the processors via P-P interconnect, such that either or both processors' local cache information may be stored in the shared cache if a processor is placed into a low power mode.

Chipset 2090 may be coupled to a first interconnect 2016 via an interface 2096. In some embodiments, first interconnect 2016 may be a Peripheral Component Interconnect (PCI) interconnect, or an interconnect such as a PCI Express interconnect or another I/O interconnect. In some embodiments, the first interconnect 2016 couples to a power control unit (PCU) 2017, which may include circuitry, software, and/or firmware to perform power management operations with regard to the processors 2070, 2080 and/or the coprocessor 2038. PCU 2017 provides control information to a voltage regulator (not shown) to cause the voltage regulator to generate the appropriate regulated voltage. PCU 2017 also provides control information to control the operating voltage generated. In various embodiments, PCU 2017 may include a variety of power management logic units (e.g., circuitry) to perform hardware-based power management. Such power management may be wholly processor controlled (e.g., by various processor hardware, and which may be triggered by workload and/or power, thermal, or other processor constraints) and/or the power management may be performed responsive to external sources (such as a platform or power management source or system software).

PCU 2017 is illustrated as being present as logic separate from the processor 2070 and/or the processor 2080. In other cases, PCU 2017 may execute on a given one or more of cores (not shown) of processor(s) 2070 or 2080. In some cases, PCU 2017 may be implemented as a microcontroller (dedicated or general-purpose) or other control logic configured to execute its own dedicated power management code, sometimes referred to as P-code. In yet other embodiments, power management operations to be performed by PCU 2017 may be implemented externally to a processor, such as by way of a separate power management integrated circuit (PMIC) or another component external to the processor. In yet other embodiments, power management operations to be performed by PCU 2017 may be implemented within BIOS or other system software.

Various I/O devices 2014 may be coupled to first interconnect 2016, along with an interconnect (bus) bridge 2018, which couples first interconnect 2016 to a second interconnect 2020. In some embodiments, one or more additional processor(s) 2015, such as coprocessors, high-throughput MIC processors, GPGPU's, accelerators (such as, e.g., graphics accelerators or digital signal processing (DSP) units), field programmable gate arrays (FPGAs), or any other processor, are coupled to first interconnect 2016. In some embodiments, second interconnect 2020 may be a low pin count (LPC) interconnect. Various devices may be coupled to second interconnect 2020 including, for example, a keyboard and/or mouse 2022, communication devices 2027, and storage unit circuitry 2028. Storage unit circuitry 2028 may be a disk drive or other mass storage device, which may include instructions/code and data 2030, in some embodiments. Further, an audio I/O 2024 may be coupled to second interconnect 2020. Note that other architectures than the point-to-point architecture described above are possible. For example, instead of the point-to-point architecture, a system such as multiprocessor system 2000 may implement a multi-drop interconnect or other such architecture.

Example Core Architectures, Processors, and Computer Architectures

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Example core architectures are described next, followed by descriptions of example processors and computer architectures.

Figure 21:
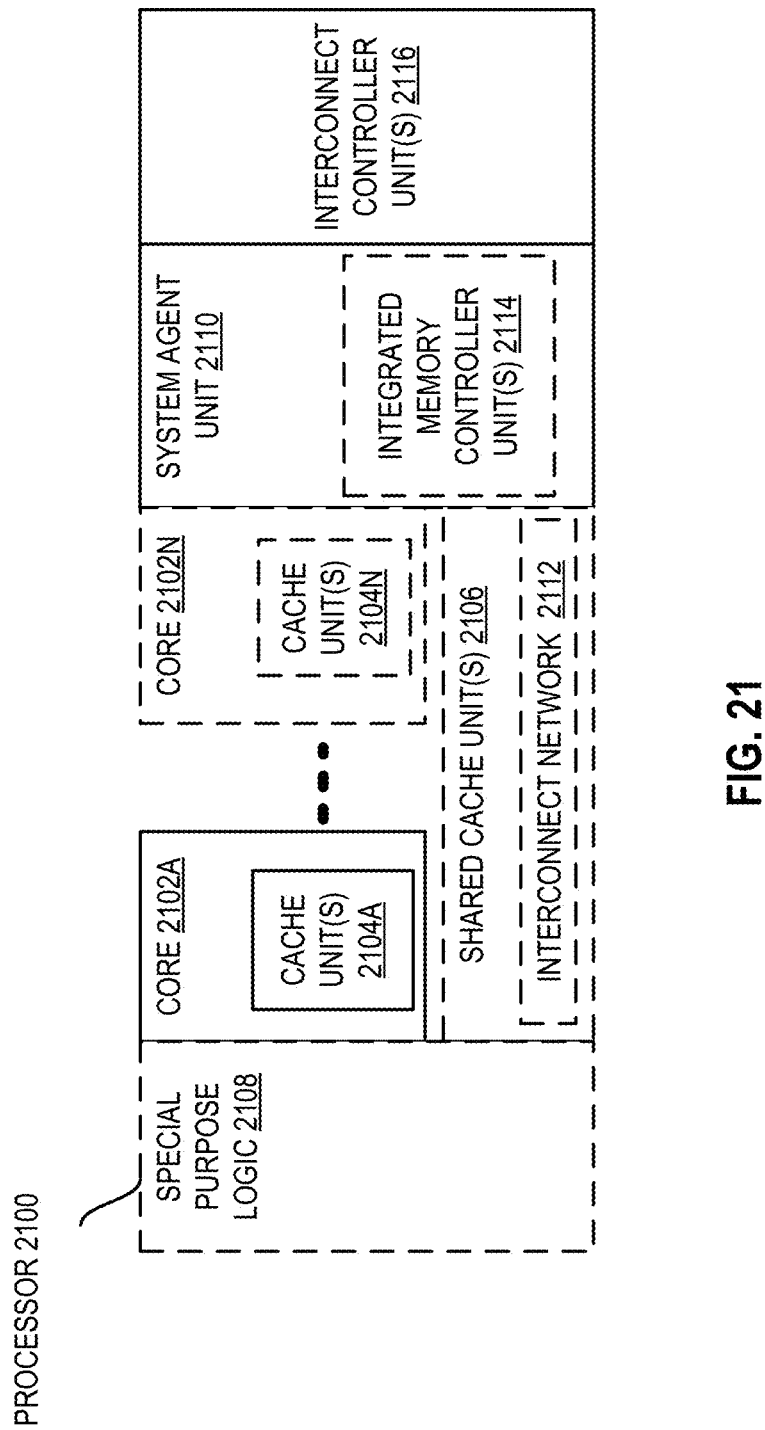
FIG. 21 is a functional block diagram illustrating a processor according to the present embodiments.

FIG. 21 illustrates a block diagram of embodiments of a processor 2100 that may have more than one core, may have an integrated memory controller, and may have integrated graphics. The solid-lined boxes illustrate a processor 2100 with a single core 2102A, a system agent 2110, and a set of one or more interconnect controller units circuitry 2116, while the optional dashed lined boxes illustrate an alternative processor 2100 with multiple cores 2102(A)-(N), a set of one or more integrated memory controller unit(s) circuitry 2114 in the system agent unit circuitry 2110, and special purpose logic 2108, as well as a set of one or more interconnect controller units circuitry 2116. Note that the processor 2100 may be one of the processors 2070, 2080, 2038, or 2015 of FIG. 20.

Thus, different implementations of the processor 2100 may include: 1) a CPU with the special purpose logic 2108 being integrated graphics and/or scientific (throughput) logic (which may include one or more cores, not shown), and the cores 2102(A)-(N) being one or more general purpose cores (e.g., general purpose in-order cores, general purpose out-of-order cores, or a combination of the two); 2) a coprocessor with the cores 2102(A)-(N) being a large number of special purpose cores intended primarily for graphics and/or scientific (throughput); and 3) a coprocessor with the cores 2102(A)-(N) being a large number of general purpose in-order cores. Thus, the processor 2100 may be a general-purpose processor, coprocessor, or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor 2100 may be implemented on one or more chips. The processor 2100 may be a part of and/or may be implemented on one or more substrates using any of a number of process technologies, such as, for example, BiCMOS, CMOS, or NMOS.

A memory hierarchy includes one or more levels of cache unit(s) circuitry 2104(A)-(N) within the cores 2102(A)-(N), a set of one or more shared cache units circuitry 2106, and external memory (not shown) coupled to the set of integrated memory controller units circuitry 2114. The set of one or more shared cache units circuitry 2106 may include one or more mid-level caches, such as level 2 (L2), level 3 (L3), level 4 (L4), or other levels of cache, such as a last level cache (LLC), and/or combinations thereof. While in some embodiments ring-based interconnect network circuitry 2112 interconnects the special purpose logic 2108 (e.g., integrated graphics logic), the set of shared cache units circuitry 2106, and the system agent unit circuitry 2110, alternative embodiments use any number of well-known techniques for interconnecting such units. In some embodiments, coherency is maintained between one or more of the shared cache units circuitry 2106 and cores 2102(A)-(N).

In some embodiments, one or more of the cores 2102(A)-(N) are capable of multi-threading. The system agent unit circuitry 2110 includes those components coordinating and operating cores 2102(A)-(N). The system agent unit circuitry 2110 may include for example power control unit (PCU) circuitry and/or display unit circuitry (not shown). The PCU may be or may include logic and components needed for regulating the power state of the cores 2102(A)-(N) and/or the special purpose logic 2108 (e.g., integrated graphics logic). The display unit circuitry is for driving one or more externally connected displays.

The cores 2102(A)-(N) may be homogenous or heterogeneous in terms of architecture instruction set; that is, two or more of the cores 2102(A)-(N) may be capable of executing the same instruction set, while other cores may be capable of executing only a subset of that instruction set or a different instruction set.

Example Core Architectures

In-Order and Out-of-Order Core Block Diagram

FIG. 22(A) is a block diagram illustrating both an example in-order pipeline and an example register renaming, out-of-order issue/execution pipeline according to the present embodiments. FIG. 22(B) is a block diagram illustrating both an example in-order architecture core and an example register renaming, out-of-order issue/execution architecture core to be included in a processor according to the present embodiments. The solid-lined boxes in FIGS. 22(A)-(B) illustrate the in-order pipeline and in-order core, while the optional dashed lined boxes illustrate the register renaming, out-of-order issue/execution pipeline and core. Given that the in-order aspect is a subset of the out-of-order aspect, the out-of-order aspect will be described.

In FIG. 22(A), a processor pipeline 2200 includes a fetch stage 2202, an optional length decoding stage 2204, a decode stage 2206, an optional allocation stage 2208, an optional renaming stage 2210, a scheduling (also known as a dispatch or issue) stage 2212, an optional register read/memory read stage 2214, an execute stage 2216, a write back/memory write stage 2218, an optional exception handling stage 2222, and an optional commit stage 2224. One or more operations can be performed in each of these processor pipeline stages. For example, during the fetch stage 2202, one or more instructions are fetched from instruction memory, during the decode stage 2206, the one or more fetched instructions may be decoded, addresses (e.g., load store unit (LSU) addresses) using forwarded register ports may be generated, and branch forwarding (e.g., immediate offset or a link register (LR)) may be performed. In one embodiment, the decode stage 2206 and the register read/memory read stage 2214 may be combined into one pipeline stage. In one embodiment, during the execute stage 2216, the decoded instructions may be executed, LSU address/data pipelining to an Advanced Microcontroller Bus (AHB) interface may be performed, multiply and add operations may be performed, arithmetic operations with branch results may be performed, etc.

By way of example, the example register renaming, out-of-order issue/execution core architecture 2290 illustrated in FIG. 22(B) may implement the pipeline 2200 as follows: 1) the instruction fetch 2238 performs the fetch and length decoding stages 2202 and 2204; 2) the decode unit circuitry 2240 performs the decode stage 2206; 3) the rename/allocator unit circuitry 2252 performs the allocation stage 2208 and renaming stage 2210; 4) the scheduler unit(s) circuitry 2256 performs the schedule stage 2212; 5) the physical register file(s) unit(s) circuitry 2258 and the memory unit circuitry 2270 perform the register read/memory read stage 2214; the execution cluster 2260 performs the execute stage 2216; 6) the memory unit circuitry 2270 and the physical register file(s) unit(s) circuitry 2258 perform the write back/memory write stage 2218; 7) various units (unit circuitry) may be involved in the exception handling stage 2222; and 8) the retirement unit circuitry 2254 and the physical register file(s) unit(s) circuitry 2258 perform the commit stage 2224.

FIG. 22(B) shows processor core 2290 including front-end unit circuitry 2230 coupled to execution engine unit circuitry 2250, and both are coupled to memory unit circuitry 2270. The core 2290 may be a reduced instruction set computing (RISC) core, a complex instruction set computing (CISC) core, a very long instruction word (VLIW) core, or a hybrid or alternative core type. As yet another option, the core 2290 may be a special-purpose core, such as, for example, a network or communication core, compression engine, coprocessor core, general purpose computing graphics processing unit (GPGPU) core, graphics core, or the like.

The front end unit circuitry 2230 may include branch prediction unit circuitry 2232 coupled to instruction cache unit circuitry 2234, which is coupled to an instruction translation lookaside buffer (TLB) 2236, which is coupled to instruction fetch unit circuitry 2238, which is coupled to decode unit circuitry 2240. In one embodiment, the instruction cache unit circuitry 2234 is included in the memory unit circuitry 2270 rather than the front-end unit circuitry 2230. The decode unit circuitry 2240 (or decoder) may decode instructions, and generate as an output one or more micro-operations, micro-code entry points, microinstructions, other instructions, or other control signals, which are decoded from, or which otherwise reflect, or are derived from, the original instructions. The decode unit circuitry 2240 may further include address generation unit circuitry (AGU, not shown). In one embodiment, the AGU generates an LSU address using forwarded register ports, and may further perform branch forwarding (e.g., immediate offset branch forwarding, LR register branch forwarding, etc.). The decode unit circuitry 2240 may be implemented using various different mechanisms. Examples of suitable mechanisms include, but are not limited to, lookup tables, hardware implementations, programmable logic arrays (PLAs), microcode read only memories (ROMs), etc. In one embodiment, the core 2290 includes a microcode ROM (not shown) or other medium that stores microcode for certain macroinstructions (e.g., in decode unit circuitry 2240 or otherwise within the frontend unit circuitry 2230). In one embodiment, the decode unit circuitry 2240 includes a micro-operation (micro-op) or operation cache (not shown) to hold/cache decoded operations, micro-tags, or micro-operations generated during the decode 2206 or other stages of the processor pipeline 2200. The decode unit circuitry 2240 may be coupled to rename/allocator unit circuitry 2252 in the execution engine unit circuitry 2250.

The execution engine circuitry 2250 includes the rename/allocator unit circuitry 2252 coupled to retirement unit circuitry 2254 and a set of one or more scheduler(s) circuitry 2256. The scheduler(s) circuitry 2256 represents any number of different schedulers, including reservations stations, central instruction window, etc. In some embodiments, the scheduler(s) circuitry 2256 can include arithmetic logic unit (ALU) scheduler/scheduling circuitry, ALU queues, arithmetic generation unit (AGU) scheduler/scheduling circuitry, AGU queues, etc. The scheduler(s) circuitry 2256 is coupled to the physical register file(s) circuitry 2258. Each of the physical register file(s) circuitry 2258 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit circuitry 2258 includes vector register unit circuitry, writemask register unit circuitry, and scalar register unit circuitry. These register units may provide architectural vector registers, vector mask registers, general-purpose registers, etc. The physical register file(s) unit(s) circuitry 2258 is overlapped by the retirement unit circuitry 2254 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register map and a pool of registers; etc.). The retirement unit circuitry 2254 and the physical register file(s) circuitry 2258 are coupled to the execution cluster(s) 2260. The execution cluster(s) 2260 includes a set of one or more execution units circuitry 2262 and a set of one or more memory access circuitry 2264. The execution units circuitry 2262 may perform various arithmetic, logic, floating point, or other types of operations (e.g., shifts, addition, subtraction, multiplication) and on various types of data (e.g., scalar floating point, packed integer, packed floating point, vector integer, vector floating point). While some embodiments may include a number of execution units or execution unit circuitry dedicated to specific functions or sets of functions, other embodiments may include only one execution unit circuitry or multiple execution units/execution unit circuitry that all perform all functions. The scheduler(s) circuitry 2256, physical register file(s) unit(s) circuitry 2258, and execution cluster(s) 2260 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler circuitry, physical register file(s) unit circuitry, and/or execution cluster—and in the case of a separate memory access pipeline, certain embodiments are implemented in which only the execution cluster of this pipeline has the memory access unit(s) circuitry 2264). It should also be understood that where separate pipelines are used, one or more of these pipelines may be out-of-order issue/execution and the rest in-order.

In some embodiments, the execution engine unit circuitry 2250 may include PUF circuitry 2280, while in other embodiments the PUF circuitry 2280 may be external to the execution engine unit circuitry 2250. In some embodiments, the execution engine unit circuitry 2250 may perform load store unit (LSU) address/data pipelining to an Advanced Microcontroller Bus (AHB) interface (not shown), and address phase and writeback, data phase load, store, and branches.

The set of memory access circuitry 2264 is coupled to the memory unit circuitry 2270, which includes data TLB unit circuitry 2272 coupled to data cache circuitry 2274 coupled to level 2 (L2) cache circuitry 2276. In one example embodiment, the memory access units circuitry 2264 may include load unit circuitry, store address unit circuitry, and store data unit circuitry, each of which is coupled to the data TLB circuitry 2272 in the memory unit circuitry 2270. The instruction cache circuitry 2234 is further coupled to level 2 (L2) cache unit circuitry 2276 in the memory unit circuitry 2270. In one embodiment, the instruction cache 2234 and the data cache 2274 are combined into a single instruction and data cache (not shown) in L2 cache unit circuitry 2276, level 3 (L3) cache unit circuitry (not shown), and/or main memory. The L2 cache unit circuitry 2276 is coupled to one or more other levels of cache and eventually to a main memory.

The core 2290 may support one or more instruction sets (e.g., the x86 instruction set (with some extensions that have been added with newer versions); the MIPS instruction set; the ARM instruction set (with optional additional extensions such as NEON)), including the instruction(s) described herein. In one embodiment, the core 2290 includes logic to support a packed data instruction set extension (e.g., AVX1, AVX2), thereby allowing the operations used by many multimedia applications to be performed using packed data.

In some embodiments, the present ISA (e.g., WRP, UNWRP, PCONFIG) is executed by the execution cluster(s) 2260 of the execution engine 2250 of the core 2290 (FIG. 22(B)). For example, the execution units circuitry 2262 may execute the present ISA to communicate with the PUF circuitry 2280, passing the challenge 2(A)06 to the PUF circuitry 2280 and receiving the PUF-derived key 2(A)04 from the PUF circuitry 2280.

Example Execution Unit(s) Circuitry

Figure 23:
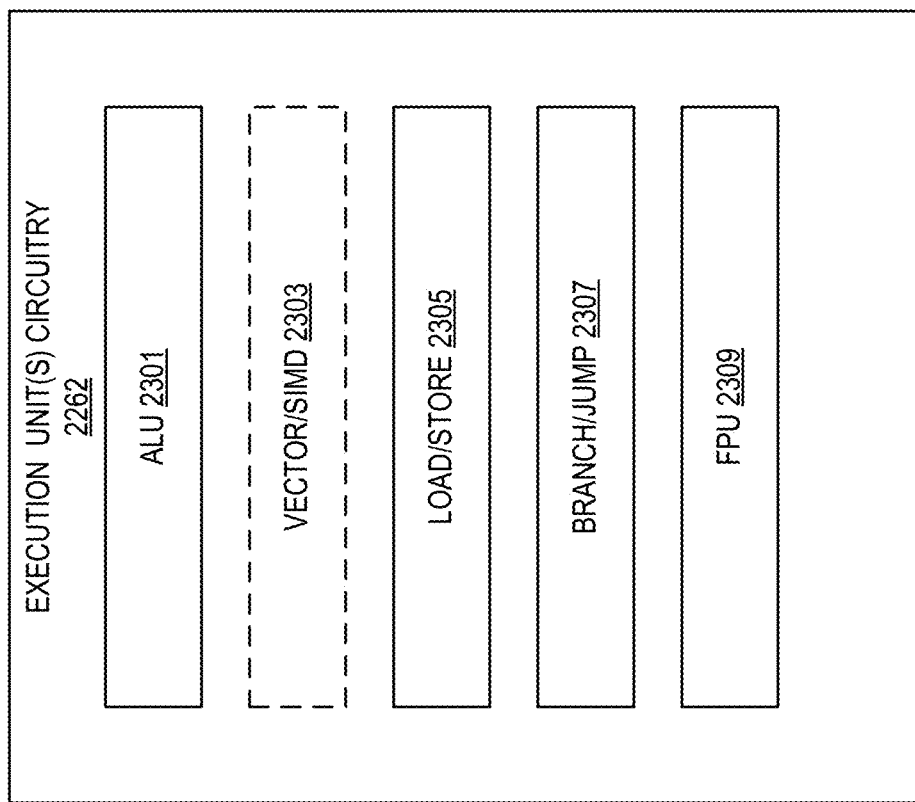
FIG. 23 is a functional block diagram illustrating execution unit(s) circuitry according to the present embodiments.

FIG. 23 illustrates embodiments of execution unit(s) circuitry, such as execution unit(s) circuitry 2262 of FIG. 22(B). As illustrated, execution unit(s) circuitry 2262 may include one or more ALU circuits 2301, vector/SIMD unit circuits 2303, load/store unit circuits 2305, and/or branch/jump unit circuits 2307. ALU circuits 2301 perform integer arithmetic and/or Boolean operations. Vector/SIMD unit circuits 2303 perform vector/SIMD operations on packed data (such as SIMD/vector registers). Load/store unit circuits 2305 execute load and store instructions to load data from memory into registers or store from registers to memory. Load/store unit circuits 2305 may also generate addresses. Branch/jump unit circuits 2307 cause a branch or jump to a memory address depending on the instruction. FPU circuits 2309 perform floating-point arithmetic. The width of the execution unit(s) circuitry 2262 varies depending upon the embodiment and can range from 16-bit to 1,024-bit, for example. In some embodiments, two or more smaller execution units are logically combined to form a larger execution unit (e.g., two 128-bit execution units are logically combined to form a 256-bit execution unit).

Example Register Architecture

Figure 24:
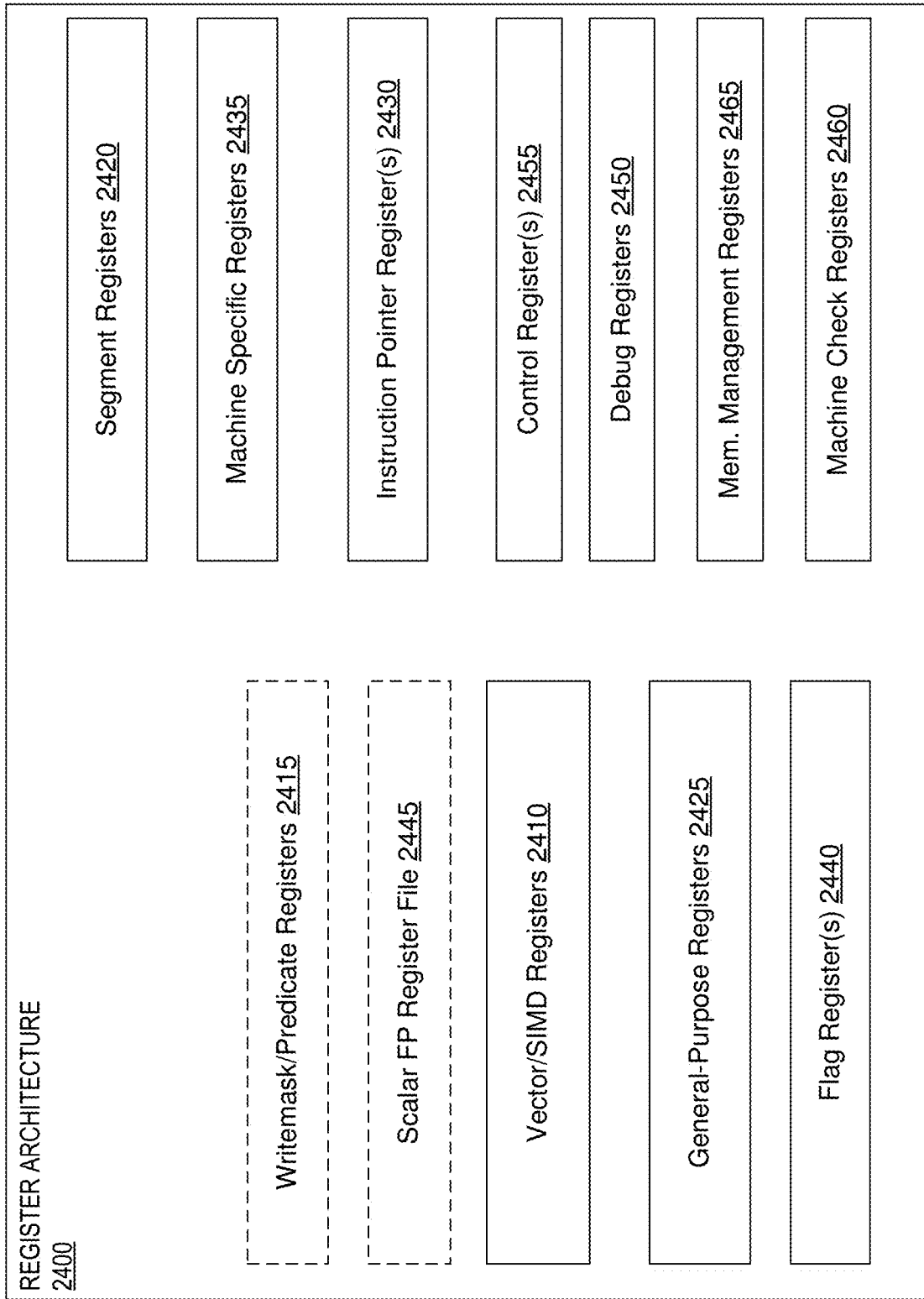
FIG. 24 is a functional block diagram illustrating register architecture according to the present embodiments.

FIG. 24 is a block diagram of a register architecture 2400 according to some embodiments. As illustrated, there are vector/SIMD registers 2410 that vary from 128 bits to 1,024 bits in width. In some embodiments, the vector/SIMD registers 2410 are physically 512-bits and, depending upon the mapping, only some of the lower bits are used. For example, in some embodiments, the vector/SIMD registers 2410 are ZMM registers which are 512 bits: the lower 256 bits are used for YMM registers and the lower 128 bits are used for XMM registers. As such, there is an overlay of registers. In some embodiments, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the embodiment.

In some embodiments, the register architecture 2400 includes writemask/predicate registers 2415. For example, in some embodiments, there are 8 writemask/predicate registers (sometimes called k0 through k7) that are each 16-bit, 32-bit, 64-bit, or 128-bit in size. Writemask/predicate registers 2415 may allow for merging (e.g., allowing any set of elements in the destination to be protected from updates during the execution of any operation) and/or zeroing (e.g., zeroing vector masks allow any set of elements in the destination to be zeroed during the execution of any operation). In some embodiments, each data element position in a given writemask/predicate register 2415 corresponds to a data element position of the destination. In other embodiments, the writemask/predicate registers 2415 are scalable and consist of a set number of enable bits for a given vector element (e.g., 8 enable bits per 64-bit vector element).

The register architecture 2400 includes a plurality of general-purpose registers 2425. These registers may be 16-bit, 32-bit, 64-bit, etc., and can be used for scalar operations. In some embodiments, these registers are referenced by the names RAX, RBX, RCX, RDX, RBP, RSI, RDI, RSP, and R8 through R15.

In some embodiments, the register architecture 2400 includes scalar floating point register 2445, which is used for scalar floating-point operations on 32/64/80-bit floating point data using the x87 instruction set extension, or as MMX registers to perform operations on 64-bit packed integer data, as well as to hold operands for some operations performed between the MMX and XMM registers.

One or more flag registers 2440 (e.g., EFLAGS, RFLAGS, etc.) store status and control information for arithmetic, compare, and system operations. For example, the one or more flag registers 2440 may store condition code information such as carry, parity, auxiliary carry, zero, sign, and overflow. In some embodiments, the one or more flag registers 2440 are called program status and control registers.

Segment registers 2420 contain segment points for use in accessing memory. In some embodiments, these registers are referenced by the names CS, DS, SS, ES, FS, and GS.

Machine-specific registers (MSRs) 2435 control and report on processor performance. Most MSRs 2435 handle system-related functions and are not accessible to an application program. Machine check registers 2460 consist of control, status, and error reporting MSRs that are used to detect and report on hardware errors.

One or more instruction pointer register(s) 2430 store an instruction pointer value. Control register(s) 2455 (e.g., CR0-CR4) determine the operating mode of a processor (e.g., processor 2070, 2080, 2038, 2018, and/or 2100) and the characteristics of a currently executing task. Debug registers 2450 control and allow for the monitoring of a processor's or core's debugging operations.

Memory management registers 2465 specify the locations of data structures used in protected mode memory management. These registers may include a GDTR, IDRT, task register, and a LDTR register.

Alternative embodiments of the invention may use wider or narrower registers. Additionally, alternative embodiments of the invention may use more, less, or different register files and registers.

Instruction Sets

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down through the definition of instruction templates (or sub-formats). For example, the instruction templates of a given instruction format may be defined to have different subsets of the instruction format's fields (the included fields are typically in the same order, but at least some have different bit positions because there are fewer fields included) and/or defined to have a given field interpreted differently. Thus, each instruction of an ISA is expressed using a given instruction format (and, if defined, in a given one of the instruction templates of that instruction format), and includes fields for specifying the operation and the operands. For example, an example ADD instruction has a specific opcode and an instruction format that includes an opcode field to specify that opcode and operand fields to select operands (source1/destination and source2), and an occurrence of this ADD instruction in an instruction stream will have specific contents in the operand fields that select specific operands.

Example Instruction Formats

Embodiments of the instruction(s) described herein may be embodied in different formats. Additionally, example systems, architectures, and pipelines are detailed below. Embodiments of the instruction(s) may be executed on such systems, architectures, and pipelines, but are not limited to those detailed.

Figure 25:
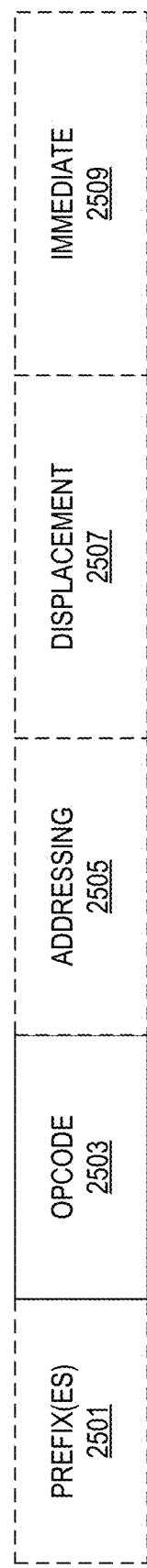
FIG. 25 is a functional block diagram illustrating an instruction format according to the present embodiments.

FIG. 25 illustrates embodiments of an instruction format. As illustrated, an instruction may include multiple components including, but not limited to, one or more fields for: one or more prefixes 2501, an opcode 2503, addressing information 2505 (e.g., register identifiers, memory addressing information, etc.), a displacement value 2507, and/or an immediate 2509. Note that some instructions utilize some or all of the fields of the format, whereas others may only use the field for the opcode 2503. In some embodiments, the order illustrated is the order in which these fields are to be encoded, however, it should be appreciated that in other embodiments these fields may be encoded in a different order, combined, etc.

The prefix(es) field(s) 2501, when used, modifies an instruction. In some embodiments, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the legacy prefixes.

The opcode field 2503 is used to at least partially define the operation to be performed upon a decoding of the instruction. In some embodiments, a primary opcode encoded in the opcode field 2503 is 1, 2, or 3 bytes in length. In other embodiments, a primary opcode can be a different length. An additional 3-bit opcode field is sometimes encoded in another field.

Figure 26:
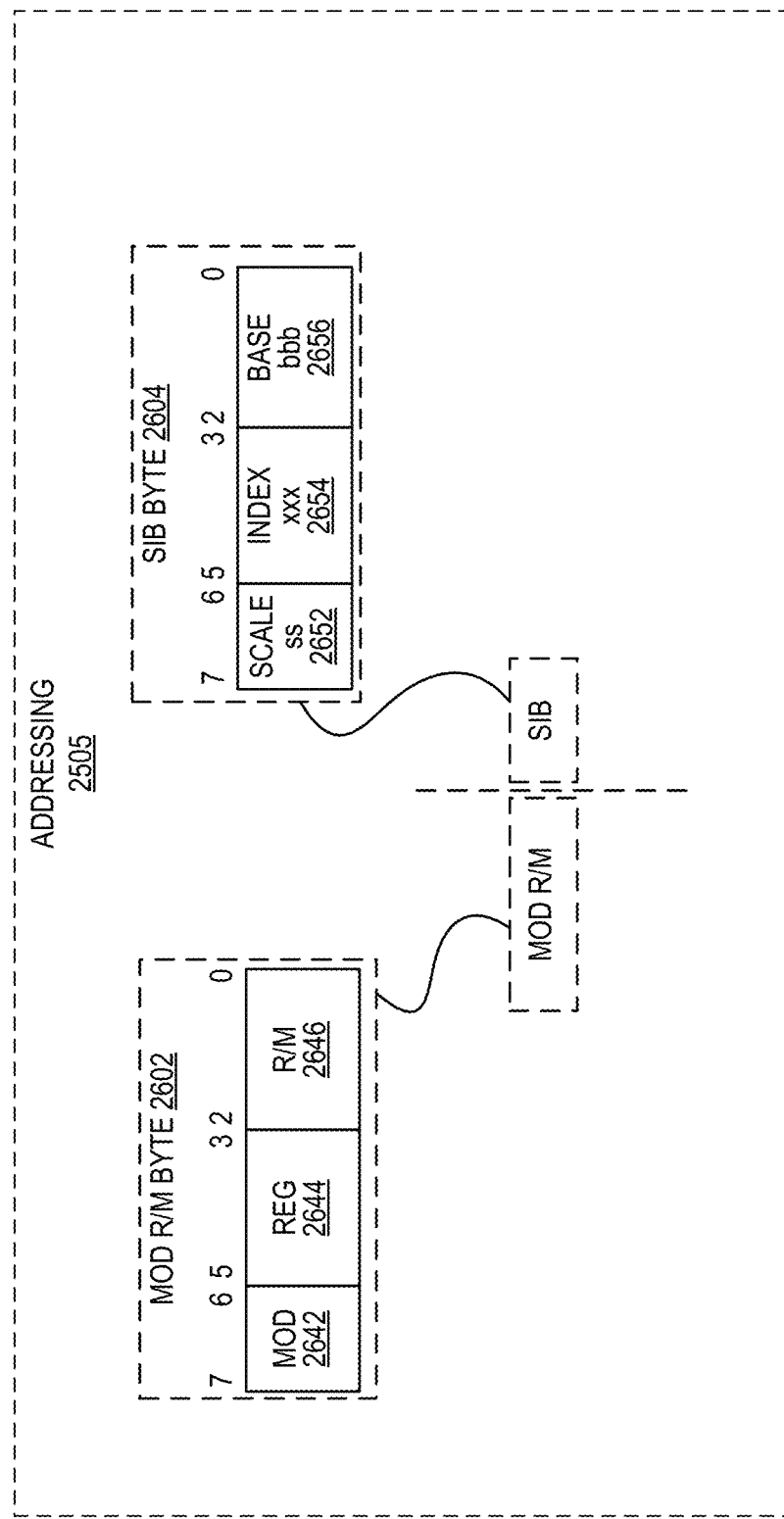
FIG. 26 is a functional block diagram illustrating details of the addressing field of the instruction format of FIG. 25 according to the present embodiments.

The addressing field 2505 is used to address one or more operands of the instruction, such as a location in memory or one or more registers. FIG. 26 illustrates embodiments of the addressing field 2505. In this illustration, an optional ModR/M byte 2602 and an optional Scale, Index, Base (SIB) byte 2604 are shown. The ModR/M byte 2602 and the SIB byte 2604 are used to encode up to two operands of an instruction, each of which is a direct register or effective memory address. Note that each of these fields are optional, in that not all instructions include one or more of these fields. The MOD R/M byte 2602 includes a MOD field 2642, a register field 2644, and R/M field 2646.

The content of the MOD field 2642 distinguishes between memory access and non-memory access modes. In some embodiments, when the MOD field 2642 has a value of b11, a register-direct addressing mode is utilized, and otherwise register-indirect addressing is used.

The register field 2644 may encode either the destination register operand or a source register operand, or may encode an opcode extension and not be used to encode any instruction operand. The content of register index field 2644, directly or through address generation, specifies the locations of a source or destination operand (either in a register or in memory). In some embodiments, the register field 2644 is supplemented with an additional bit from a prefix (e.g., prefix 2501) to allow for greater addressing.

The R/M field 2646 may be used to encode an instruction operand that references a memory address, or may be used to encode either the destination register operand or a source register operand. Note the R/M field 2646 may be combined with the MOD field 2642 to dictate an addressing mode in some embodiments.

The SIB byte 2604 includes a scale field 2652, an index field 2654, and a base field 2656 to be used in the generation of an address. The scale field 2652 indicates a scaling factor. The index field 2654 specifies an index register to use. In some embodiments, the index field 2654 is supplemented with an additional bit from a prefix (e.g., prefix 2501) to allow for greater addressing. The base field 2656 specifies a base register to use. In some embodiments, the base field 2656 is supplemented with an additional bit from a prefix (e.g., prefix 2501) to allow for greater addressing. In practice, the content of the scale field 2652 allows for the scaling of the content of the index field 2654 for memory address generation (e.g., for address generation that uses $2^{scale}$*index+base).

Some addressing forms utilize a displacement value to generate a memory address. For example, a memory address may be generated according to $2^{scale}$*index+base+displacement, index*scale+displacement, r/m+displacement, instruction pointer (RIP/EIP)+displacement, register+displacement, etc. The displacement may be a 1-byte, 2-byte, 4-byte, etc. value. In some embodiments, a displacement field 2507 provides this value. Additionally, in some embodiments, a displacement factor usage is encoded in the MOD field of the addressing field 2505 that indicates a compressed displacement scheme for which a displacement value is calculated by multiplying disp8 in conjunction with a scaling factor N that is determined based on the vector length, the value of a b bit, and the input element size of the instruction. The displacement value is stored in the displacement field 2507.

In some embodiments, an immediate field 2509 specifies an immediate for the instruction. An immediate may be encoded as a 1-byte value, a 2-byte value, a 4-byte value, etc.

FIG. 27 illustrates embodiments of a first prefix 2501(A). In some embodiments, the first prefix 2501(A) is an embodiment of a REX prefix. Instructions that use this prefix may specify general purpose registers, 64-bit packed data registers (e.g., single instruction, multiple data (SIM D) registers or vector registers), and/or control registers and debug registers (e.g., CR8-CR15 and DR8-DR15).

Instructions using the first prefix 2501(A) may specify up to three registers using 3-bit fields depending on the format: 1) using the reg field 2644 and the R/M field 2646 of the Mod R/M byte 2602; 2) using the Mod R/M byte 2602 with the SIB byte 2604, including using the reg field 2644 and the base field 2656 and index field 2654; or 3) using the register field of an opcode.

In the first prefix 2501(A), bit positions 7:4 are set as 0100. Bit position 3 (W) can be used to determine the operand size, but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 2644 and MOD R/M R/M field 2646 alone can each only address 8 registers.

In the first prefix 2501(A), bit position 2 (R) may be an extension of the MOD R/M reg field 2644, and may be used to modify the ModR/M reg field 2644 when that field encodes a general purpose register, a 64-bit packed data register (e.g., a SSE register), or a control or debug register. R is ignored when Mod R/M byte 2602 specifies other registers or defines an extended opcode.

Bit position 1 (X) X bit may modify the SIB byte index field 2654.

Bit position B (B) B may modify the base in the Mod R/M R/M field 2646 or the SIB byte base field 2656; or it may modify the opcode register field used for accessing general purpose registers (e.g., general purpose registers 2425).

FIGS. 28(A)-(D) illustrate embodiments of how the R, X, and B fields of the first prefix 2501(A) are used. FIG. 28(A) illustrates R and B from the first prefix 2501(A) being used to extend the reg field 2644 and R/M field 2646 of the MOD R/M byte 2602 when the SIB byte 26 04 is not used for memory addressing. FIG. 28(B) illustrates R and B from the first prefix 2501(A) being used to extend the reg field 2644 and R/M field 2646 of the MOD R/M byte 2602 when the SIB byte 26 04 is not used (register-register addressing). FIG. 28(C) illustrates R, X, and B from the first prefix 2501(A) being used to extend the reg field 2644 of the MOD R/M byte 2602 and the index field 2654 and base field 2656 when the SIB byte 26 04 is being used for memory addressing. FIG. 28(D) illustrates B from the first prefix 2501(A) being used to extend the reg field 2644 of the MOD R/M byte 2602 when a register is encoded in the opcode 2503.

Figure 29A:
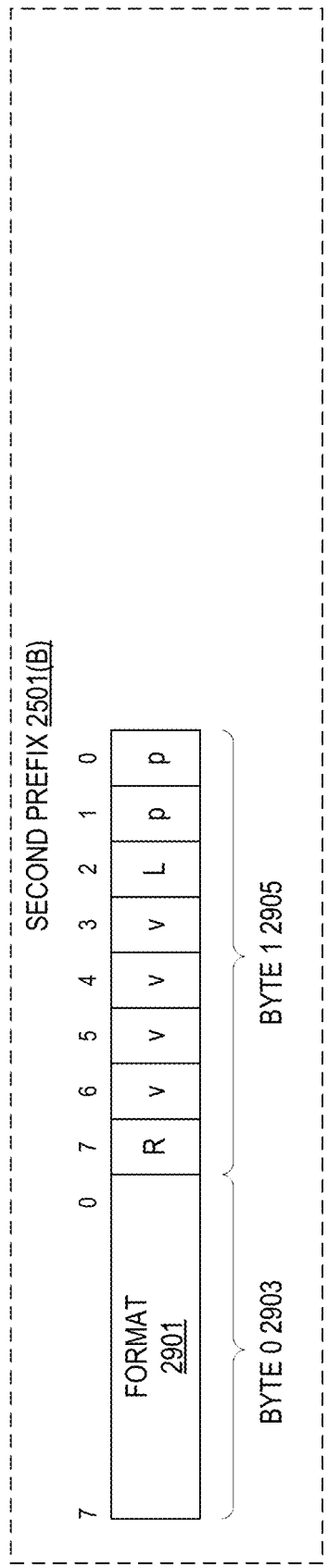
FIGS. 29(A)-(B) are functional block diagrams illustrating details of a second example prefix of the instruction format of FIG. 25 according to the present embodiments.
Figure 29B:
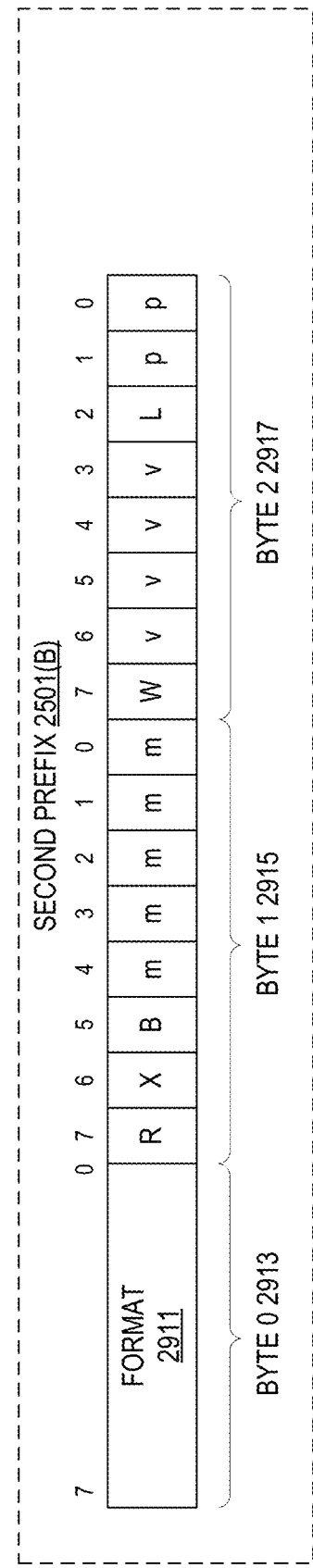

FIGS. 29(A)-(B) illustrate embodiments of a second prefix 2501(B). In some embodiments, the second prefix 2501(B) is an embodiment of a VEX prefix. The second prefix 2501(B) encoding allows instructions to have more than two operands, and allows SIMD vector registers (e.g., vector/SIMD registers 2410) to be longer than 64-bits (e.g., 128-bit and 256-bit). The use of the second prefix 2501(B) provides for three-operand (or more) syntax. For example, previous two-operand instructions performed operations such as A=A+B, which overwrites a source operand. The use of the second prefix 2501(B) enables operands to perform nondestructive operations such as A=B+C.

In some embodiments, the second prefix 2501(B) comes in two forms—a two-byte form and a three-byte form. The two-byte second prefix 2501(B) is used mainly for 128-bit, scalar, and some 256-bit instructions, while the three-byte second prefix 2501(B) provides a compact replacement of the first prefix 2501(A) and 3-byte opcode instructions.

FIG. 29(A) illustrates embodiments of a two-byte form of the second prefix 2501(B). In one example, a format field 2901 (byte 0 2903) contains the value C5H. In one example, byte 1 2905 includes an "R" value in bit[7]. This value is the complement of the same value of the first prefix 2501(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 2646 to encode the instruction operand that references a memory address, or encode either the destination register operand or a source register operand.

Instructions that use this prefix may use the Mod R/M reg field 2644 to encode either the destination register operand or a source register operand, or be treated as an opcode extension and not used to encode any instruction operand.

For instruction syntax that supports four operands, vvvv, the Mod R/M R/M field 2646 and the Mod R/M reg field 2644 encode three of the four operands. Bits[7:4] of the immediate 2509 are then used to encode the third source register operand.

FIG. 29(B) illustrates embodiments of a three-byte form of the second prefix 2501(B). In one example, a format field 2911 (byte 0 2913) contains the value C4H. Byte 1 2915 includes in bits[7:5] "R," "X," and "B," which are the complements of the same values of the first prefix 2501(A). Bits[4:0] of byte 1 2915 (shown as mmmmm) include content to encode, as needed, one or more implied leading opcode bytes. For example, 00001 implies a 0FH leading opcode, 00010 implies a 0F38H leading opcode, 00011 implies a leading 0F3AH opcode, etc.

Bit[7] of byte 2 2917 is used similar to W of the first prefix 2501(A), including helping to determine promotable operand sizes. Bit[2] is used to dictate the length (L) of the vector (where a value of 0 is a scalar or 128-bit vector) and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 2646 to encode the instruction operand that references a memory address or encode either the destination register operand or a source register operand.

Instructions that use this prefix may use the Mod R/M reg field 2644 to encode either the destination register operand or a source register operand, or be treated as an opcode extension and not used to encode any instruction operand.

For instruction syntax that supports four operands, vvvv, the Mod R/M R/M field 2646 and the Mod R/M reg field 2644 encode three of the four operands. Bits[7:4] of the immediate 2509 are then used to encode the third source register operand.

Figure 30:
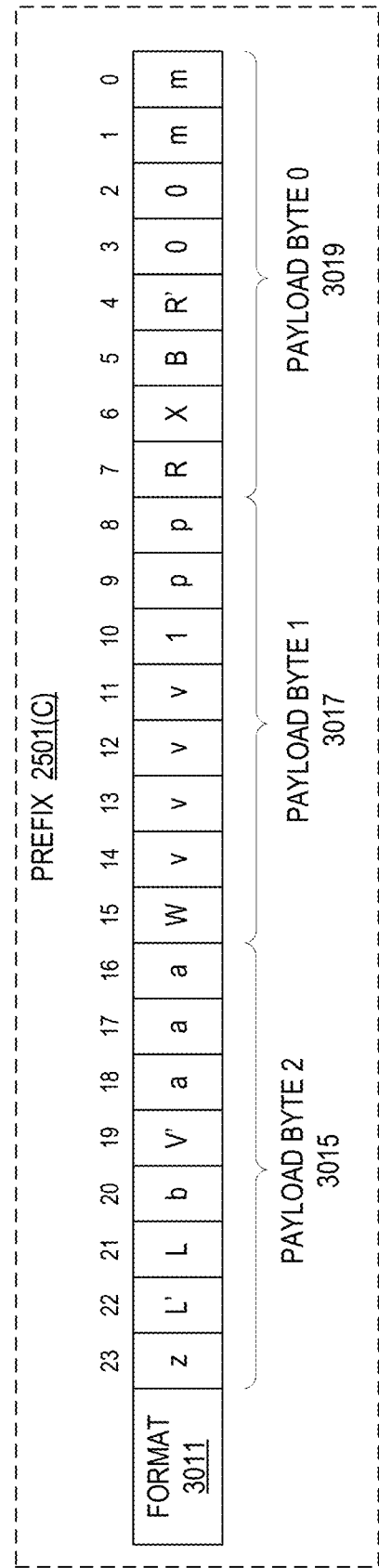
FIG. 30 is a functional block diagram illustrating details of a third example prefix of the instruction format of FIG. 25 according to the present embodiments.

FIG. 30 illustrates embodiments of a third prefix 2501(C). In some embodiments, the third prefix 2501(C) is an embodiment of an EVEX prefix. The illustrated embodiment of the third prefix 2501(C) is a four-byte prefix.

The third prefix 2501(C) can encode 32 vector registers (e.g., 128-bit, 256-bit, and 512-bit registers) in 64-bit mode. In some embodiments, instructions that utilize a writemask/opmask (see discussion of registers in a previous figure, such as FIG. 24) or predication utilize this prefix. Opmask registers allow for conditional processing or selection control. Opmask instructions, whose source/destination operands are opmask registers and treat the content of an opmask register as a single value, are encoded using the second prefix 2501(B).

The third prefix 2501(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 2501(C) is a format field 3011 that has a value, in one example, of 62H. Subsequent bytes are referred to as payload bytes 3015-3019, and collectively form a 24-bit value of P[23:0] providing specific capability in the form of one or more fields (detailed herein).

In some embodiments, P[1:0] of payload byte 3019 are identical to the low two mmmmm bits. P[3:2] are reserved in some embodiments. Bit P[4] (R') allows access to the high 16 vector register set when combined with P[7] and the Mod R/M reg field 2644. P[6] can also provide access to a high 16 vector register when SIB-type addressing is not needed. P[7:5] consist of an R, X, and B, which are operand specifier modifier bits for vector register, general purpose register, memory addressing, and allow access to the next set of 8 registers beyond the low 8 registers when combined with the Mod R/M register field 2644 and Mod R/M R/M field 2646. P[9:8] provide opcode extensionality equivalent to some legacy prefixes (e.g., 00=no prefix, 01=66H, 10=F3H, and 11=F2H). P[10] in some embodiments is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 2501(A) and second prefix 2511(B), and may serve as an opcode extension bit or operand size promotion.

P[18:16] specify the index of a register in the opmask (writemask) registers (e.g., writemask/predicate registers 2415). In one embodiment, the specific value aaa=000 has a special behavior implying no opmask is used for the particular instruction (this may be implemented in a variety of ways including the use of an opmask hardwired to all ones or hardware that bypasses the masking hardware). When merging, vector masks allow any set of elements in the destination to be protected from updates during the execution of any operation (specified by the base operation and the augmentation operation), while in other embodiments preserving the old value of each element of the destination where the corresponding mask bit has a 0. In contrast, when zeroing vector masks allow any set of elements in the destination to be zeroed during the execution of any operation (specified by the base operation and the augmentation operation), in one embodiment an element of the destination is set to 0 when the corresponding mask bit has a 0 value. A subset of this functionality is the ability to control the vector length of the operation being performed (that is, the span of elements being modified, from the first one to the last one); however, it is not necessary that the elements that are modified be consecutive. Thus, the opmask field allows for partial vector operations, including loads, stores, arithmetic, logical, etc. While embodiments are described in which the opmask field's content selects one of a number of opmask registers that contains the opmask to be used (and thus the opmask field's content indirectly identifies that masking to be performed), alternative embodiments instead, or additionally, allow the mask write field's content to directly specify the masking to be performed.

P[19] can be combined with P[14:11] to encode a second source vector register in a non-destructive source syntax that can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Example embodiments of encoding of registers in instructions using the third prefix 2501(C) are detailed in the following tables.

| 32-Register Support in 64-bit Mode | | | | | |
|---|---|---|---|---|---|
| | 4 | 3 | [2:0] | REG. TYPE | COMMON USAGES |
| REG | R' | R | ModR/M reg | GPR, Vector | Destination or Source |
| VVVV | V' | | vvvv | GPR, Vector | 2nd Source or Destination |
| RM | X | B | ModR/M R/M | GPR, Vector | 1st Source or Destination |
| BASE | 0 | B | ModR/M R/M | GPR | Memory addressing |
| INDEX | 0 | X | SIB.index | GPR | Memory addressing |
| VIDX | V' | X | SIB.index | Vector | VSIB memory addressing |

| Encoding Register Specifiers in 32-bit Mode | | | |
|---|---|---|---|
| | [2:0] | REG. TYPE | COMMON USAGES |
| REG | ModR/M reg | GPR, Vector | Destination or Source |
| VVVV | vvvv | GPR, Vector | 2nd Source or Destination |
| RM | ModR/M R/M | GPR, Vector | 1st Source or Destination |
| BASE | ModR/M R/M | GPR | Memory addressing |
| INDEX | SIB.index | GPR | Memory addressing |
| VIDX | SIB.index | Vector | VSIB memory addressing |

| Opmask Register Specifier Encoding | | | |
|---|---|---|---|
| | [2:0] | REG. TYPE | COMMON USAGES |
| REG | ModR/M Reg | k0-k7 | Source |
| VVVV | vvvv | k0-k7 | 2nd Source |
| RM | ModR/M R/M | k0-7 | 1st Source |
| {k1} | aaa | k0[1]-k7 | Opmask |

Program code may be applied to input instructions to perform the functions described herein and generate output information. The output information may be applied to one or more output devices. For purposes of this disclosure, a processing system includes any system that has a processor, such as, for example and without limitation, a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine-readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors, and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on-processor, off-processor, or part on- and part off-processor.

Figure 31:
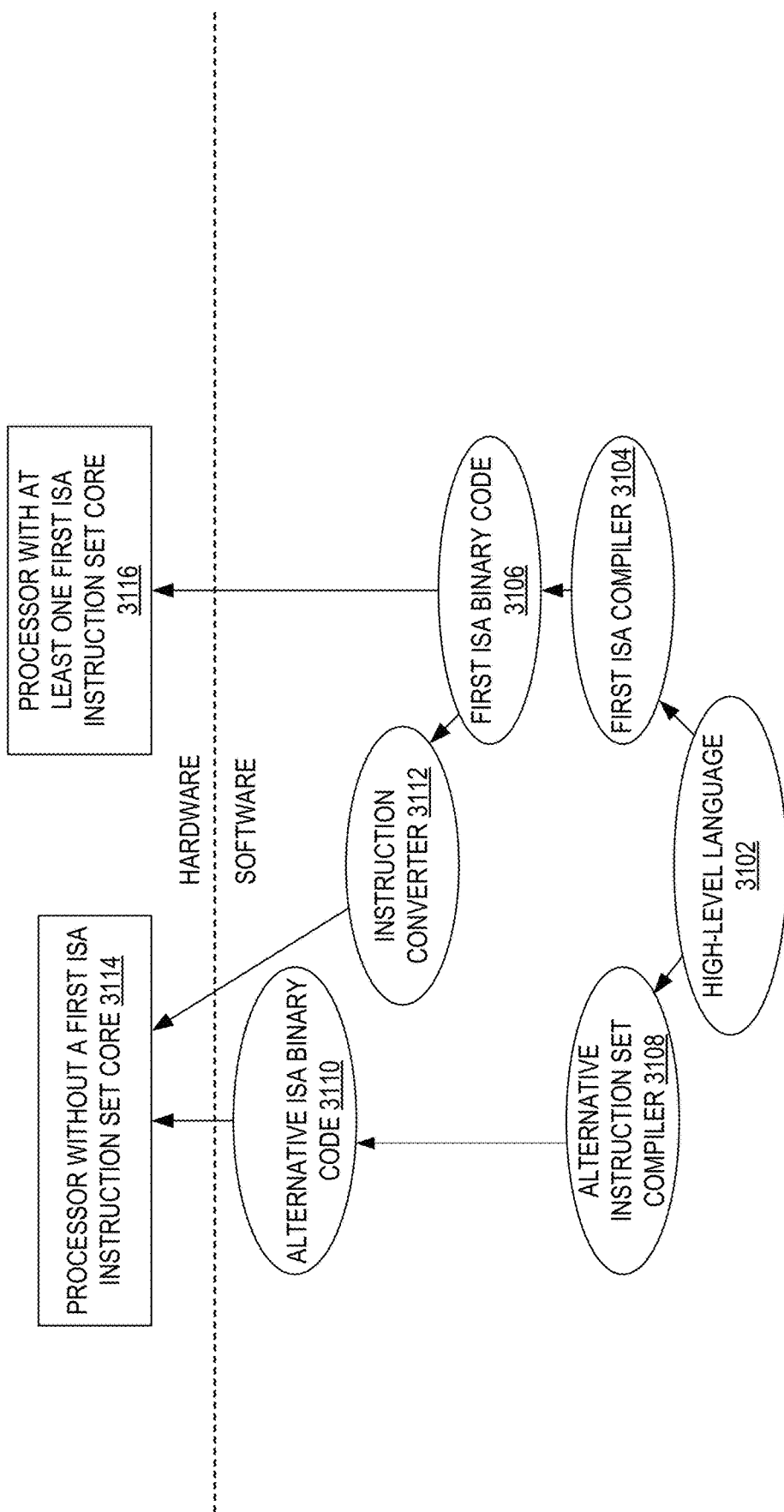
FIG. 31 is a functional block diagram contrasting the use of a software instruction converter to convert binary instructions in a source instruction set to binary instructions in a target instruction set according to the present embodiments.

FIG. 31 illustrates a block diagram contrasting the use of a software instruction converter to convert binary instructions in a source instruction set to binary instructions in a target instruction set according to the present embodiments. In the illustrated embodiment, the instruction converter is a software instruction converter, although alternatively the instruction converter may be implemented in software, firmware, hardware, or various combinations thereof. FIG. 31 shows a program in a high-level language 3102 may be compiled using a first ISA compiler 3104 to generate first ISA binary code 3106 that may be natively executed by a processor with at least one first instruction set core 3116. The processor with at least one first ISA instruction set core 3116 represents any processor that can perform substantially the same functions as an Intel® processor with at least one first ISA instruction set core by compatibly executing or otherwise processing (1) a substantial portion of the instruction set of the first ISA instruction set core or (2) object code versions of applications or other software targeted to run on an Intel processor with at least one first ISA instruction set core, in order to achieve substantially the same result as a processor with at least one first ISA instruction set core. The first ISA compiler 3104 represents a compiler that is operable to generate first ISA binary code 3106 (e.g., object code) that can, with or without additional linkage processing, be executed on the processor with at least one first ISA instruction set core 3116. Similarly, FIG. 31 shows the program in the high-level language 3102 may be compiled using an alternative instruction set compiler 3108 to generate alternative instruction set binary code 3110 that may be natively executed by a processor without a first ISA instruction set core 3114. The instruction converter 3112 is used to convert the first ISA binary code 3106 into code that may be natively executed by the processor without a first ISA instruction set core 3114. This converted code is not likely to be the same as the alternative instruction set binary code 3110, because an instruction converter capable of this is difficult to make; however, the converted code will accomplish the general operation and be made up of instructions from the alternative instruction set. Thus, the instruction converter 3112 represents software, firmware, hardware, or a combination thereof that, through emulation, simulation, or any other process, allows a processor or other electronic device that does not have a first ISA instruction set processor or core to execute the first ISA binary code 3106.

Exemplary embodiments include, but are not limited to:

1. An apparatus comprising:
    decoder circuitry to decode a single instruction to generate a decoded instruction, the decoded instruction including 1) one or more fields to identify a first destination operand, 2) one or more fields to identify a second destination operand, the second destination operand is to either store an output data structure having decrypted data after execution of the instruction, or a location to store an data structure having decrypted data after execution of the instruction, 3) one or more fields to identify a source operand, wherein the source operand is to either store an input data structure to be used in an decryption process or a location of an input data structure to be used in an decryption process, and 4) one more fields for an opcode, the opcode to indicate that execution circuitry is to at least encrypt secret information from the input data structure with a physical unclonable function (PUF) generated encryption key, bind the wrapped secret information to a target, update the input data structure, generate a MAC over the updated data structure, store the MAC in the input data structure to generate a wrapped output data structure, store the wrapped output data structure having the encrypted secret information and an indication of the target according to the second destination operand's usage for the instruction; and execution circuitry to execute the decoded instruction according to the opcode.
2. The apparatus of example 1, wherein the output data structure is to include an identifier of a target.
3. The apparatus of example 1, wherein the target is one of a platform and processor configuration, or an encryption engine.
4. The apparatus of example 1, wherein the operands are registers.
5. The apparatus of example 1, wherein the output data structure includes a field for a seed for generating an initialization vector to be used for authenticated decryption.
6. The apparatus of example 1, wherein the input data structure is to include a field to identify a challenge used by the PUF to generate the key.
7. The apparatus of example 1, wherein one of the first destination operand is to store an operational status indicating one of success, failure, or entropy error.
8. The apparatus of example 1, wherein the execution circuitry is to clear a zero flag (ZF) when the secret information is encrypted successfully, and the execution circuitry is to set the ZF to one otherwise.
9. The apparatus of example 1, wherein the instruction is associated with a most-privileged protection level.
10. An apparatus comprising:
    decoding a single instruction to generate a decoded instruction, the decoded instruction including 1) one or more fields to identify a first destination operand, 2) one or more fields to identify a second destination operand, the second destination operand is to either store an output data structure having decrypted data after execution of the instruction, or a location to store an data structure having decrypted data after execution of the instruction, 3) one or more fields to identify a source operand, wherein the source operand is to either store an input data structure to be used in an decryption process or a location of an input data structure to be used in an decryption process, and 4) one more fields for an opcode, the opcode to indicate that execution circuitry is to at least encrypt secret information from the input data structure with a physical unclonable function (PUF) generated encryption key, bind the wrapped secret information to a target, update the input data structure, generate a MAC over the updated data structure, store the MAC in the input data structure to generate a wrapped output data structure, store the wrapped output data structure having the encrypted secret information and an indication of the target according to the second destination operand's usage for the instruction; and
    executing the decoded instruction according to the opcode.
11. The method of example 10, wherein the output data structure is to include an identifier of a target.
12. The method of example 11, wherein the target is one of a platform and processor configuration, or an encryption engine.
13. The method of example 10, wherein the operands are registers.
14. The method of example 10, wherein the output data structure includes a field for a seed for generating an initialization vector to be used for authenticated decryption.
15. The method of example 10, wherein the input data structure is to include a field to identify a challenge used by the PUF to generate the key.
16. The method of example 10, wherein one of the first destination operand is to store an operational status indicating one of success, failure, or entropy error.

17. The method of example 10, wherein the execution circuitry is to clear a zero flag (ZF) when the secret information is encrypted successfully, and the execution circuitry is to set the ZF to one otherwise.
18. The method of example 10, wherein the instruction is associated with a most-privileged protection level.
19. A machine-readable medium storing an instance of a single instruction that, when processed by one or more processors, is cause the one or more processors to:
    decode the instance of the single instruction to generate a decoded instruction, the decoded instruction including 1) one or more fields to identify a first destination operand, 2) one or more fields to identify a second destination operand, the second destination operand is to either store an output data structure having decrypted data after execution of the instruction, or a location to store an data structure having decrypted data after execution of the instruction, 3) one or more fields to identify a source operand, wherein the source operand is to either store an input data structure to be used in an decryption process or a location of an input data structure to be used in an decryption process, and 4) one more fields for an opcode, the opcode to indicate that execution circuitry is to at least encrypt secret information from the input data structure with a physical unclonable function (PUF) generated encryption key, bind the wrapped secret information to a target, update the input data structure, generate a MAC over the updated data structure, store the MAC in the input data structure to generate a wrapped output data structure, store the wrapped output data structure having the encrypted secret information and an indication of the target according to the second destination operand's usage for the instruction; and
    execute the decoded instruction according to the opcode.
20. The machine-readable medium of example 19, wherein the operands are registers.
21. An apparatus comprising:
    decoder circuitry to decode a single instruction to generate a decoded instruction, the decoded instruction including 1) one or more fields to identify a first destination operand, 2) one or more fields to identify a second destination operand, the second destination operand is to either store an encrypted data structure after execution of the instruction, or a location to store an encrypted data structure after execution of the instruction, 3) one or more fields to identify a source operand, wherein the source operand is to either store an input data structure to be used in an encryption process or a location of an input data structure to be used in an encryption process, and 4) one more fields for an opcode, the opcode to indicate that execution circuitry is to at least decrypt secret information from the input data structure with a physically unclonable function (PUF) generated decryption key and store the decrypted secret information according to the second destination operand's usage for the instruction; and
    execution circuitry to execute the decoded instruction according to the opcode.
22. The apparatus of example 21, wherein the input data structure is to include an identifier of a target.
23. The apparatus of example 21, wherein when the identified target is not a processor, the execution circuitry is to halt execution.
24. The apparatus of example 21, wherein the operands are registers.
25. The apparatus of example 21, wherein the input data structure is to include a sequence identifier to be used in the decrypting.
26. The apparatus of example 21, wherein the input data structure is to include a field to identify a challenge used by the PUF to generate the key.
27. The apparatus of example 21, wherein the operational status is to indicate one of success, failure, or entropy error.
28. The apparatus of example 21, wherein the execution circuitry is to clear a zero flag (ZF) when the secret information is decrypted successfully, and the execution circuitry is to set the ZF to one otherwise.
29. The apparatus of example 21, wherein the instruction is associated with a most-privileged protection level.
30. An apparatus comprising:
    decoding a single instruction to generate a decoded instruction, the decoded instruction including 1) one or more fields to identify a first destination operand, 2) one or more fields to identify a second destination operand, the second destination operand is to either store an encrypted data structure after execution of the instruction, or a location to store an encrypted data structure after execution of the instruction, 3) one or more fields to identify a source operand, wherein the source operand is to either store an input data structure to be used in an encryption process or a location of an input data structure to be used in an encryption process, and 4) one more fields for an opcode, the opcode to indicate that execution circuitry is to at least decrypt secret information from the input data structure with a physically unclonable function (PUF) generated decryption key and store the decrypted secret information according to the second destination operand's usage for the instruction; and
    executing the decoded instruction according to the opcode.
31. The method of example 30, wherein the input data structure is to include an identifier of a target.
32. The method of example 31, wherein when the identified target is not a processor, the execution circuitry is to halt execution.
33. The method of example 30, wherein the operands are registers.
34. The method of example 30, wherein the input data structure is to include a sequence identifier to be used in the decrypting.
35. The method of example 30, wherein the input data structure is to include a field to identify a challenge used by the PUF to generate the key.
36. The method of example 30, wherein the operational status is to indicate one of success, failure, or entropy error.
37. The method of example 30, wherein the execution circuitry is to clear a zero flag (ZF) when the secret information is encrypted successfully, and the execution circuitry is to set the ZF to one otherwise.
38. The method of example 30, wherein the instruction is associated with a most-privileged protection level.
39. A machine-readable medium storing an instance of a single instruction that, when processed by one or more processors, is cause the one or more processors to:
    decode the instance of the single instruction to generate a decoded instruction, the decoded instruction including 1) one or more fields to identify a first destination operand, 2) one or more fields to identify a second destination operand, the second destination operand is to either store an encrypted data structure after execution of the instruction, or a location to store an encrypted data structure after execution of the instruction, 3) one or more fields to identify a source operand, wherein the source operand is to either store an input data structure to be used in an encryption process or a location of an input data structure to be used in an encryption process, and 4) one more fields for an opcode, the opcode to indicate that execution circuitry is to at least decrypt secret information from the input data structure with a physically unclonable function (PUF) generated decryption key and store the decrypted secret information according to the second destination operand's usage for the instruction; and execute the decoded instruction according to the opcode.

40. The machine-readable medium of example 39, wherein the operands are registers.

41. An apparatus comprising:

decoder circuitry to decode a single instruction to generate a decoded instruction, the decoded instruction including one or more fields to identify a source/destination operand which as a source provides an identity challenge for a physically unclonable function (PUF) circuit to generate a key and as a destination is store an operation status after execution, one or more fields to identify a first source operand which is to provide an indication of a signature algorithm to use, one or more fields to identify a second source operand which is to store or encode a location of an input data structure to hold an wrapping key to use during execution and data to be decrypted, and one or more fields to identify a destination operand that is to store or encode a location of where a signed response generated during execution is to be placed, wherein the opcode is to indicate that execution circuitry is to at least decrypt secret information from the input data structure of the second source operand with a PUF generated wrapping key, generate a signed response of the unwrapped secret information using the identity challenge of the source/destination operand according to the signature algorithm indicated by the first source operand, store the signed response in the identified destination, and store operational status of execution in the identified source/destination operand; and execution circuitry to execute the decoded instruction according to the opcode.

42. The apparatus of example 41, wherein the input data structure is to include an identifier of a target.

43. The apparatus of example 41, wherein when the identified target is not a processor, the execution circuitry is to halt execution.

44. The apparatus of example 41, wherein the operands are registers.

45. The apparatus of example 41, wherein the input data structure is to include a sequence identifier to be used in the decrypting.

46. The apparatus of example 41, wherein the input data structure is to include a field to identify a challenge used by the PUF to generate the key.

47. The apparatus of example 41, wherein the operational status is to indicate one of success, failure, or entropy error.

48. The apparatus of example 41, wherein the execution circuitry is to clear a zero flag (ZF) when the secret information is decrypted successfully, and the execution circuitry is to set the ZF to one otherwise.

49. The apparatus of example 41, wherein the instruction is associated with a most-privileged protection level.

50. An apparatus comprising:

decoding a single instruction to generate a decoded instruction, the decoded instruction including one or more fields to identify a source/destination operand which as a source provides an identity challenge for a physically unclonable function (PUF) circuit to generate a key and as a destination is store an operation status after execution, one or more fields to identify a first source operand which is to provide an indication of a signature algorithm to use, one or more fields to identify a second source operand which is to store or encode a location of an input data structure to hold an wrapping key to use during execution and data to be decrypted, and one or more fields to identify a destination operand that is to store or encode a location of where a signed response generated during execution is to be placed, wherein the opcode is to indicate that execution circuitry is to at least decrypt secret information from the input data structure of the second source operand with a PUF generated wrapping key, generate a signed response of the unwrapped secret information using the identity challenge of the source/destination operand according to the signature algorithm indicated by the first source operand, store the signed response in the identified destination, and store operational status of execution in the identified source/destination operand; and executing the decoded instruction according to the opcode.

51. The method of example 50, wherein the input data structure is to include an identifier of a target.

52. The method of example 51, wherein when the identified target is not a processor, the execution circuitry is to halt execution.

53. The method of example 50, wherein the operands are registers.

54. The method of example 50, wherein the input data structure is to include a sequence identifier to be used in the decrypting.

55. The method of example 50, wherein the input data structure is to include a field to identify a challenge used by the PUF to generate the key.

56. The method of example 50, wherein the operational status is to indicate one of success, failure, or entropy error.

57. The method of example 50, wherein the execution circuitry is to clear a zero flag (ZF) when the secret information is encrypted successfully, and the execution circuitry is to set the ZF to one otherwise.

58. The method of example 50, wherein the instruction is associated with a most-privileged protection level.

59. A machine-readable medium storing an instance of a single instruction that, when processed by one or more processors, is cause the one or more processors to:

decode the instance of the single instruction to generate a decoded instruction, the decoded instruction including 1) one or more fields to identify a first destination operand, 2) one or more fields to identify a second destination operand, the second destination operand is to either store an encrypted data structure after execution of the instruction, or a location to store an encrypted data structure after execution of the instruction, 3) one or more fields to identify a source operand, wherein the source operand is to either store an input data structure to be used in an encryption process or a location of an input data structure to be used in an encryption process, and 4) one more fields for an opcode, the opcode to indicate that execution circuitry is to at least decrypt secret information from the input data structure of the second source operand with a PUF generated wrapping key, generate a signed response of the unwrapped secret information using the identity challenge of the source/destination operand according to the signature algorithm indicated by the first source operand, store the signed response in the identified destination, and store operational status of execution in the identified source/destination operand; and execute the decoded instruction according to the opcode.

60. The machine-readable medium of example 59, wherein the operands are registers.

61. An apparatus comprising:
decoder circuitry to decode a single instruction to generate a decoded instruction, the instruction including an opcode to indicate a memory protection controller is to be programmed according to a leaf operation, wherein a first implicit operand is to provide an indication of the leaf operation, a second implicit operand is to provide a key identifier (keyID) and an indication of an encryption algorithm, a third implicit operand to provide a location of an input data structure, wherein the opcode is to indicate execution circuitry is to decrypt encrypted data from the input data structure using an unwrapping key generated by a physical unclonable function (PUF), the decrypted data comprising two concatenated keys, program the memory protection controller using the two concatenated keys based on the for the keyID based on the indicated encryption algorithm, and set an operational status; and
execution circuitry to execute the decoded instruction according to the opcode.

62. The apparatus of example 61, wherein a first of the concatenated keys is a tweak key.

63. The apparatus of example 61, wherein a second of the concatenated keys is a data key.

64. The apparatus of example 61, wherein the implicit operands are registers.

65. The apparatus of example 64, wherein the first implicit operand is an EAX register.

66. The apparatus of example 61, wherein the input data structure is to include a field to identify a challenge used by the PUF to generate the key.

67. The apparatus of example 61, wherein the operational status is to indicate one of success, invalid encryption algorithm, invalid keyID, and device busy.

68. The apparatus of example 61, wherein the execution circuitry is to clear a zero flag (ZF) when the secret information is decrypted successfully, and the execution circuitry is to set the ZF to one otherwise.

69. The apparatus of example 61, wherein the instruction is associated with a most-privileged protection level.

70. A method comprising:
decoding a single instruction to generate a decoded instruction, the instruction including an opcode to indicate a memory protection controller is to be programmed according to a leaf operation, wherein a first implicit operand is to provide an indication of the leaf operation, a second implicit operand is to provide a key identifier (keyID) and an indication of an encryption algorithm, a third implicit operand to provide a location of an input data structure, wherein the opcode is to indicate execution circuitry is to decrypt encrypted data from the input data structure using an unwrapping key generated by a physical unclonable function (PUF), the decrypted data comprising two concatenated keys, program the memory protection controller using the two concatenated keys based on the for the keyID based on the indicated encryption algorithm, and set an operational status; and
execution circuitry to execute the decoded instruction according to the opcode.

71. The method of example 70, wherein a first of the concatenated keys is a tweak key.

72. The method of example 71, wherein a second of the concatenated keys is a data key.

73. The method of example 70, wherein the implicit operands are registers.

74. The method of example 73, wherein the first implicit operand is an EAX register.

75. The method of example 70, wherein operational status is to indicate one of success, invalid encryption algorithm, invalid keyID, and device busy.

76. The method of example 70, wherein the executing is to clear a zero flag (ZF) when the secret information is encrypted successfully, and the execution circuitry is to set the ZF to one otherwise.

77. The method of example 70, wherein the instruction is associated with a most-privileged protection level.

78. A machine-readable medium storing an instance of a single instruction that, when processed by one or more processors, is cause the one or more processors to:
decode a single instruction to generate a decoded instruction, the instruction including an opcode to indicate a memory protection controller is to be programmed according to a leaf operation, wherein a first implicit operand is to provide an indication of the leaf operation, a second implicit operand is to provide a key identifier (keyID) and an indication of an encryption algorithm, a third implicit operand to provide a location of an input data structure, wherein the opcode is to indicate execution circuitry is to decrypt encrypted data from the input data structure using an unwrapping key generated by a physical unclonable function (PUF), the decrypted data comprising two concatenated keys, program the memory protection controller using the two concatenated keys based on the for the keyID based on the indicated encryption algorithm, and set an operational status; and
execute the decoded instruction according to the opcode.

79. The machine-readable medium of example 78, wherein the operands are implicit registers.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An apparatus comprising:
decoder circuitry to decode a single instruction to generate a decoded instruction, the instruction associated with a ring 0 protection level and including one or more fields to identify a source/destination operand which as a source is to provide an identity challenge for a physically unclonable function (PUF) circuit to generate a key and as a destination is to store an operation status after execution, one or more fields to identify a first source operand which is to provide an indication of a signature algorithm to use, one or more fields to identify a second source operand which is to store or encode a location of an input data structure, and one or more fields to identify a destination operand that is to store or encode a location of where a signed response generated during execution is to be placed, wherein the input data structure is to hold a wrapping key used during execution and stores data and secret information to be decrypted, and one or more fields comprising an opcode, wherein the opcode indicates that execution circuitry is to at least decrypt secret information from the input data structure of the second source operand with a PUF generated wrapping key, generate a signed response of the unwrapped secret information using the identity challenge of the source/destination operand according to the signature algorithm indicated by the first source operand, store the signed response in the identified destination, and store operational status of execution in the identified source/destination operand; and
execution circuitry to execute the decoded instruction according to the opcode.

2. The apparatus of claim 1, wherein the input data structure is to include an identifier of a target.

3. The apparatus of claim 1, wherein when the identified target is not a processor, the execution circuitry is to halt execution.

4. The apparatus of claim 1, wherein the operands are registers.

5. The apparatus of claim 1, wherein the input data structure is to include a sequence identifier to be used in the decrypting.

6. The apparatus of claim 1, wherein the input data structure is to include a field to identify a challenge used by the PUF to generate the key.

7. The apparatus of claim 1, wherein the operational status is to indicate one of success, failure, or entropy error.

8. The apparatus of claim 1, wherein the execution circuitry is to clear a zero flag (ZF) when the secret information is decrypted successfully, and the execution circuitry is to set the ZF to one otherwise.

9. A method comprising:
decoding a single instruction to generate a decoded instruction, wherein the instruction is associated with a ring 0 protection level and includes one or more fields to identify a source/destination operand which as a source is to provide an identity challenge for a physically unclonable function (PUF) circuit to generate a wrapping key and as a destination is to store an operation status after execution, one or more fields to identify a first source operand which is to provide an indication of a signature algorithm to use, one or more fields to identify a second source operand which is to store or encode a location of an input data structure, and one or more fields to identify a destination operand that is to store or encode a location of where a signed response generated during execution is to be placed, wherein the input data structure is to hold a wrapping key used during execution and stores data and secret information to be decrypted, and one or more fields comprising an opcode, wherein the opcode indicates that execution circuitry is to at least unwrap the secret information by decrypting secret information from the input data structure of the second source operand with a PUF generated wrapping key, generate a signed response of the unwrapped secret information using the identity challenge of the source/destination operand according to the signature algorithm indicated by the first source operand, store the signed response in the identified destination, and store operational status of execution in the identified source/destination operand; and
executing the decoded instruction according to the opcode.

10. The method of claim 9, wherein the input data structure is to include an identifier of a target.

11. The method of claim 10, wherein when the identified target is not a processor, the execution circuitry is to halt execution.

12. The method of claim 9, wherein the operands are registers.

13. The method of claim 9, wherein the input data structure is to include a sequence identifier to be used in the decrypting.

14. The method of claim 9, wherein the input data structure is to include a field to identify a challenge used by the PUF to generate the key.

15. The method of claim 9, wherein the operational status is to indicate one of success, failure, or entropy error.

16. The method of claim 9, wherein the execution circuitry is to clear a zero flag (ZF) when the secret information is encrypted successfully, and the execution circuitry is to set the ZF to one otherwise.

17. A non-transitory machine-readable medium storing an instance of a single instruction that, when processed by one or more processors, is to cause the one or more processors to:
decode the instance of the single instruction to generate a decoded instruction, wherein the instruction is associated with a ring 0 protection level and the instruction includes 1) one or more fields to identify a first destination operand that is to store or encode a location of where a signed response generated during execution is to be placed, 2) one or more fields to identify a second destination operand, the second destination operand is to either store an encrypted data structure after execution of the instruction, or a location to store an encrypted data structure after execution of the instruction, 3) one or more fields to identify a source/destination operand which as a source is to provide an identity challenge for a physically unclonable function (PUF) circuit to generate a wrapping key and as a destination is to store an operation status after execution, 4) one or more fields to identify a first source operand which is to provide an indication of a signature algorithm to use, 5) one or more fields to identify a second source operand, wherein the second source operand is to either store an input data structure to be used in an encryption process or a location of an input data structure to be used in an encryption process, and 6) one more fields comprising an opcode, wherein the input data structure holds a wrapping key used during execution and stores data and secret information to be decrypted, wherein the opcode indicates that execution circuitry is to at least unwrap the secret information by decrypting secret information from the input data structure of the second source operand with a PUF generated wrapping key, generate a signed response of the unwrapped secret information using the identity challenge of the source/destination operand according to the signature algorithm indicated by the first source operand, store the signed response in the identified destination, and store operational status of execution in the identified source/destination operand; and execute the decoded instruction according to the opcode.

18. The machine-readable medium of claim 17, wherein the operands are registers.

* * * * *